United States Patent
Kurth et al.

(10) Patent No.: US 8,567,612 B2
(45) Date of Patent: Oct. 29, 2013

(54) HYBRID TFC RO MEMBRANES WITH NITROGEN ADDITIVES

(75) Inventors: Christopher James Kurth, Eden Prairie, MN (US); Jeffrey Alan Koehler, Pasadena, CA (US); Meijuan Zhou, Freemont, CA (US); Brett Anderson Holmberg, Los Angeles, CA (US); Robert Leon Burk, Seattle, WA (US)

(73) Assignee: NanoH2O, Inc., El Segundo, CA (US)

( * ) Notice: Subject to any disclaimer, the term of this patent is extended or adjusted under 35 U.S.C. 154(b) by 402 days.

(21) Appl. No.: 12/826,294

(22) Filed: Jun. 29, 2010

(65) Prior Publication Data

US 2011/0005997 A1    Jan. 13, 2011

Related U.S. Application Data

(63) Continuation-in-part of application No. PCT/US2009/061109, filed on Oct. 16, 2009, and a continuation-in-part of application No. PCT/US2009/060929, filed on Oct. 16, 2009, and a continuation-in-part of application No. PCT/US2009/060927, filed on Oct. 15, 2009, and a continuation-in-part of application No. PCT/US2009/060924, filed on Oct. 15, 2009, said application No. PCT/US2009/061109 is a continuation-in-part of application No. 12/424,533,
(Continued)

(51) Int. Cl.
| | | |
|---|---|---|
| *B01D 39/00* | (2006.01) | |
| *B01D 39/14* | (2006.01) | |
| *B01D 67/00* | (2006.01) | |
| *B01D 61/00* | (2006.01) | |

(52) U.S. Cl.
USPC ......... 210/500.38; 210/490; 210/652; 264/48

(58) Field of Classification Search
USPC ............... 210/636, 652, 500.38, 257.2, 639, 210/650–651, 195.2, 490, 500.37; 264/48
See application file for complete search history.

(56) References Cited

U.S. PATENT DOCUMENTS

| 3,133,132 A | 5/1964 | Loeb et al. |
|---|---|---|
| 3,133,137 A | 5/1964 | Loeb et al. |

(Continued)

FOREIGN PATENT DOCUMENTS

| CA | 2388500 A1 | 4/2001 |
|---|---|---|
| CA | 2600481 A1 | 9/2006 |

(Continued)

OTHER PUBLICATIONS

Yuyu Sun et al, Novel Refreshable N-Halamine Polymeric Biocides Containing Imidazolidin 4-ones Derivatives; J. of Polymer Science,: Part A Polymer Chemistry, vol. 89, 3073-3084 (2001).*

(Continued)

*Primary Examiner* — Ana Fortuna
(74) *Attorney, Agent, or Firm* — Fish & Richardson P.C.

(57) ABSTRACT

RO membranes using chlorinated water as a feed stream maybe protected from damage by the chlorine with a protective layer including reactive nitrogen which forms chloromines on the surface of the membrane that reduce chlorine penetration. This protective layer also provides substantial anti-fouling capabilities, whether used with a chlorinated or unchlorinated feed stream because the chloramines are antibacterial. Although chlorine is lost in use, the anti-fouling layer or coating can be recharged with additional chlorine without damaging the discrimination layer. The anti-fouling layer or coating may be advantageously used with Thin film composite, TFC, membranes for use in forward and reverse osmosis may include nanoparticles, monohydrolyzed and/or di-hydrolyzed TMC, and/or alkaline earth alkaline metal complexes or other additives.

9 Claims, 6 Drawing Sheets

Related U.S. Application Data filed on Apr. 15, 2009, now Pat. No. 8,177,978, said application No. PCT/US2009/060929 is a continuation-in-part of application No. 12/424,533, said application No. PCT/US2009/060927 is a continuation-in-part of application No. 12/424,533, said application No. PCT/US2009/060924 is a continuation-in-part of application No. 12/424,533.

(60) Provisional application No. 61/045,262, filed on Apr. 15, 2008, provisional application No. 61/045,234, filed on Apr. 15, 2008, provisional application No. 61/045,237, filed on Apr. 15, 2008, provisional application No. 61/045,247, filed on Apr. 15, 2008, provisional application No. 61/045,249, filed on Apr. 15, 2008, provisional application No. 61/045,252, filed on Apr. 15, 2008, provisional application No. 61/079,794, filed on Jul. 10, 2008, provisional application No. 61/088,666, filed on Aug. 13, 2008, provisional application No. 61/104,905, filed on Oct. 13, 2008, provisional application No. 61/122,341, filed on Dec. 12, 2008, provisional application No. 61/112,342, filed on Nov. 7, 2008, provisional application No. 61/122,343, filed on Dec. 12, 2008, provisional application No. 61/122,344, filed on Dec. 12, 2008, provisional application No. 61/122,345, filed on Dec. 12, 2008, provisional application No. 61/122,346, filed on Dec. 12, 2008, provisional application No. 61/122,347, filed on Dec. 12, 2008, provisional application No. 61/122,348, filed on Dec. 12, 2008, provisional application No. 61/122,350, filed on Dec. 12, 2008, provisional application No. 61/122,351, filed on Dec. 12, 2008, provisional application No. 61/122,352, filed on Dec. 12, 2008, provisional application No. 61/122,354, filed on Dec. 12, 2008, provisional application No. 61/122,355, filed on Dec. 12, 2008, provisional application No. 61/122,357, filed on Dec. 13, 2008, provisional application No. 61/122,358, filed on Dec. 13, 2008, provisional application No. 61/156,388, filed on Feb. 27, 2009, provisional application No. 61/156,394, filed on Feb. 27, 2009, provisional application No. 61/164,031, filed on Mar. 27, 2009, provisional application No. 61/221,214, filed on Jun. 29, 2009.

(56) References Cited

U.S. PATENT DOCUMENTS

| | | |
|---|---|---|
| 3,260,691 A | 7/1966 | Lavin et al. |
| 3,351,244 A | 11/1967 | Zandberg et al. |
| 3,367,504 A | 2/1968 | Westmoreland |
| 3,417,870 A | 12/1968 | Bray |
| 3,480,588 A | 11/1969 | Lavin et al. |
| 3,567,632 A | 3/1971 | Richter et al. |
| 3,597,393 A | 8/1971 | Bach et al. |
| 3,615,024 A | 10/1971 | Michaels |
| 3,619,424 A | 11/1971 | Blanchard et al. |
| 3,642,707 A | 2/1972 | Frazer |
| 3,648,845 A | 3/1972 | Riley |
| 3,663,510 A | 5/1972 | Peterson |
| 3,687,842 A | 8/1972 | Credali et al. |
| 3,690,811 A | 9/1972 | Horning |
| 3,692,740 A | 9/1972 | Suzuki et al. |
| 3,696,031 A | 10/1972 | Credali et al. |
| 3,710,945 A | 1/1973 | Dismore |
| 3,744,642 A | 7/1973 | Scala et al. |
| 3,791,526 A | 2/1974 | Stana et al. |
| 3,878,109 A | 4/1975 | Ikeda et al. |
| 3,904,519 A | 9/1975 | McKinney et al. |
| 3,906,250 A | 9/1975 | Loeb |
| 3,920,612 A | 11/1975 | Stephens |
| 3,926,798 A | 12/1975 | Cadotte |
| 3,951,815 A | 4/1976 | Wrasidlo |
| 3,993,625 A | 11/1976 | Kurihara et al. |
| 3,996,318 A | 12/1976 | Van Heuven |
| 4,005,012 A | 1/1977 | Wrasidlo |
| 4,020,142 A | 4/1977 | Davis et al. |
| 4,039,440 A | 8/1977 | Cadotte |
| 4,048,144 A | 9/1977 | Stephens |
| 4,051,300 A | 9/1977 | Klein et al. |
| 4,060,488 A | 11/1977 | Hoover et al. |
| 4,092,424 A | 5/1978 | Brandl et al. |
| 4,188,418 A | 2/1980 | Livingston |
| 4,244,824 A | 1/1981 | Lange et al. |
| 4,259,183 A | 3/1981 | Cadotte |
| 4,277,344 A | 7/1981 | Cadotte |
| 4,387,024 A | 6/1983 | Kurihara et al. |
| 4,388,189 A | 6/1983 | Kawaguchi et al. |
| 4,392,960 A | 7/1983 | Kraus et al. |
| 4,492,721 A | 1/1985 | Joosten et al. |
| 4,559,139 A | 12/1985 | Uemura et al. |
| 4,567,009 A | 1/1986 | Badenhop et al. |
| 4,606,943 A | 8/1986 | Rak et al. |
| 4,693,985 A | 9/1987 | Degen et al. |
| 4,707,266 A | 11/1987 | Degen et al. |
| 4,713,438 A | 12/1987 | Harris et al. |
| 4,740,219 A | 4/1988 | Kulprathipanja et al. |
| 4,754,016 A | 6/1988 | Ai et al. |
| 4,762,619 A | 8/1988 | Gaddis et al. |
| 4,765,897 A | 8/1988 | Cadotte et al. |
| 4,765,915 A | 8/1988 | Diehl |
| 4,769,148 A | 9/1988 | Fibiger et al. |
| 4,778,596 A | 10/1988 | Linder et al. |
| 4,814,082 A | 3/1989 | Wrasidlo |
| 4,830,885 A | 5/1989 | Tran et al. |
| 4,833,014 A | 5/1989 | Linder et al. |
| 4,840,977 A | 6/1989 | Crivello et al. |
| 4,859,384 A | 8/1989 | Fibiger et al. |
| 4,872,984 A | 10/1989 | Tomaschke |
| 4,902,424 A | 2/1990 | Wrasidlo |
| 4,911,844 A | 3/1990 | Linder et al. |
| 4,931,362 A | 6/1990 | Zsifkovits et al. |
| 4,948,506 A | 8/1990 | Lonsdale et al. |
| 4,948,507 A | 8/1990 | Tomaschke |
| 4,950,404 A | 8/1990 | Chau |
| 4,960,518 A * | 10/1990 | Cadotte et al. ................ 210/639 |
| 4,971,697 A | 11/1990 | Douden et al. |
| 4,983,291 A | 1/1991 | Chau et al. |
| 4,988,444 A * | 1/1991 | Applegate et al. ............ 210/636 |
| 5,002,590 A | 3/1991 | Friesen et al. |
| 5,017,680 A | 5/1991 | Sublett |
| 5,019,261 A | 5/1991 | Stengaard |
| 5,024,594 A | 6/1991 | Athayde et al. |
| 5,028,337 A | 7/1991 | Linder et al. |
| 5,069,945 A | 12/1991 | Wrasidlo |
| 5,084,179 A | 1/1992 | Knight |
| 5,091,086 A | 2/1992 | Stengaard |
| 5,098,575 A | 3/1992 | Yaeli |
| 5,104,632 A | 4/1992 | Douden et al. |
| 5,108,607 A | 4/1992 | Kraus et al. |
| 5,130,025 A | 7/1992 | Lefebvre et al. |
| 5,147,553 A * | 9/1992 | Waite ............................ 210/654 |
| 5,154,829 A | 10/1992 | Degen et al. |
| 5,160,617 A | 11/1992 | Huis In't Veld et al. |
| 5,173,189 A | 12/1992 | Hoshi et al. |
| 5,190,654 A | 3/1993 | Bauer |
| 5,234,598 A | 8/1993 | Tran et al. |
| 5,254,261 A | 10/1993 | Tomaschke et al. |
| 5,258,203 A | 11/1993 | Arthur |
| 5,262,054 A | 11/1993 | Wheeler |
| 5,269,926 A | 12/1993 | Webster et al. |
| 5,281,430 A | 1/1994 | Herron et al. |
| 5,342,431 A | 8/1994 | Anderson et al. |
| 5,376,442 A | 12/1994 | Davidson et al. |
| 5,462,667 A | 10/1995 | Wollinsky et al. |
| 5,543,046 A | 8/1996 | Van Rijn |
| 5,576,057 A | 11/1996 | Hirose et al. |
| 5,614,099 A | 3/1997 | Hirose et al. |
| 5,650,479 A | 7/1997 | Glugla et al. |

| | | |
|---|---|---|
| 5,658,460 A | 8/1997 | Cadotte et al. |
| 5,681,473 A | 10/1997 | Miller et al. |
| 5,693,227 A | 12/1997 | Costa |
| 5,733,602 A | 3/1998 | Hirose et al. |
| 5,755,964 A | 5/1998 | Mickols |
| 5,800,706 A | 9/1998 | Fischer |
| 5,843,351 A | 12/1998 | Hirose et al. |
| 5,876,602 A | 3/1999 | Jons et al. |
| 5,914,039 A | 6/1999 | Mahendran et al. |
| 5,938,934 A | 8/1999 | Balogh et al. |
| 5,989,426 A | 11/1999 | Hirose et al. |
| 6,015,495 A | 1/2000 | Koo et al. |
| 6,024,872 A | 2/2000 | Mahendran et al. |
| 6,024,873 A | 2/2000 | Hirose et al. |
| 6,117,341 A | 9/2000 | Bray et al. |
| 6,162,358 A | 12/2000 | Li et al. |
| 6,171,497 B1 | 1/2001 | Hirose et al. |
| 6,185,940 B1 | 2/2001 | Prueitt |
| 6,187,192 B1 | 2/2001 | Johnston et al. |
| 6,241,893 B1 | 6/2001 | Levy |
| 6,245,234 B1 | 6/2001 | Koo et al. |
| 6,284,137 B1 | 9/2001 | Hajikano et al. |
| 6,309,546 B1 | 10/2001 | Herrmann et al. |
| 6,337,018 B1 | 1/2002 | Mickols |
| 6,368,507 B1 | 4/2002 | Koo et al. |
| 6,406,626 B1 | 6/2002 | Murakami et al. |
| 6,413,425 B1 | 7/2002 | Hachisuka et al. |
| 6,425,936 B1 | 7/2002 | Sammons et al. |
| 6,472,016 B1 | 10/2002 | Soria et al. |
| 6,540,915 B2 | 4/2003 | Patil |
| 6,551,536 B1 | 4/2003 | Kwak et al. |
| 6,562,266 B2 | 5/2003 | Mickols |
| 6,582,495 B2 | 6/2003 | Chau et al. |
| 6,585,802 B2 | 7/2003 | Koros et al. |
| 6,605,140 B2 | 8/2003 | Guiver et al. |
| 6,652,751 B1 | 11/2003 | Kutowy et al. |
| 6,723,241 B2 | 4/2004 | Mickols |
| 6,753,396 B2 | 6/2004 | Ulbricht et al. |
| 6,755,900 B2 | 6/2004 | Koros et al. |
| 6,821,430 B2 | 11/2004 | Andou et al. |
| 6,837,996 B2 | 1/2005 | Kurth et al. |
| 6,841,075 B2 | 1/2005 | Penth et al. |
| 6,878,278 B2 | 4/2005 | Mickols |
| 6,890,436 B2 | 5/2005 | Komatsu et al. |
| 7,018,538 B2 | 3/2006 | Leiser et al. |
| 7,109,140 B2 | 9/2006 | Marand et al. |
| 7,138,058 B2 | 11/2006 | Kurth et al. |
| 7,147,735 B2 * | 12/2006 | Caskey et al. ............. 156/73.5 |
| 7,182,894 B2 | 2/2007 | Kumar et al. |
| 7,211,320 B1 | 5/2007 | Cooper et al. |
| 7,311,982 B2 | 12/2007 | Christou et al. |
| 7,459,121 B2 | 12/2008 | Liang et al. |
| 7,604,746 B2 | 10/2009 | Childs et al. |
| 7,993,524 B2 * | 8/2011 | Ratto et al. ............... 210/652 |
| 8,029,857 B2 * | 10/2011 | Hoek et al. ............... 427/245 |
| 8,177,978 B2 * | 5/2012 | Kurth et al. ............... 210/652 |
| 2002/0074282 A1 | 6/2002 | Herrmann et al. |
| 2002/0187401 A1 | 12/2002 | Lee et al. |
| 2003/0116503 A1 | 6/2003 | Wang et al. |
| 2003/0121844 A1 | 7/2003 | Koo et al. |
| 2004/0178135 A1 | 9/2004 | Beplate |
| 2004/0234751 A1 | 11/2004 | Sakurai et al. |
| 2005/0077243 A1 | 4/2005 | Pinnau et al. |
| 2005/0139066 A1 | 6/2005 | Miller et al. |
| 2005/0173341 A1 | 8/2005 | Salinaro |
| 2005/0230305 A1 | 10/2005 | Kulkarni et al. |
| 2006/0032823 A1 * | 2/2006 | Harrison et al. ............. 210/754 |
| 2006/0063911 A1 | 3/2006 | Cayton et al. |
| 2006/0175256 A1 | 8/2006 | Masten et al. |
| 2006/0201884 A1 | 9/2006 | Kulprathipanja et al. |
| 2006/0204812 A1 | 9/2006 | Moriyama et al. |
| 2006/0249447 A1 | 11/2006 | Yeager |
| 2007/0039874 A1 * | 2/2007 | Kniajanski et al. ...... 210/500.37 |
| 2007/0181497 A1 | 8/2007 | Liberman |
| 2008/0149561 A1 | 6/2008 | Chu et al. |
| 2008/0237126 A1 | 10/2008 | Hoek et al. |
| 2008/0251447 A1 | 10/2008 | Koumoto et al. |
| 2009/0272692 A1 | 11/2009 | Kurth et al. |
| 2010/0006495 A1 * | 1/2010 | Buschmann ............. 210/500.25 |
| 2010/0025330 A1 | 2/2010 | Ratto et al. |
| 2010/0062156 A1 | 3/2010 | Kurth et al. |
| 2010/0224555 A1 | 9/2010 | Hoek et al. |
| 2011/0005997 A1 * | 1/2011 | Kurth et al. ............... 210/500.27 |
| 2012/0080380 A1 * | 4/2012 | Wang et al. ............... 210/654 |
| 2012/0145630 A1 * | 6/2012 | Ogiwara et al. ............. 210/638 |
| 2012/0152839 A1 * | 6/2012 | Olson et al. ............... 210/639 |

FOREIGN PATENT DOCUMENTS

| | | |
|---|---|---|
| CN | 101 695 636 A | 4/2010 |
| CN | 101 816 900 A | 9/2010 |
| EP | 0348041 A1 | 12/1989 |
| JP | 63-012310 | 1/1988 |
| JP | 4126529 A | 4/1992 |
| JP | 5245349 A | 9/1993 |
| JP | 2000-225327 | 8/2000 |
| KR | 10-2001-0100304 | 11/2001 |
| KR | 10-2005-0077141 A | 8/2005 |
| WO | 00/76641 A2 | 12/2000 |
| WO | 00/78437 A1 | 12/2000 |
| WO | 01/78882 A2 | 10/2001 |
| WO | 02/04082 A2 | 1/2002 |
| WO | 02/15299 A1 | 2/2002 |
| WO | 02/051528 A1 | 7/2002 |
| WO | 03/097218 A1 | 11/2003 |
| WO | 2004/022491 A1 | 3/2004 |
| WO | 2005/014266 A1 | 2/2005 |
| WO | 2005/023414 A1 | 3/2005 |
| WO | 2005/057700 A1 | 6/2005 |
| WO | 2006/030411 A1 | 3/2006 |
| WO | 2006/098872 A2 | 9/2006 |
| WO | 2006/135384 A1 | 12/2006 |
| WO | 2007/001405 | 1/2007 |
| WO | 2007/024461 A2 | 3/2007 |
| WO | 2007/050408 A2 | 5/2007 |
| WO | 2007/065866 A1 | 6/2007 |
| WO | 2007/084169 A2 | 7/2007 |
| WO | 2007/095363 A2 | 8/2007 |
| WO | 2007/133362 A1 | 11/2007 |
| WO | 2007/133609 A2 | 11/2007 |
| WO | 2008/057842 A2 | 5/2008 |
| WO | 2008/066939 A2 | 6/2008 |
| WO | 2008/091658 A1 | 7/2008 |
| WO | 2008/118228 A2 | 10/2008 |
| WO | 2009/129354 A2 | 10/2009 |

OTHER PUBLICATIONS

Franck Hui et al., Antimicrobial N-halamine Polymers and Coatings: A Review of their Synthesis, Characterization, and Applications; ACS Publications, American Chemical Society, Dec. 21, 2012.*
International Search Report and Written Opinion in International Application No. PCT/US2010/040417, dated Jan. 28, 2011, 9 pages.
International Preliminary Report on Patentability in International Application No. PCT/US2010/040417, dated Jan. 12, 2012, 7 pages.
Extended European Search Report in European Application No. 10800304.7, dated Nov. 19, 2012, 12 pages.
Alexandre et al., "Polymer-layered silicate nanocomposites: preparation, properties and uses of a new class of materials", Materials Science and Engineering, vol. 28, 2000, pp. 1-63.
Arthur, S. D., "Structure-Property Relationship in a thin film", Journal of Membrane Science, vol. 46, 1989, pp. 243-260.
Bae et al., "Preparation of TiO2 Self-Assembled Polymeric Nanocomposite Membranes and Examination of Their Fouling Mitigation Effects in a Membrane Bioreactor System", Journal of Membrane Science, vol. 266, 2005, pp. 1-5.
Bermudez, et al., "Infinite Dilution Activity Coefficients in Tributyl Phosphate and Triacetin", J. Chem. Eng. Data, vol. 45, No. 6, 2000, pp. 1105-1107.
Bhattacharyya, D. et al., "An Overview of Selected Membrane Techniques for Environmental Applications", J. Chin. Inst. Chem. Engrs., vol. 33. No. 1, 2002, pp. 61-66.
Boom, et al., "Microstructures in phase inversion membranes. Part 2. The role of a polymeric additive", Journal of Membrane Science, vol. 73, 1992, pp. 277-292.

Cadotte, J. E., "Evolution of Composite Reverse Osmosis Membranes", ACS Symposium Series; American Chemical Society: Washington, DC, 1985, pp. 273-294.

Cadotte, J. E., et al., "Advanced Poly(PiperazineAmide) Reverse Osmosis Membranes", Filmtec Corporation, Sep. 27, 1978, 54 Pages.

Cadotte, J. E., et al., "Continued Evaluation of In Situ-Formed Condensation Polymers for Reverse Osmosis Membranes", Midwest Research Institute (PB-253193), Apr. 1976, 92 Pages.

Cadotte, J. E., et al., "Research on 'IN Situ' Formed Condensation Polymer for Reverse Osmosis Membranes", National Technical Information Service, Mar. 1978, 56 Pages.

Freger, et al., "TFC polyamide membranes modified by grafting of hydrophilic polymers: an FT-IR/AFM/TEM study", Journal/of Membrane Science, vol. 209, No. 1, 2002, pp. 283-292.

Goosen, et al., "Fouling of Reverse Osmosis and Ultrafiltration Membranes: A Critical Review", Separation Science and Technology, vol. 39, No. 10, 2004, pp. 2261-2297.

Hoek et al., "Cake-Enhanced Concentration Polarization: A New Mechanism of Fouling for Salt Rejecting Membranes", Environmental Science and Technology, vol. 37, No. 24, 2003, pp. 5581-5588.

Hoek et al., "Effect of Membrane Surface Roughness on Colloid-Membrane DLVO Interactions", Langmuir, vol. 19, 2003, pp. 4836-4387.

Hoek et al., "Influence of Crossflow Membrane Filter Geometry and Shear Rate on Colloidal Fouling in Reverse Osmosis and Nanofiltration Separations", Environmental Engineering Science, vol. 19, 2002, pp. 357-373.

Jeong, B. et al., "Interfacial polymerization of thin film nanocomposites:", B.-H. Jeong et al./Journal of Membrane Science 294, 2007, pp. 1-7.

Kang et al., "Direct Observation of Biofouling in Cross-flow Microfiltration: Mechanisms of Deposition and Release", Journal of Membrane Science, vol. 244, 2004, pp. 151-165.

Lee, et al., "Effect of operating conditions on CaSO4 scale formation mechanism in nanofiltration for water softening", Water Research, vol. 34, No. 15, 2000, pp. 3854-3866.

Lemanski et al., "Effect of shell-side flows on the performance of hollow-fiber gas separation modules", Journal of Membrane Science, vol. 195, 2002, p. 215.

Li et al., "Organic Fouling and Chemical Cleaning of Nanofiltration Membranes: Measurements and Mechanisms", Environmental Science and Technology, vol. 38, 2004, p. 4683.

Lohokare et al., "Effect of support material on ultrafiltration membrane performance", Journal of Applied Polymer Science, vol. 99, No. 6, 2006, pp. 3389-3395.

McDonnell et al., "Hydrophilic and Antimicrobial Zeolite Coatings for Gravity-Independent Water Separation", Advanced Functional Materials, vol. 15, 2005, pp. 336-340.

Rong et al., "Structure-property relationships of irradiation grafted nano-inorganic particle filled polypropylene composites", Polymer, vol. 42, 2001, pp. 167-183.

Rowsell et al., "Metal-organic frameworks: A new class of porous materials", Micro- and Mesoporous Mater., vol. 73, 2004, pp. 3-14.

Tansel et al., "Characterization of fouling kinetics in ultrafiltration systems by resistances in series model", Desalination, vol. 129, 2000, pp. 7-14.

Van, et al., "Surface reaction kinetics of metal β-diketonate precursors with O radicals in radical-enhanced atomic layer deposition of metal oxides", Applied Surface Science, 2005, vol. 246, pp. 250-261.

Vrijenhoek et al., "Influence of Membrane Surface Properties on Initial Rate of Colloidal Fouling of Reverse Osmosis and Nanofiltration Membranes", Journal of Membrane Science, vol. 188, 2001, p. 115.

Walker et al., "A novel asymmetric clamping cell for measuring streaming potential of flat surfaces", Langmuir, vol. 18, No. 6, 2002, pp. 2193-2198.

Wang et al., "Direct Observation of Microbial Adhesion to Membranes", Environmental Science & Technology, vol. 39, 2005, pp. 6461-6469.

Wang, Y. et al., "Formation of semi-permeable polyamide skin layers on the surface of supported liquid membranes," J. of Membrane Science, 1998, 147:109-116.

Wei et al., "A Novel method of surface modification on thin-film-composite reverse osmosis membrane by grafting hydantoin derivative," *J Membrane Sci.*, 2010, 346(1):152-162.

Wei et al., "Surface modification of commercial aromatic polyamide reverse osmosis membranes by graft polymerization of 3-allyl-5, 5-dimethlyhdantoin," *J Membrane Sci.*, 2010, 351(1-2):222-233.

Zhu et al., "Colloidal Fouling of Reverse Osmosis Membranes: Measurements and Fouling Mechanisms", Env Sci Tech, vol. 31, 1997, pp. 3654-3662.

\* cited by examiner

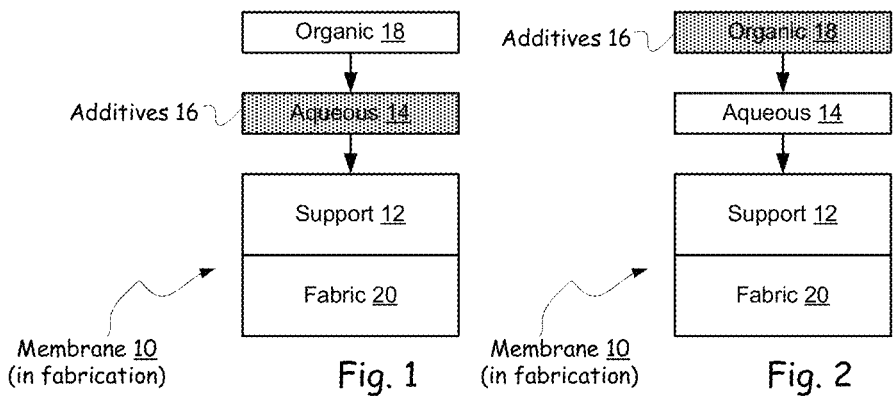
Fig. 1
Fig. 2
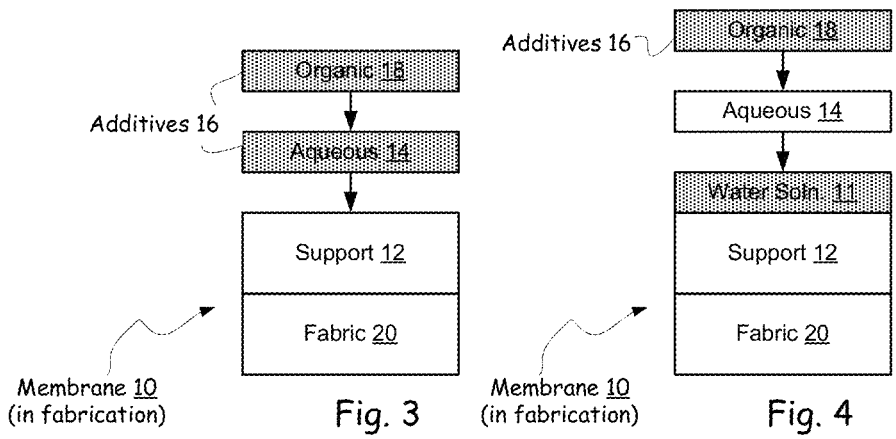
Fig. 3
Fig. 4
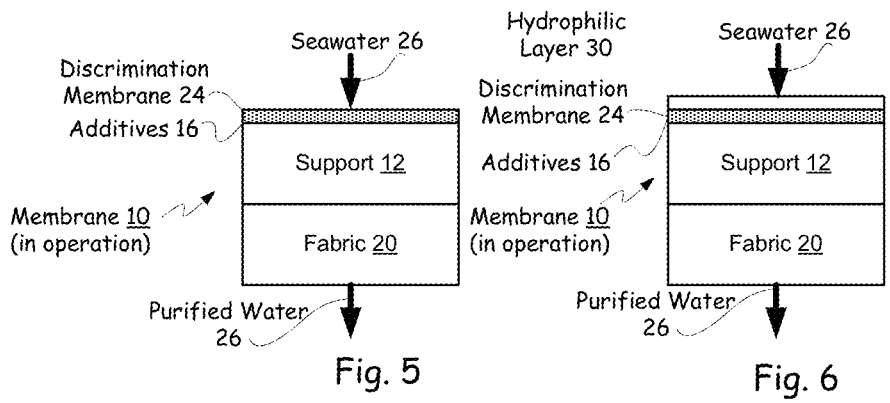
Fig. 5
Fig. 6

HYBRID TFC RO MEMBRANES WITH NITROGEN ADDITIVES

CROSS-REFERENCE TO RELATED APPLICATIONS

This application claims benefit of U.S. Provisional Applications: 61/045,262, filed Apr. 15, 2008; 61/045,234, filed Apr. 15, 2008; 61/045,237, filed Apr. 15, 2008; 61/045,247, filed Apr. 15, 2008; 61/045,249, filed Apr. 15, 2008; 61/045,252, filed Apr. 15, 2008; 61/079,794, filed Jul. 10, 2008; 61/088,666, filed Aug. 13, 2008; 61/104,905, filed Oct. 13, 2008; 61/122,341, filed Dec. 12, 2008; 61/112,342, filed Dec. 12, 2008; 61/122,343, filed Dec. 12, 2008; 61/122,344, filed Dec. 12, 2008; 61/122,345, filed Dec. 12, 2008; 61/122,346, filed Dec. 12, 2008; 61/122,347, filed Dec. 12, 2008; 61/122,348, filed Dec. 12, 2008; 61/122,350, filed Dec. 12, 2008; 61/122,351, filed Dec. 12, 2008; 61/122,352, filed Dec. 12, 2008; 61/122,354, filed Dec. 12, 2008; 61/122,355, filed Dec. 12, 2008; 61/122,357, filed Dec. 13, 2008; 61/122,358, filed Dec. 13, 2008; 61/156,388, filed Feb. 27, 2009; 61/156,394, filed Feb. 27, 2009; 61/164,031, filed Mar. 27, 2009 and 61/122,214, filed Jun. 29, 2009; and is a continuation-in-part of PCT/US2009/061109, filed Oct. 16, 2009, which is a continuation-in-part of PCT/US2009/060929, filed Oct. 16, 2009, which is a continuation-in-part of PCT/US2009/06927, filed Oct. 15, 2009 which is a continuation-in-part of PCT/2009/060924, filed Oct. 15, 2009 which is a continuation-in-part of U.S. patent application Ser. No. 12/424,533, filed Apr. 15, 2009, all of which are incorporated by reference, in their entireties.

BACKGROUND OF THE INVENTION

1. Field of the Invention

This invention is related to discrimination membranes, such as thin film composite (TFC) or similar membranes—such as hybrid TFC membranes with nanoparticle additives—including at least one additive which forms halamine compounds when exposed to a halogen such as nitrogen and/or nitrogen releasing containing compounds—and/or other additives including alkaline earth metals, mhTMC and selected other elements, and more particularly to such membranes useful for reverse or forward osmosis, for example to purify water.

2. Background of the Invention

Reverse osmosis membranes, made by interfacial polymerization of a monomer in a nonpolar (e.g. organic) phase together with a monomer in a polar (e.g. aqueous) phase on a porous support membrane are known as TFC membranes and are used where flux and substantial rejection characteristics are required, for example in the purification of water. Various materials have been added to TFC membranes in the hopes of increasing flux without reducing rejection characteristics and have met with limited success. In addition, such membranes are subject to fouling resulting in reduced flux as contaminants, for example from the brackish or seawater to be purified, are believed to build up on the surface of the discrimination layer of the TFC membrane.

TFC membranes became available in about the 1970's and proved commercially successful for some RO tasks. Substantial further development has been done to improve the membranes operational characteristics, including permeability or flux, rejection and fouling resistance.

As shown for example in Chau U.S. Pat. No. 4,950,404, in the late 1980's, a polar aprotic solvent was said to be added to the aqueous solution prior to contacting with an acid halide solution for interfacial polymerization to enhance the operational characteristics of the resultant membrane.

As shown for example in Hirose, U.S. Pat. No. 5,989,426, in the mid 1990's, selected alcohols, ethers, ketones, esters, halogenated hydrocarbons, nitrogen-containing compounds and sulfur-containing compounds were said to be added prior to interfacial polymerization to improve membrane characteristics.

As shown for example in Costa, U.S. Pat. No. 5,693,227, in the mid 1990's, catalysts were said to be added to the aqueous phase to accelerate interfacial polymerization, producing TFC membranes with a smoother surface.

As shown for example in Mickols, U.S. Pat. No. 6,562,266, in about 2000, compounds including phosphorous or other materials were said to be added as a complexing agent to acyl halide before interfacial polymerization. A detectable quantity of the added material was said to be retained in the discrimination membrane as a result of the formation of a complex between the added material and the acyl halide.

The many, and varied, proposed formulations for TFC membranes in some instances have different membrane operational characteristics (such as flux, rejection, and fouling resistance) that make them more suitable for different tasks. These tasks are typically defined by the incoming water quality, plant design, and required product water quality, which together set the operational conditions of the plant (such as required applied pressure). For example, membranes for use in purifying brackish water are conventionally expected to encounter a substantially lower salinity—and be operated at substantially lower pressure—than a membrane useful for seawater desalination.

A typical specification for a TFC membrane used for brackish water RO may require a minimum flux of at least 20 GFD (gallons per square foot per day of filtered liquid) with a minimum of 99.5% salt rejection when operated at a working pressure of about 220 psi on brackish water having an expected salinity of about 2000 ppm (parts per million) or less. On the other hand, a typical specification for TFC membranes to be used for seawater RO may require a minimum flux of 20 GFD with a minimum of 99.5% salt rejection when operated at a working pressure of about 800 psi on seawater having an expected salinity of 32000 ppm or more.

TFC membranes suitable for brackish water use, i.e., at low pressure and salt load, will typically not operate well, when operated at the higher pressure and salinity used for seawater purification. There is no clear cut way to predict their performance under the salinity and operating conditions used for seawater exactly, however it can be said that such membranes typically lose permeability and salt rejection ability as the salinity increases.

As an example, Mickols in example 35 discloses the use of a particular phosphorus compound additive which is said to produce a TFC membrane having membrane operation characteristics, including 19.5 GFD and 99.6% rejection when operated at 150 psi with salinity of 2000 ppm. Although these characteristics may be suitable for reverse osmosis of brackish water, there is no reasonable way to predict how to use such information in the formulation of a TFC membrane suitable for use under the conditions required for in seawater osmosis other than by preparing and testing it.

Based on publicly available information, TFC membranes having membrane properties suitable for reverse osmosis of seawater are conventionally made without the various additives discussed in the prior art, presumably because such additives tend to have deleterious action on TFC membranes rejection.

One common problem with conventional TFC membranes designed for seawater desalination, is quality control and variability in product performance. That is, it is believed that fabricating TFC membranes with predictable flux, rejection and fouling resistance for seawater RO has been so difficult, that fabrication facilities are in some cases unable to prepare a specific product, or need to shift a product's formulation in order to maintain the required membrane properties.

Recently, as disclosed in Hoek et al., WO 2006/098872, WO 2008/057842, and US 2008/0237126, UCLA's Nanomaterials & Membrane Technology Research Laboratory determined that the addition of certain nanoparticles, such as LTA, and other materials could be used to improve TFC membrane operational characteristics at operating pressures, and expected salinities suitable for use in reverse osmosis of seawater.

The use of chlorine as a biostatic agent in water supplies is well known. Conventional RO membranes, however, are typically unstable to chlorine and after exposure to fairly low doses of chlorine in the feed water are often chemically degraded, compromising the membrane's ability to reject impurities. RO membranes are believed to be damaged by chlorine exposure through chemical reaction either at terminal amine groups, or the amide groups making up part of the polymer backbone, of the discrimination layer. As a result, conventional RO membranes typically have chlorine removed from the feed water in an additional step to prevent the membrane damage from occurring. In addition to the cost of this additional step, the removal of chlorine from the feed water leads to membrane areas where bio-growth can occur. As a result, biological fouling of RO membranes is a pervasive problem limiting the performance of RO systems.

What are needed are techniques for fabricating TFC membranes, in particular TFC membranes, suitable for operation at the higher pressures and salinities required for reverse osmosis of seawater—which have higher flux than is achievable from TFC membranes made without such additives. Such desirable TFC membranes must also have a suitably high salt rejection, preferably on the order of about 99.5%.

What are also needed are techniques for preventing reduced flow resulting from the formation of biofilms on the membrane surface, e.g. fouling, and techniques to avoid or minimize degradation of RO type membranes to chlorine by increasing the chlorine stability of the membranes.

It would also be desirable to have increased fouling resistance—as well as higher flux and high rejection rates—when compared to a TFC membrane made the same way with the same chemistry but without the additives.

Still further, it would be desirable to be able to produce such TFC membranes with predictable characteristics and yield on a continuous basis.

Still further, it would be desirable to be able to produce anti-fouling TFC membranes with biostatic surface characteristics that could be recharged with exposure to chlorine or other halogens.

Still further, it would be desirable to produce TFC membranes for use with chlorinated water which were not as subject to degradation by chlorine as conventional TFC membranes.

Still further, it would be desirable to produce anti-fouling TFC membranes for use with chlorinated water which were not as subject to degradation by chlorine as conventional TFC membranes and preferably make such membranes anti-fouling TFC RO membranes which can be recharged to maintain their resistance their anti-fouling effectiveness.

TFC membranes are also needed with such membrane operational characteristics for many other uses beyond seawater purification, including but not limited to brackish water purification, waste water reuse, ultrapure water generation, industrial water treatment, other RO tasks, forward osmosis and pressure retarded osmosis.

BRIEF DESCRIPTION OF THE DRAWINGS

FIG. 1 is a block diagram illustrating layers used in the process of fabricating TFC membrane 10 in which additives 16 are present in aqueous phase 14.

FIG. 2 is a block diagram illustrating layers used in the process of fabricating TFC membrane 10 in which additives 16 are present in organic phase 18.

FIG. 3 is a block diagram illustrating layers used in the process of fabricating TFC membrane 10 in which additives 16 are present in both aqueous phase 14 and organic phase 18.

FIG. 4 is a block diagram illustrating layers used in the process of fabricating TFC membrane 10 in which additives 16 are present in organic solution 18 and in water solution 15 between porous support membrane 12 and aqueous phase 14.

FIG. 5 is a block diagram showing the use of a TFC membrane, having additives 16 in a layer discrimination layer 24, in a reverse osmosis process.

FIG. 6 is a block diagram showing the operation of TFC membrane 10, in which additives 16 were present during the interfacial polymerization of discrimination layer 24, in a reverse osmosis process.

FIG. 16 is a block diagram of an embodiment of hybrid TFC RO membrane 10 including nitrogen containing anti-fouling layer 52 on discrimination layer 24 with sensor 54 sandwiched there between.

SUMMARY OF THE INVENTION

Figure 7:
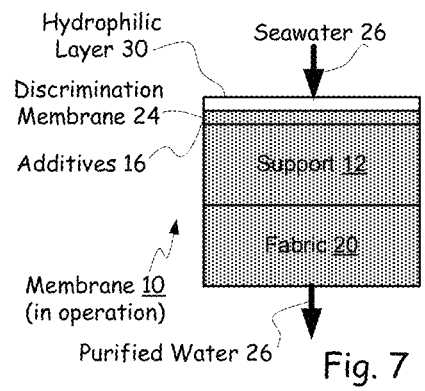
FIG. 7 is a block diagram showing the operation of TFC membrane 10 including hydrophilic layer 30, in which additives 16 were present during the interfacial polymerization of discrimination layer 24 and in the fabrication of support 12 and fabric 10, in a reverse osmosis process

An RO membrane may be provided with an anti-fouling capacity by using a halogen, such as chlorine, to form halamines on the feed stream contact surface of the RO membrane.

Some RO membranes, such as TFC and hybrid TFC RO membranes, are subject to operating degradation from halogens such as chlorine in chlorinated feed water. A halamine forming compound which reacts with halogens to form halamines is provided for at least two distinct purposes. Halogens which may migrate to the discrimination layer, which would be damaged thereby, are converted to halamines. The halamine keeps the halogens from contacting the discrimination layer and thereby protects the discrimination layer. Halamine forming compounds, that is compounds which form halamines when exposed to halogens, include species of nitrogen discussed below and may be described herein as halogen reactive nitrogen or simply reactive nitrogen. Further, an excess of halogen reactive nitrogen or other halamine forming compound which reacts with halogens to form halamines, permits the addition of further halogens to replenish the halamines on the feed stream contact surface which have been sacrificed to the anti-fouling task. Further, the halamine so formed can act as a biocide and prevent biofilm formation on the membrane surface.

As a simple example, an excess of halogen reactive nitrogen may be advantageously employed in and/or on and/or or in front of an RO membrane, such as a hybrid TFC membrane used for purifying chlorinated water. Once charged, that is, once a suitable amount of the excess halogen reactive nitrogen or other halamine forming compound has been exposed to chlorine so that chloramines have been formed therefrom, the chloramines on the feed stream surface of the membrane act as an anti-fouling agent. That is, the chloramines interact with biological contaminates in the feed stream that would otherwise become deposited on the feed stream contact surface as fouling material. As a result, the feed surface may be thereby be protected by both the anti-bacterial activities of the chlorine in the feed stream as well as the chlorine in the chloramines on the feed stream surface of the RO membrane.

The chloramines or other halamines will tend to develop first on the feed stream face of the anti-fouling layer, that is the face of the layer which first encounters the feed stream. The layer of chloramines formed may be able to reduce penetration of the feed stream face of the anti-fouling layer and thereby protect the discrimination layer from damage by the chlorine.

Charging may occur naturally in that the exposure to the chlorine in chlorinated feed stream water may react with the chlorine reactive nitrogen to form the chloramine. It may be preferable to charge the membrane to produce the chloramines by the application of chlorine directly, for example by applying an uncontaminated chlorine containing solution to the feed stream face. Further, because of the excess of halogen reactive nitrogen, charging may be repeated intermittently to add more chlorine to create more chloramines on the feed stream face. This may be called re-charging and may be particularly useful when operating the RO membrane with unchlorinated (or only slightly chlorinated) but biologically contaminated feed stream.

The operating intervals between the original charging and the first re-charging as well as between subsequent recharging may be determined based on predictions or on operating history. It may be advantageous, however, to base the intervals on the detection of the halogen, such as chlorine, as it migrates toward the discrimination layer where it may chemically degrade the discrimination layer by, for example, reducing the rejection effectiveness of the RO membrane to salts in the feed stream. A detector, such as an RFID detector, may be advantageous placed between the feed stream face and the discrimination layer to detect the advance of the chlorine. The detector reading, preferably from a remote sensing detector, may indicate when the chlorine has reached the feed stream face of the discrimination layer—or a predetermined distance therefrom—in order to indicate when recharging is required.

In the anti-fouling coating layer, the excess reactive nitrogen species may be provided in many different forms. For example, the nitrogen species may be added to the organic phase before interfacial polymerization to form the discrimination membrane. As a result, the reactive nitrogen species are typically contained within separate domains or regions within the polymer of the discrimination layer. When properly charged, the halogen reactive nitrogen species may form chloramines at the feed stream face of the discrimination layer which was formed by interfacial polymerization. Under proper conditions, the anti-fouling layer is thereby formed within and/or on the feed stream surface of the discrimination layer.

Alternately, the reactive nitrogen species, or other halamine forming material, may be a component of and/or have been added a coating layer applied to the surface of the discrimination layer. The halamine forming material, such as reactive nitrogen, may be contained within domains as discussed above with regard to the discrimination layer, or may be dispersed throughout the coating layer to form an anti-fouling coating layer.

The anti-fouling layer or coating layer described herein may be advantageously used with chlorinated or unchlorinated feed water to be purified and/or be recharged on a regular or intermittent basis to prolong the life of the RO membrane assembly.

In a first aspect, a method of making an anti-fouling, reverse osmosis (RO) membrane is presented herein which includes forming an RO membrane and forming an anti-fouling layer including halamines between a feed stream and the RO membrane, the anti-fouling layer reducing RO membrane fouling by reacting biological material. such as bacteria, in the feed stream when halamines is present. Reactive nitrogen may be added to the anti-fouling layer in a form which reacts with halogens applied to the RO membrane in order in order to form the halamines. The halogens may be applied to the RO membrane via the feed stream.

The anti-fouling layer may be separately charged with halogens which react with the nitrogen to form the halamine or may be charged with halogens in the feed stream which react to form the halamines with the nitrogen. The anti-fouling layer may be recharged with additional halogens which react to form additional halamines with the nitrogen, before the RO membrane is operationally damaged by the halogen. Recharging may occur when the halogens in the coating layer have been sufficiently diminished to substantially reduce antfouling effectiveness of the anti-fouling layer. Further, recharging may be scheduled to occur when the halamine content in the anti-fouling layer has dropped by a fixed amount.

For example, recharging may be scheduled to occur when the halamine content in the anti-fouling layer has dropped by at least in the range of 10% to 90%, 25% to 75% or about 50% of its value immediately after charging.

A detector, which may be remotely readable, may be positioned between the feed stream and the RO membrane to determine when the halogens have penetrated or are about to penetrate or are in the vicinity of the RO membrane. Recharging may be scheduled to occur in accordance with an output of the remotely readable detector.

Halogen reactive nitrogen species in the anti-fouling layer may be provided in the form of amines, imides, sulfonamides, hydantoin (5,5 disubstituted) or imidazolidin-4-one which reacts with halogens applied to the anti-fouling RO membrane to form the halamines.

Such nitrogen species in the anti-fouling layer may be in the form of distinct regions or domains, such as in nanoparticles, of reactive nitrogen dispersed within another material, the distinct regions of nitrogen reacting with halogens applied to the anti-fouling RO membrane to form the halamines. Alternately the nitrogen species may be dispersed with material may or may not itself also contain nitrogen species.

The anti-fouling layer may be a polymer and may have a polymer backbone with high resistance to halogens. The polymer backbone is preferably stable in a pH range of at least 4 to 11 and more preferably in a pH range of at least 2 to 13. The anti-fouling layer is preferably hydrophilic and may have a permeability to water on the order of the permeability to water of the RO membrane or greater. The anti-fouling layer polymer may have a negative surface charge that is low enough to contribute to the rejection of the applied halogen.

The applied halogen may include hypochlorite ions, or hypochlorous acid.

The anti-fouling layer may be formed by polymerizing monomers on the RO membrane. Polymerizing may be induced thermally, by applying UV light and/or by grafting off of the RO membrane.

The anti-fouling layer may be formed by depositing a nitrogen containing polymer from solution on the RO membrane which may be cross-linked which serves to insolubilize the anti-fouling layer. The RO membrane may be formed by contacting a non-polar monomer solution with a polar monomer solution to interfacially polymerize the monomers in the presence of nanoparticles on a porous support membrane.

The polymer may also be interfacially polymerized in the presence of a second additive—in addition to or in lieu of the nanoparticles—which substantially increases permeability of the RO membrane without substantially reducing rejection of contaminants in the water by the anti-fouling layer. The second additive may include a predetermined amount of added mono-hydrolyzed TMC and/or an alkaline earth metal and/or Al, Ga, Fe, Co, Cu, Sn or Pr and/or a β-diketonate which may include acetylacetonate (acac), or fluorinated derivatives of acetylacetone such as 1,1,1-trifluoro-2,4-diketopentane, or 1,1,1,5,5,5-hexafluoro-2,4-diketopentane.

The RO membrane may be formed by contacting a non-polar monomer solution with a polar monomer solution to interfacially polymerize the monomers on a porous support membrane in the presence of an additive, such as a predetermined amount of added mono-hydrolyzed TMC, an alkaline earth metal, a β-diketonate such as acetylacetonate (acac), an alkaline earth metal and/or Al, Ga, Fe, Co, Cu or P, Sn or Pr which substantially increases permeability of the RO membrane to water without substantially reducing rejection of contaminants in the water by the RO membrane.

In a further aspect, the halogen may be chlorine and the halamine may be chloramine. The feed stream may includes chlorinated water and the nitrogens protect the RO membrane from degradation by the chlorination. At least some of the chlorine may be present in the form of hypochlorite, hypochlorous acid, chloramines and/or chlorine dioxide.

Still further, the thickness and permeability of the anti-fouling layer may be selected to cause halamine formation at the surface of the anti-fouling layer before the RO membrane is degraded by the halogen. An intermediate layer may be positioned between the anti-fouling and the RO membrane so that the thickness and permeability of the anti-fouling and intermediate layer are sufficient to cause halamine formation at the surface of the anti-fouling layer before the RO membrane is degraded by the halogen.

Sufficient nitrogen may be provided in the anti-fouling layer to protect the RO membrane from fouling by the formation of halamines on the surface of the anti-fouling layer adjacent the feed stream, to permit recharging of the anti-fouling layer by the further addition of halogens thereto to form additional halamines and/or to prevent halogen damage to the RO membrane by the halogen during operation after multiple recharging.

An RO membrane formed by the processes described above.

In another aspect, a thin film composite membrane may be made by including a first monomer in a polar liquid, including a second monomer in a non-polar liquid, including a partially hydrolyzed third monomer in the non-polar liquid, and contacting the polar and the non-polar liquids to form a thin film composite (TFC) membrane by interfacial polymerization. The third monomer may or may not be derivable from the second monomer by hydrolysis.

The partially hydrolyzed third monomer may be included in the second monomer before being added to the non-polar liquid and/or the partially hydrolyzed third monomer may be added to the second monomer before being added to the non-polar liquid. The partially hydrolyzed third monomer may be at least partially refined and/or at least a portion of the partially hydrolyzed third monomer may be generated in the non-polar liquid before the interfacial polymerization of the liquids forms the TFC membrane.

The non-polar liquid may include a known concentration of the partially hydrolyzed third monomer before the interfacial polymerization of the liquids forms the TFC membrane. The partially hydrolyzed third monomer may include at least one or at least two functional groups capable of reacting with the second monomer.

The inclusion of insoluble structures in the non-polar liquid resulting from inclusion of the partially hydrolyzed third monomer or the inclusion of impurities associated with the third monomer in the non-polar liquid may be avoided, perhaps by filtering the non-polar liquid after inclusion of the partially hydrolyzed third monomer in the non-polar liquid.

The first and second monomers may be capable of reacting together to form a TFC control membrane by interfacial polymerization if the polar and non-polar liquids are brought into contact before the partially hydrolyzed third monomer is added.

The TFC membrane has a flux for a permeate greater than a first flux for the permeate of the TFC control membrane if so formed. The TFC membrane may a rejection rate for another material in a solute the same or only slightly less than a rejection rate for the another material in the solute of the TFC control membrane if so formed. The rejection rate of the TFC membrane may be less than 1 percent lower than the rejection rate of the TFC control membrane, if so formed.

The TFC membrane may be used for reverse or forward osmosis for example to produce pure water permeate from brackish water or seawater.

The partially hydrolyzed third monomer method may be synthesized and may be mono-hydrolyzed TMC (mhTMC), may include di-hydrolyzed TMC and/or be relatively free of tri-hydrolyzed TMC.

One or more additives may be added to at least one of the liquids before the interfacial polymerization of the liquids forms the TFC membrane to membrane operational characteristics of the TFC membrane. At least one of the additives may include an element selected from Groups 3-15 of the Periodic Table (IUPAC), preferably in the form of a complex and/or be selected from Rows 3-6 of those groups. The additives may be included in a β-diketonate complex, for example an acetylacetonate complex such as a hexafluoroacetylacetonate complex or a trifluoroacetylacetonate complex.

The additives may include an alkaline earth metal in at least one of the liquids before the interfacial polymerization of the liquids forms the TFC membrane and/or an element selected from Groups 3-15 of the Periodic Table (IUPAC), preferably from Rows 3-6. The additives may be in the form of a complex, such as a β-diketonate complex, particularly a hexafluoroacetylacetonate or a trifluoroacetylacetonate complex. At least one of the one or more additives may include aluminum, cadmium, chromium, cobalt, copper, gallium, hafnium, indium, iron, one of the lanthanoid elements, praseodymium, molybdenum, palladium, phosphorous, ruthenium, tin, vanadium, zinc and/or a nanostructured material, such as nanoparticles, preferably a zeolite such as LTA.

The polar liquid monomer may include an amine, such as in MPD and the non-polar liquid monomer may include TMC. The complex may be present in a concentration in one of the liquids of from about 0.005 wt. % to about 5 wt. %, preferably from about 0.05 wt. % to about 1 wt. %. The ratio of MPD in the polar liquid to TMC in the non-polar liquid is below 20 and preferably below 14. The ratio may be low enough so that the TFC membrane has substantially higher flux than the TFC control membrane if formed. The concentration of TMC in the non-polar liquid may be high enough so that the TFC membrane has substantially higher flux than the first membrane, if made.

A TFC membrane may be made in accordance with any of the aspects, alone or in combination, described herein.

In a further aspect, improved techniques for the use of nanoparticles in TFC membranes have been developed including the combined used of nanoparticles and/or nanotubes with alkaline earth metals, monohydrolyzed TMC and/or other molecular additives in hybrid nanocomposite TFC membranes with increased flux, rejection and anti-fouling characteristics.

In another aspect, the new hybrid nanocomposite TFC membranes, together with more advantageous concentrations and ranges of TMC, MPD to TMC ratios as well as the discovery of deflection points in the concentrations of additives, such as monohydrolyzed TMC, make the design and fabrication of engineered nanocomposite TFC membranes with selected flux, rejection and anti-fouling characteristics possible.

In a further aspect, some of the new additives, particularly the alkaline earth metals and monohydrolyzed TMC, may be used for the design and fabrication of high flux, rejection and anti-fouling TFC membranes. These membranes may also advantageously use the advantageous concentrations and ranges of TMC, MPD to TMC ratios and deflection points in the concentrations of additives to provide optimum characteristics for particular circumstances.

A thin film composite membrane may be made by combining two or more additives with either or both a polar liquid having a first monomer therein and a non-polar liquid having a second monomer therein and contacting the polar and non-polar liquids to form a selective membrane by interfacial polymerization, wherein at least one of the two or more additives is a nanostructured additive.

The nanostructured additive may be a zeolite nanoparticle, such as LTA, FAU and/or Zeolite Beta or an organometallic framework complex, such as CuMOF.

One of the additives may includes a predetermined concentration of mono-hydrolyzed TMC and/or di-hydrolyzed TMC in addition to the nanostructured additives. A complex including an alkaline earth metal may also be included in addition to the nanostructured additives and/or a complex including an element selected from Groups 3-15, rows 3-6 of the Periodic Table (IUPAC) may be in addition to the nanostructured additives. These additional additives may include aluminum, cadmium, chromium, cobalt, copper, gallium, hafnium, indium, iron, one of the lanthanoid elements, molybdenum, palladium, phosphorous, ruthenium, tin, vanadium or Zinc.

The polar liquid may include an amine, such as MPD, and the non-polar liquid may include TMC wherein ratio of MPD to TMC is below 14, low enough so that the resultant selective membrane has substantially higher flux than a control membrane. The concentration of TMC may be high enough so that the effect of one or more of the additives, in the resultant selective membrane, is enhanced to produce a substantially higher flux than a control membrane.

Techniques are disclosed including an interfacial polymerization process for preparing a highly permeable RO membrane by contacting a first solution containing 1,3-diaminobenzene, and a second solution containing trimesoyl chloride, to fabricate a highly permeable RO membrane wherein at least one of the solutions contains well dispersed nanoparticles when contacted.

Similarly a first solution containing 1,3-diaminobenzene, and/or a second solution containing trimesoyl chloride, may contain well dispersed nanoparticles and be contacted to form an RO membrane wherein at least 20% of the membrane surface area consists of nanoparticles.

A first solution containing polyamine monomer, and a second solution containing a polyfunctional acyl halide monomer, wherein a molecular additive compound is present in one or both solutions during the polymerization reaction may be used to fabricate a TFC membrane.

Similarly an interfacial polymerization process for preparing a low-fouling highly permeable RO membrane may include contacting on a porous support membrane, a first solution containing a polyamine monomer, and a second solution containing a polyfunctional acyl halide monomer, wherein aluminum ions are present in one or both solutions, during the polymerization reaction.

A low-fouling highly permeable RO membrane may be produced by an interfacial polymerization process by contacting on a porous support membrane, a first solution containing a polyamine monomer, and a second solution containing a polyfunctional acyl halide monomer, wherein aluminum ions are present in one or both solutions during the polymerization reaction.

Another process for preparing a highly permeable RO membrane may include contacting on a porous support membrane, an aqueous solution containing metaphenylenediamine (MPD), and an organic solution containing trimesoyl chloride (TMC) and a hydrolyzed TMC species.

DETAILED DESCRIPTION OF THE PREFERRED EMBODIMENTS

Improved thin film composite or TFC membranes fabricated with additives for enhanced membrane performance are disclosed. Techniques for improving membrane performance include dispersion and sizing of nanostructured additives, processing to enhance the performance of such additives in TFC membranes, selecting and processing such additives 16 to release soluble metal ions and/or adding additional additives 16 to fabricate hybrid TFC membranes.

Hybrid TFC membranes may include the following additives used in various combinations: nanoparticles, nanotubes, alkaline earth metal complexes, mono- and/or di-hydrolyzed TMC and/or other molecular additives such as elements selected from Groups 3-15 of the Periodic Table (IUPAC), particularly from Rows 3-6 of those groups. In some embodiments, TFC membranes may be fabricated without nanostructured additives.

Techniques for fabricating TFC membranes may include specific TMC concentrations and MPD/TMC ratios and selection of concentration or ranges of concentration by detection of deflections points—which may be non-linearities in the growth of flux, or decline in rejections, with increasing additive concentration—especially when such changes occur in both flux growth and rejection decline at the same levels of concentration of the additive(s).

Tables of examples are provided which illustrate these TMC concentrations and MPD/TMC ratios as well as the effects of using various additives in various combinations, in various locations including in the aqueous and/or organic phases contacted to cause interfacial polymerization of the discrimination layer or membrane in the TFC membranes fabricated in accordance with these examples. The tables also illustrate the percentage of flux improvement of many of these TFC membranes compared to similar TFC membranes used as controls which were fabricated in the same way, but without such additives. Finally, these tables illustrate the permeability or flux, and solute rejection rates, of the exemplar membranes. The techniques used in the fabrication and testing of these membranes are also presented along with an outline of some of the advantages of the additives and combinations of additives used in the exemplars.

Section A: Thin Film Composite (TFC) Reverse Osmosis (RO) Membranes

The assignee of this application is the exclusive assignee of various applications and/or patents assigned to the Regents of the University of California related to the use of nanoparticles in TFC membranes to improve membrane performance characteristics and strength. In the course of further developing nanoparticle TFC membranes, we have substantially improved membrane performance by pre-processing nanoparticle additives and altering process conditions including reagent concentrations and ratios. We have also discovered specific additional additives—one or more of which—when combined with nanoparticles and our additive and membrane processing techniques permit substantial further performance and other improvements in nanoparticle TFC membranes. These new additives may also be used in combinations and/or as sole additives.

Referring now generally to FIGS. 1-9, which are not drawn to scale for clarity of the description, FIGS. 1-4 illustrate a first or aqueous 14 phase and a second or organic phase 18 in an exploded view for contact on support membrane 12 during fabrication for interfacial polymerization to form discrimination membrane 24 during the fabrication of TFC membrane 10. One or more additive(s) 16, such as nanostructured materials, may be introduced into the interfacial polymerization between aqueous phase 14 and organic phase 18 before or at the beginning of the interfacial polymerization reaction to improve membrane characteristics.

FIG. 1 indicates that additives 16 has been added to aqueous phase 14. FIG. 2 indicates that additives 16 has been added to organic phase 18. FIG. 3 indicates that additives 16, has been added to both aqueous phase 14 and organic phase 18. The same or different additives 10 may be used in different locations. FIG. 4 indicates that additives 16 has been added to both organic phase 18 as well as water solution 11 on the surface of support 12 before aqueous phase 14 is applied to support 12 followed by organic phase 18. It should be noted that in some embodiments, organic phase 18 may applied to support 12 before aqueous phase 14 is applied to organic phase 18.

FIGS. 5-7 illustrate TFC membranes 10 after fabrication, e.g., by the processes illustrated in FIGS. 1-4. As shown in FIG. 5, after fabrication, membrane 10 includes discrimination layer 24 formed by the interfacial polymerization of aqueous and organic phases 14 and 18 in the presence of one or more additive(s) 16. After fabrication, TFC membrane 10 may conveniently be used for selective filtering, for example as RO TFC membrane 10, to purify saltwater 26—applied under pressure to discrimination layer 24—so that purified water 28 passes through discrimination layer 24, porous support membrane 12 and fabric layer 20, if present.

Referring now in particular to FIG. 6, hydrophilic layer 30, such as a polyvinyl alcohol or PVA layer may be applied to discrimination layer 24 to the surface of membrane 10 in contact with the material to be filtered, e.g., seawater 26, to make that surface and therefore membrane 10 more hydrophilic, that is, to reduce the interfacial tension of the surface of membrane 10. Improved hydrophilicity can be observed as a lower contact angle between seawater 26 and membrane 10. Improving the hydrophilicity of the upper or contact surface of membrane 10 is believed to reduce fouling and may improve flux flow. Seawater 26 may be applied under pressure to TFC membrane 10 to produce purified water 28.

In general, TFC membrane 10 may be synthesized using an interfacial polymerization process on a porous support, such as support membrane 12. Conventionally, two immiscible solvents are used, one in aqueous phase 14 and the other in organic phase 18, so that a monomer in one solvent reacts with a monomer in the other solvent. The interfacial polymerization reaction occurs at the interface between the two solutions when aqueous phase 14 and organic phase 18 are brought into contact with each other, to form a dense polymer matrix layer—discrimination layer 24—on the surface of support membrane 12.

The polymerization reactions are very fast and relatively high molecular weights for the resultant polymer matrix are obtained. Once formed, the dense polymer matrix—which becomes discrimination layer 24—can advantageously act as a barrier to inhibit ongoing contact between the reactants in aqueous and organic phases 14 and 18 to slow the ongoing polymerization reaction. As a result, discrimination layer 24 is formed as a selective dense layer which is typically very thin and permeable to water, but relatively impermeable to dissolved, dispersed, or suspended solids, such as salts to be removed from sea or brackish water to produce purified water. Resultant membrane 10 is conventionally described as a thin film composite (TFC) membrane.

The first monomer can be a dinucleophilic or a polynucleophilic monomer and the second monomer can be a dielectrophilic or a polyelectrophilic monomer. That is, each monomer can have two or more reactive (e.g., nucleophilic or electrophilic) groups. Both nucleophiles and electrophiles are well known in the art, and one of ordinary skill in the art can select suitable monomers for this use. The first and second monomers are conventionally selected to react—when aqueous and organic phases 14 and 18 are brought into contact—by undergoing interfacial polymerization to form a three-dimensional polymer network, often called a polymer matrix.

The first and second monomers can also be chosen to be capable of undergoing a polymerization reaction when aqueous and organic phases 14 and 18 brought into contact to form a polymer product that is capable of subsequent crosslinking by, for example, exposure to heat, light, radiation, or a chemical crosslinking agent.

Regarding aqueous phase 14, the first monomer can be selected to be soluble in a polar liquid, preferably water, to form a polar mixture, referred to herein as aqueous phase 14. Generally, the difunctional or polyfunctional nucleophilic monomer can have primary or secondary amino groups and can be aromatic (e.g., a diaminobenzene, a triaminobenzene, m-phenylenediamine, p-phenylenediamine, 1,3,5-triaminobenzene, 1,3,4-triaminobenzene, 3,5-diaminobenzoic acid, 2,4-diaminotoluene, 2,4-diaminoanisole, and xylylenediamine) or aliphatic (e.g., ethylenediamine, propylenediamine, piperazine, and tris(2-diaminoethyl)amine).

Examples of suitable amine species include primary aromatic amines having two or three amino groups, for example m-phenylenediamine, and secondary aliphatic amines having two amino groups, for example piperazine. The amine can typically be applied to microporous support 12 as a solution in a polar liquid, for example water. The resulting polar mixture typically includes in the range from about 1 to about 6 wt. % amine, preferably in the range of about 2 to about 4.0 wt. %, amine and most preferably about 3.0 wt. % amine. The polar mixture need not be aqueous, but the polar liquid should be immiscible with the apolar liquid. Although water is a preferred solvent, non-aqueous polar solvents can be utilized, such as acetonitrile and dimethylformamide (DMF) for aqueous phase 14.

Phase 14 can be called a polar phase or an aqueous phase because such mixtures typically use water as the polar solvent. We believe most practitioners in this art refer to phase 14 as the aqueous phase. To avoid any confusion, that convention will be followed herein so that the term "aqueous phase" 14 is intended to refer to all polar phase liquids, e.g. whether or not the polar liquid is water.

During interfacial polymerization, aqueous phase 14 may include one of the reactants, additive(s) such as nanostructured materials, e.g., nanoparticle additives 16, as well as processing aids such as surfactants, drying agents, catalysts, coreactants, cosolvents, etc. The polar mixture, aqueous phase 14, is typically applied to microporous support membrane 12 by dipping, immersing, slot die coating, spray coating, gravure coating or other well known techniques. Once coated on porous support membrane 12, excess polar mixture can be optionally removed by evaporation, drainage, air knife, rubber wiper blade, nip roller, sponge, or other devices or processes.

For monomers having sufficient vapor pressure, the monomer can be optionally delivered by vapor deposition from a vapor phase, or by heat, to support membrane 12.

Regarding organic phase 18, the second monomer can be selected to be miscible with an apolar (organic) liquid, the mixture of which is shown in the figures as organic phase 18. Using the same convention discussed above with regard to aqueous phase 14, the typically used term "organic phase" is intended to refer to any appropriate nonpolar mixture, e.g. organic phase 18.

The electrophilic monomer can be aromatic in nature and can contain two or more, for example three, electrophilic groups per molecule. For example, the second monomer can be a trimesoyl halide. For the case of acyl halide electrophilic monomers, acyl chlorides are generally more suitable than the corresponding bromides or iodides because of the relatively lower cost and greater availability.

Suitable polyfunctional acyl halogens include trimesoyl chloride (TMC), trimellitic acid chloride, isophthaloyl chloride, terephthaloyl chloride and similar compounds or blends of suitable acyl halides. As a further example, the second monomer can be a phthaloyl halide.

The polyfunctional acyl halide—e.g., TMC—can be dissolved in the apolar organic liquid, e.g., organic phase 18, in a range of, for example, from about 0.09 to about 1.0 wt. %, preferably from about 0.17 to about 0.3 wt. %. and most preferably in the range of about 0.3 wt. % TMC. Suitable apolar liquids are capable of dissolving the electrophilic monomers (e.g. polyfunctional acyl halides) and which are immiscible with a polar liquid (e.g., water) in aqueous phase 14. In particular, suitable apolar liquids preferably include those which do not pose a threat to the ozone layer and yet are sufficiently safe in terms of their flashpoints and flammability to undergo routine processing without having to undertake extreme precautions.

These include $C_5$-$C_7$ hydrocarbons and higher boiling hydrocarbons, i.e., those with boiling points greater than about 90° C., such as $C_8$-$C_{24}$ hydrocarbons and mixtures thereof, which have more suitable flashpoints than their $C_5$-$C_7$ counterparts, but are less volatile. The apolar mixture—organic phase 18—can typically be applied to contact aqueous phase 14 on microporous support membrane 12 by dipping, immersing, slot die coating, spray coating, gravure coating or other well known techniques. Any excess apolar liquid can be removed by evaporation or mechanical removal. It is often convenient to remove the apolar liquid by evaporation at elevated temperatures, for instance in a drying oven. Preferred ovens include flotation ovens, IR dryers, and laboratory convection or gravity ovens. Control of both web temperature and evaporation rate may be used to alter structure and performance.

Organic phase 18 may also include one of the reactants, one or more additive(s) 16, and processing aids such as catalysts, co-reactants, co-solvents, etc. In some circumstances, organic phase 18 may be applied to support membrane 12 first and aqueous phase 14 may then be applied to contact organic phase 18 on support membrane 12.

Support membrane 12 is typically a polymeric microporous support membrane, which in turn is often supported by non-woven or woven fabrics, such as fabric 20, for mechanical strength. Fabric 20 is preferably a polyester fabric having a basis weight of 60-120 grams per meter or gsm, and a thickness of 50-200 microns. Support membrane 12 may conventionally be made from polysulfone or other suitably porous membranes, such as polyethersulfone, poly(ether sulfone ketone), poly(ether ethyl ketone), poly(phthalazinone ether sulfone ketone), polyacrylonitrile, polypropylene, cellulose acetate, cellulose diacetate, or cellulose triacetate. Microporous support membranes 12 may be 25-100 nm in thickness, preferably about 35 nm to about 75 nm and most preferably about 50 nm in thickness and may have the smallest pores located very near the upper surface. Porosity at the surface may be low, for instance from 5-15% of the total surface area.

Figure 8:
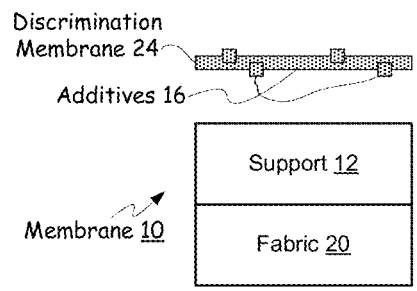
FIG. 8 is an exploded view of membrane 10 in which additives 16, such as nanostructured additives, penetrate the upper and/or lower surfaces of discrimination membrane 24.
Figure 9:
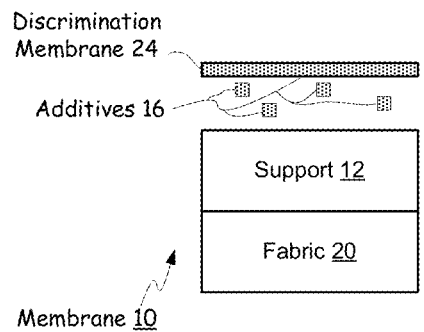
FIG. 9 is an exploded view of membrane 10 in which additives 16, such as nanostructured additives, are between discrimination membrane 24 and support 12.

Referring now to FIGS. 7-9, FIG. 7 indicates that additives 16 were also added to support 12 and/or fabric 20 as well as to the interfacial polymerization of discrimination membrane 10. FIG. 8 is an exploded view of membrane 10 and indicates that at least some of the particles in additive 16, such as nanostructured materials, may pierce the upper and/or lower surfaces of membrane 10. FIG. 9 is an exploded view of membrane 10 and indicates that at least some portions of additive 16, may be at the intersection of discrimination membrane 24 and support 12 of membrane 10.

Figure 10:
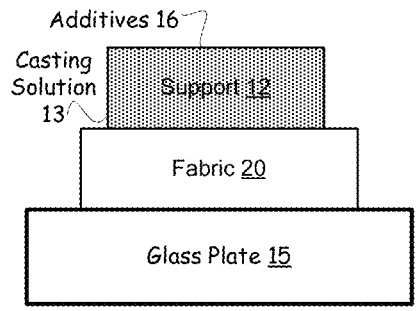
FIG. 10 is a diagrammatic view of support membrane 12 during fabrication in which casting solution 13, including additives 16 such as nanoparticle additives, is coated on fabric 20 on glass plate 15.

Referring now to FIG. 10, the preparation of support membrane 12 may begin, for example in a laboratory setting, with the addition of dimethylformamide (DMF) solvent (available from Acros Organics, USA) to a polysulfone polymer (such as Mn 26,000 available from Aldrich, USA) in transparent bead form in airtight glass bottles. Alternatively, N-methylpyrrolidone (NMP) may be used as the solvent. Additive(s) 16 may be dispersed in the DMF before the DMF is added to the polysulfone polymer as discussed below in greater detail. The solution may then be agitated for several hours until complete dissolution is achieved, forming the dope or casting solution 13.

Casting solution 13 may then be cast or spread over nonwoven fabric 20 attached to glass plate 15 via a knife-edge. Glass plate 15 may then be immediately immersed into demineralized water, which had preferably been maintained at the desired temperature. Immediately, phase inversion begins and after several minutes, non-woven support fabric 20 supporting polysulfone membrane 12 may be separated from glass plate 15. Membrane 12 is then washed thoroughly with deionized water and stored in cold conditions until used. In a continuous coating process, glass plate 15 would not be required.

The presence of one or more additive(s) 16, such as nanoparticle additives, during the during the interfacial polymerization of discrimination membrane 24 may substantially improve the performance—for example by increasing the flux and/or resistance to fouling while maintaining a suitable rejection level—of TFC membrane 10 for a particular task such as purifying seawater by reverse osmosis to produce drinking water.

Additive(s) 16 may be introduced into the interfacial polymerization reaction by adding them to aqueous phase 14, organic phase 18, water solution 11, support membrane 12 and/or other by any other convenient mechanism. For example, additives 16 may be added to aqueous phase 14, organic phase 18 or both before these phases are put in contact with each other to begin the interfacial polymerization.

For example, in a preferred embodiment of TFC membrane 10, a relatively insoluble additive such as LTA nanoparticle additive 16 may be advantageously combined with one or more other additives 16, such as alkaline earth metals, mhTMC, soluble metal species and/or other additives 16, e.g., from Groups 3-15 of the periodic table, which in the presence of the interfacial polymerization provide substantially improved membrane characteristics such as increased flux at high rejection as shown and discussed below for example in the tables of examples.

Section B: Specific Additive(s) 16 and Combinations Thereof

Referring now generally to the figures and tables, the introduction of one or more of the nanoparticle additives 16 into the interfacial polymerization between aqueous and organic phases 14 and 18 may provide substantially superior TFC membranes 10 for many selective filtering uses such forward osmosis (FO) and reverse osmosis (RO) for use, for example, in the purification of brackish water and seawater. Such TFC membranes 10 may have improved flux performance and/or fouling resistance and retain suitably high rejection characteristics for various tasks.

Further, we have discovered that nanostructured additives 16 such as nanoparticles, when combined with additional additives as discussed below, may even further improve membrane flux and/or resistance to fouling. We have also discovered that combinations of nanoparticles with more than one other additive may still further enhance membrane characteristics.

Various additives including nanoparticles and nanotubes in combination with alkaline earth metals, mhTMC, and selected other elements often in a complex with other materials have been tested as shown in the tables of examples below. In addition to alkaline earth metals, some other metallic species such as gold, silver, copper, zinc, titanium, iron, aluminum, zirconium, indium, tin, or an alloy thereof or an oxide thereof or a mixture thereof or a complex containing may be used as additives in addition to nanoparticle additives16. A nonmetallic species such as $Si_3N_4$, SiC, BN, $B_4C$, or an alloy thereof or a mixture thereof as well as a carbon-based species such as TiC, graphite, carbon glass, a carbon cluster of at least $C_2$, buckminsterfullerene, a higher fullerene, a carbon nanotube, a carbon nanoparticle, or a mixture thereof may also be useful.

Still further, we were further surprised and pleased to discover that many of these additives are suitable for use even without nanoparticles, either alone or in various combinations with each other e.g., as shown below in the tables of examples.

B.1. Nanostructured Additives 16

A. Nanoparticles

As shown in the figures and tables below, nanoparticles—or other nanostructured materials such as nanotubes and metal organic frameworks (MOF)—useful as additives 16 may include, but are not limited to:

Linde Type A (LTA) zeolites available freeze dried, 100 nm diameter from Nanoscape AG, Am Klopferspitz 19, D-82152 Planegg, Germany, Linde Type Y (FAU) zeolites as described in MICROPOROUS AND MESOPOROUS MATERIALS Volume: 59 Issue: 1 Pages: 13-28 Published: Apr. 18 2003 by Holmberg B A, Wang H T, Norbeck J M, Yan Y S, Zeolite Beta as described in MICROPOROUS AND MESOPOROUS MATERIALS Volume: 25 Issue: 1-3 Pages: 59-74 Published: Dec. 9 1998 by Camblor M A, Corma A, Valencia S), and Cu MOF: A metal organic framework complex prepared from Cu and trimesic acid as described in Science 283, 1148 (1999); Stephen S.-Y. Chui, et al. "[Cu3(TMA)2(H2O)3]n A Chemically Functionalizable Nanoporous Material".

Nanostructured additives 16 may be especially beneficial when used in combination. Relatively insoluble nanostructured additives 16 may be used in combination with one or more additional additives 16 to form what may be called a "hybrid" TFC membrane 10. Nanostructured additives 16 may be considered to be relatively insoluble because, although primarily insoluble, we have discovered that some nanostructured additives may release a small amount of soluble metal ions into solution.

Conventional nanoparticle additives release only on the order of a few parts per million of the soluble metal or other species in solution as shown in the tables of examples below. These small amounts of soluble species are not typically sufficient, by themselves, to provide the benefits of the desired substantially improved membrane operational characteristics. We have discovered, however, that when certain other additives are also present in addition to the nanoparticle additives, such as the same or certain different soluble species, the desired membrane characteristics may be achieved.

One of the other additives which—when combined in appropriate quantities with a nanostructured additive—produces the desired characteristics is mhTMC, one of the forms of hydrolyzed TMC that is sometimes present in commercial TMC. Conventionally, impure TMC has been intentionally avoided in the fabrication of TFC membranes, that is, the purity of the TMC is conventionally thought to be of great importance. However, we expect that commercial TMC is not always as pure as promised by the vendors. We have discovered that TFC membranes made with such a controlled amount of some of these impurities may produce substantially better flux characteristics. In particular, we have successfully used mhTMC as an additive in combination with nanoparticles to achieve membrane performance that conventional techniques have not been able to provide.

As described below, especially with regard to the tables of examples, such other additives in addition to mhTMC—useful with nanostructured additives to produce a hybrid TFC membrane with improved operating characteristics—include alkaline earth metal complexes and selected other elemental complexes.

Aluminosilicate zeolites with a Si:Al ratio less than 1.5:1 may also be useful as nanostructured nanoparticle additives 16, especially if desired for their release of Al species in solution as part of additive 16. Mordenite and ferrierite are examples of zeolites with calcium or magnesium exchangeable counterions that may be useful as nanoparticle additives 16, especially if desired for their release of alkaline earth metal species in solution.

B. Particle Size

The particle size of additives 16 for relatively insoluble additives—such as nanoparticle additives 16—may conveniently be described in terms of average hydrodynamic diameter, assuming a spherical shape of the particles. Selected nanoparticle or other additives 16 can have an average hydrodynamic diameter of from about 10 nm to about 1000 nm, from about 12 nm to about 500 nm, and most preferably from about 50 nm to about 300 nm.

Inclusion of suitable relatively insoluble additives 16 (e.g. additives having optimized size, shape, porosity, and/or surface chemistry) appropriate process and preparation techniques, can lead to well dispersed additive solutions which may result in the inclusion of a larger number of additives 16 in the final interfacially polymerized membrane being prepared.

C. Dispersion

Relatively insoluble additives, such as nanoparticle additives 16, can exist either as isolated and individual species or as building blocks incorporated in larger aggregate structures when in solution. These aggregate structures can be fairly stable and unchanging such as those formed during synthesis (for instance during calcination of zeolites) or they can be transient structures arising from thermodynamics of the additives and solution. Well-dispersed solutions, that is solutions in which additives 16 are well-dispersed, primarily contain isolated and individual particles rather than aggregate structures of such particles. In particular, it may be preferable to use a solution containing primarily isolated and individual particles and very few larger structures such as aggregates. In this manner the largest number of isolated particles can be incorporated within the final membrane and/or serve to optimize the structure of the membrane.

It can therefore be helpful, to aid in the dispersion of nanostructured additives 16, to use particles of a tighter size distribution by controlling what may be called polydispersity. Polydispersity can be calculated by dividing the volume average particle diameter by the number average particle diameter. A polydispersity approaching 1 indicates a tight range of sizes, while a bigger number indicates a larger range of sizes. Preferred polydispersities are preferably in the range of about 1 to 20, and most preferably in the range of about 1 to 3.

One means of doing this is through the use of a centrifuge. In a centrifuge, particles of larger mass have a faster settling velocity and form sediment at the bottom of a container while the remaining particles stay in solution. By removing the remaining liquid or the sediment both a different size and polydispersity can be obtained, e.g. particles having a smaller average size and as well as a smaller range of sizes.

Another method of improving polydispersity is through the use of microfluidization. For example, using sonication alone on sample of 100 nm LTA, may lead to a dispersion with a polydispersity of 62.4, while use of sonication followed by microfluidization using a Microfluidizer® process and centrifugation may lead to a polydispersity of 1.7. A separate sample of 400 nm LTA after sonication and microfluidization had a polydispersity of 1.53. Microfluidizer® is a trademark of Microfluidics Corp. of Newton, Mass.

D. Nanotubes

When nanotube additives 16 are provided in the presence of the interfacial polymerization reaction, it may be preferable to include surfactants such as: alkyl poly(ethylene oxide), copolymers of poly(ethylene oxide) and poly(propylene oxide) (commercially called Poloxamers or Poloxamines), alkyl polyglucosides including octyl glucoside or decyl maltoside, fatty alcohols including cetyl alcohol or oleyl alcohol, cocamide MEA, or cocamide DEA, to help disperse the nanotubes. These may also be chosen so as to help align nanotube additives 16 in a specific arrangement. It will be obvious to one skilled in the art to use other nonionic, cationic, anionic, or zwitterionic surfactants to aid in dispersing or aligning the nanotubes, or other relatively insoluble additives 16.

Nanotube additives 16 may be carbon nanotubes and/or may be made of FeC, titanic, $WS_2$, $MoS_2$, boron nitride, silicon, Cu, Bi, ZnO, GaN, $In_2O_3$, vanadium oxide, or manganese oxide. When carbon nanotube additives 16 are used they may be single or multiwall, and may have a functionalized surface including derivitization with alcohol or carboxylic acid groups. Nanotube length may be from 100 nm up to 50 microns, more preferably 100 nm to 2 microns, and more preferably 0.5 microns to 2 microns. Nanotube diameter may be less than 50 nm, preferably less than 25 nm and more preferably from 1-2 nm. Nanotube additives 16 may be thoroughly rinsed, or used as is. When used as is, trace impurities may be present including unreacted carbon precursors and/or carbon in other phases, oxidized materials, nanotube synthesis materials such as cobalt containing compounds, and/or other impurities. Nanotube additives 16 may also be processed before use to make them more beneficial for use in TFC membrane 10. For instance, laser ablation or treatment with a strong acid can be used to shorten the average length of the nanotubes. Ultra-high pressure homogenization, for instance by a Microfluidizer® process, may be used to break up nanotube bundles and to shorten average nanotube length.

In some instances it may be preferred to align nanotube additives 16 within discrimination membrane 24. For example in some instances, it may preferred to align nanotube additives 16 normal to the superficial membrane surface. This can be used for example in situations where transport occurs through the interior of the nanotube and the smallest length of nanotube is desired to minimize resistance to transport. This can be accomplished by utilizing a magnetic catalyst that is incorporated with at least some, and preferably a plurality, of each of the nanotubes of nanotube additives 16. In this case, a magnetic field may be used during the interfacial polymerization to then trap nanotube additives 16 in this configuration. In a similar manner, surfactants may be used to align nanotube additives 16, particularly when used in aqueous phase 14. Suitable surfactants include: alkyl poly(ethylene oxide), copolymers of poly(ethylene oxide) and poly(propylene oxide) (commercially called Poloxamers or Poloxamines), alkyl polyglucosides including octyl glucoside or decyl maltoside, fatty alcohols including cetyl alcohol or oleyl alcohol, cocamide MEA, or cocamide DEA. It may also be possible to use other nonionic, cationic, anionic, or zwitterionic surfactants to aid in aligning the nanoparticles.

In other instances, the preferred alignment may be in the plane of membrane 10. This allows much longer nanotube additives 16 to be used that can impart improved mechanical properties to TFC membrane 10. To accomplish this, shear may be applied to the coating solution, for instance by application of the aqueous or organic phases 18 and 14 by a slot die coating method, or a dip coating process. Nanotube additives 16 may be aligned by this method in either the aqueous or organic solution.

TFC membranes 10 containing nanotube additives 16 can also have surprising biocidal activity. It appears, in some instances, that partially exposed nanotube additives 16 may be able to pierce, cut or otherwise interfere with the cell walls of microorganisms leading to cell death. In this way, the surface of TFC membrane 10 may exhibit antimicrobial activity.

B.2 Alkaline Earth Metal Additives 16

As shown in the tables below—although to our knowledge, alkaline earth metals have not been used as additives in TFC membranes and were not expected to work—we surprisingly found that alkaline earth metal additives would in fact work extremely well at increasing membrane operational characteristics, e.g., permeability. In particular, alkaline earth metal additives 16, preferably magnesium (Mg), calcium (Ca), strontium (Sr) and/or beryllium (Be) typically in connection with a complex—e.g., β-diketonate complexes such as acetylacetonate (acac)—have surprisingly proven very useful as additives 16 to increase flux of resultant TFC membrane 10. Alkaline earth metals as a group provide other advantages because they can be safe, abundant, low cost, and easy to use in processing. Members of this group—including magnesium, calcium, and strontium—are also environmentally benign and can be available as counter ions from zeolite nanoparticles.

B.3 mhTMC Additive 16

We have discovered that the presence of mhTMC during interfacial polymerization has a strongly beneficial effect on membrane performance, especially by increasing flux, and that the presence of di-hydrolyzed TMC may also provide some benefits, especially in reduced concentration. Tri-hydrolyzed TMC, trimesic acid, may also be present in commercial batches of TMC, but it is believed not to be soluble in at least most formulations used in the fabrication of TMC membranes and therefore is typically not involved in the interfacial polymerization process. The effect of tri-hydrolyzed TMC on interfacial polymerization of TFC membranes, if any, is not currently known.

Figure 11:
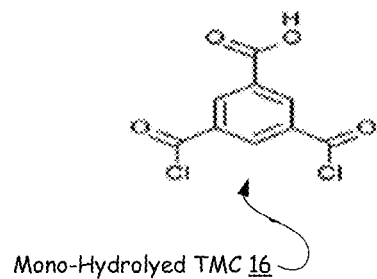
FIG. 11 is the chemical structure of mono-hydrolyzed or mhTMC.

Referring now to FIG. 11, monohydrolyzed trimesoyl chloride—that is, mhTMC—is illustrated in a conventional manner. This form of hydrolyzed TMC may be used directly as additive 16 and/or by the inclusion of partially hydrolyzed TMC in organic phase 18, or both, especially if care is taken to remove or otherwise limit the involvement of di- and/or tri-hydrolyzed TMC species by, for example, filtering organic phase 18 to selectively remove at least some of the aggregate structures formed thereby. In the figure, mhTMC is illustrated as a molecule of TMC in which one of the —Cl bonded groups has been replaced with a bonded OH group.

Although conventionally it has been believed to be important to use relatively pure TMC in the fabrication of TFC membranes, we have discovered that it may be beneficial to have a small amount of mono-hydrolyzed TMC (1-carboxy-3,5-dichloroformylbenzene or mhTMC) or di-hydrolyzed TMC (1,3-dicarboxy-5-chloroformylbenzene) present, e.g., in organic phase layer 18, during the interfacial polymerization reaction. The ratio of mono and/or di-hydrolyzed TMC to TMC, e.g., in the organic phase layer 18, may preferably be in the range of on the order of about 1.0/100 to 100/100, more preferably from 1.667/100 to 33/100, and most preferably about 1.5/100 to 5/100. Further, the concentration of mhTMC in a mixture of mono- and di-hydrolyzed TMC used as additive 16 is preferably greater than 25%, more preferably at least 75% and most preferably near 100%.

To alter performance or solubility, a salt of mhTMC additive 16 may be used in place of the acid form. Preferred salts may be those formed from substituted amines such as di-, tri-, or tetra-methyl, ethyl, propyl, or butyl derivatives.

In addition to mhTMC additives, other partially hydrolyzed reactants and/or additives 16 based thereon may also be effective at improving flux. For example, monohydrolyzed versions of 1,2,4-benzenetricarbonyl trichloride; 1,2,3-benzenetricarbonyl trichloride; and tricarbonyl chloride substituted naphthalene, anthracene, phenanthrene, biphenyl, or other aromatic rings may be used. Tricarbonyl chloride substituted cycloaliphatic rings, or bicycloaliphatics are also included. Carbonyl chlorides of higher substitution than three may also be di- or higher hydrolyzed, as long as at least 2 carbonyl chloride groups remain allowing polymerization to occur. Nonhydrolyzed variants of these additives may also be used as the reactant in organic phase 18.

Preferred concentrations of mhTMC additive 16 are in the ranges from about 0.0025% to 0.1 wt. % and more preferred from 0.005% to 0.1% by wt. %, in organic layer 18. Preferred TMC/mhTMC ratios in organic phase 18 are preferably in the range of less than about 50:1, more preferably less than about 25:1, more preferably less than about 15:1 and most preferably less than about 1:1.

It may also be beneficial to sonicate the solution. Sonication may serve to better disperse mhTMC additive 16 in organic solution 18. Sonication may also serve to drive reactions that would otherwise require higher temperatures, catalysts, or initiators to occur. It may also be useful to use cosolvents to better solvate the mhTMC additive. Preferred cosolvents are those that are able to form clear solutions of the mhTMC before dilution. Particularly preferred are aromatic solvents including benzene, toluene, xylene, mesitylene, or ethyl benzene. These cosolvents are preferably used at sufficiently low concentration to not negatively affect membrane formation or performance.

B.4 Selected Other Additives 16

Other suitable additives 16, may include one or more of the transition metals or other inorganic additives—alone or in combination with nanostructured materials, alkaline earth metals or inorganic additives including hydrolyzed additives such as mhTMC—that are present as an at least partially soluble compound containing a central atom having a Pauling electronegativity of less than about 2.5. Although there have been some published attempts to use some of these additives in TFC membranes, these prior attempts have generally been relatively ineffective at increasing membrane permeability.

We have found, however, that by adjusting the concentration of the reagents used to prepare TFC membrane 10 to specific ranges not previously identified, many of these alternate additives 16 can be made to work substantially more efficiently. More specifically, the concentration of TMC has been found to be very important in controlling the effectiveness of many of these alternate additives 16. Using concentrations of TMC 50% to 500% higher than commonly used in the industry (for example 0.1%) results in at least some of these alternate additives 16 giving a significantly larger increase in flux.

In general, in our work, we have discovered suitable alternate additives 16 that can advantageous be used in fabricating membranes 10 prepared in accordance with the concentration ranges of additives and reagents presented herein. In addition to the nanostructured materials, alkaline earth metals and mhTMC discussed above, we have successfully used other additives 16 in which the ligand is bound to an element selected from Groups 3-15 of the Periodic Table (IUPAC), particularly from Rows 3-6 of those groups.

As shown in the tables below, suitable alternate additives 16, typically in a complex, e.g., with a β-diketonate such as acetylacetonate (acac), include aluminum (Al), cadmium (Cd), chromium (Cr), cobalt (Co), copper (Cu), gallium (Ga), hafnium (Hf), indium (In), iron (Fe), at least some of the lanthanoid (Ln) elements,—e.g., praseodymium (Pd), erbium (Er) and ytterbium (Yb)—, molybdenum (Mo), palladium (Pd), phosphorous (P), ruthenium (Ru), Tin (Sn), vanadium (V), and Zinc (Zn).

B.5 Additive Characteristics

Generally preferred concentrations of additive(s) 16 are from 0.005 wt. % to 5 wt. % by wt. % or more preferred from 0.05 wt. % to 1 wt. % in either aqueous layer 14 or organic layer 18—or both.

In addition, concentration ranges for groups of additive(s) 16 also include from the lowest concentrations—plus or minus 20%—to the highest concentrations—plus or minus 20%—listed in the tables for groups of the same or similar examples where the increased flux is at least 25% and/or the rejection is at least 90%. In addition, concentration ranges for groups of additive(s) 16 also include from the lowest concentrations—plus or minus 20%—to the highest concentrations—plus or minus 20%—listed in the tables for groups of the same or similar examples where the increased flux is at least 25% and/or the rejection is at least 90%.

Sonication may also serve to drive reactions that would otherwise require higher temperatures, catalysts, or initiators to occur. It may also be useful to apply cosolvents to better solvate the metal complex. Preferred cosolvents are those that are able to form clear solutions of the additives 16 before dilution. Particularly preferred are aromatic solvents including benzene, toluene, xylene, mesitylene, or ethyl benzene. These cosolvents are preferably used at sufficiently low concentration to not negatively affect membrane performance.

Suitable additives 16, in addition to nanoparticles or nanotubes, may include salts or compounds that are dissolvable to some extent in either aqueous phase layer 14 or organic phase layer 18 or both to make available the selected elements such as alkaline earth metals, mhTMC or the selected elements from Groups 3-15 of the Periodic Table (IUPAC) available during interfacial polymerization. Different species may be dissolved in aqueous phase layer 14 and in organic phase layer 18. Additives 16 may be added in a soluble form or as part of a complex, for example, with a β-diketonate such as an acetoacetonate, e.g. acac complex. To improve effectiveness and solubility, the β-diketonate may also be fluorinated for instance in hexafluoroacetylacetonate, or trifluoroacetylacetonate, or may include longer aliphatic chains such as in 2,2,6,6-tetramethyl-3,5-heptanedionate. Other examples of appropriate β-diketonates are well known in the art.

B.6 Post-Fabrication Analysis

As noted above, one or more additives 16 may be added during fabrication of membrane 10 by preferably being dispersed into aqueous phase 14 and/or organic phase 18 so that the one or more additives 16 present during the interfacial polymerization beneficially alter the polymer structure of the resultant discrimination membrane 24. However, fabrication analysis of this TFC membrane 10, particularly of discrimination membrane 24 therein, may not be a reliable measure of the concentration or even existence of some additives 16 used in the fabrication of membrane 10.

Some additives 16—such as nanostructured additives including LTA and other zeolites and nanotubes—are not particularly if at all soluble in aqueous phase 14 or organic phase 18 and are easily detected in the resultant membrane 10, typically in discrimination membrane 24. These additives may be considered detectable additives 16.

Alkaline earth metal—and other additive materials discussed herein—may be present during the interfacial polymerization whether added in the form of a complex, e.g., with acetylacetonate, or in a salt or other compound soluble in aqueous or organic phases 14 or 18. Further, these additives may be added by other means, such as in some other solvent or mechanism which makes the additive available during the interfacial polymerization process. As shown for example in examples 2-20 of the tables of examples included herein below, alkaline earth metals may be added to organic phase 18 as additive(s) 16 in the form, for example, of $Sr(F_6acac_2)$, $Ca(F_6acac)_2$, $Mg(F_6acac)_2$ or $Be(F_6acac)_2$.

These alkaline earth additives may therefore be considered to include Sr, Ca, Mg or Be additive 16 as well as, or as part of an ($F_6$acac) or other acetylacetonate additive 16. However, such—perhaps relatively more soluble—additives 16 are often not present in membrane 10 at clearly detectable levels after fabrication. Although the reason is not clearly understood, it is believed that the presence of such undetectable additives 16 during fabrication alters the resultant polymer structure of discrimination membrane 10. However, the undetectable additive 16 material may be at least partially washed away and/or partially otherwise rendered undetectable (or both) during fabrication processing after effecting the polymer, perhaps in the one or more washing steps.

The test results which indicate that TFC membranes 10 fabricated with nanoparticle additives 16 are more efficacious in resisting or reducing fouling strongly suggests that the presence of a detectable additive 16—e.g., an additive 16 as discussed herein which is substantially retained in discrimination membrane 24, may be at least a major factor in the improvement of fouling resistance from nanoparticle additives 16, at least for membranes 10 fabricated in accordance with the processing steps and ranges described herein.

In any event, post fabrication analysis may not accurately determine the concentration—or even the presence—of some of the additives 16 and may not be useful for fabrication or quality control purposes. For example, as shown in Table 2 nanostructured materials such as nanoparticles may be combined with many types of other additives 16 including the alkaline earth metals discussed above and/or mhTMC, another undetectable additive. Post-fabrication analysis of membranes 10 formed with such additives will likely detect the presence of the LTA additive 16 while not indicating the actual concentration—or likely not even detecting the presence—of the alkaline earth metal, acetylacetonate, mhTMC additives or another undetectable additive.

Similarly, when a zeolite or other nanostructured additive 16—such as LTA—is selected and pre-processed in accordance with techniques disclosed herein and used as an additive in the fabrication of a membrane 10, the nanostructured additive may release an additional additive, such as a soluble metal species.

For example, as shown in examples 2-4, 57-60 and 63-65, a soluble metal ion such as Al (or Ga) may be a useful additive 16 when added for example as sodium aluminate, aluminum chloride, aluminum citrate, in a complex with acac or when released for example from LTA and/or both as long as it is present in an appropriate concentration during the interfacial polymerization process. In the example of the membrane 10 above fabricated with additives 16 including LTA, an alkaline earth metal complex and mhTMC, only the LTA may be present in detectable quantities after fabrication. If any of the other additives 16 are detected at all, the detected concentration may well be inaccurate, typically much lower than actually used.

The only currently available technique we are aware of for determining the presence and concentration of the so-called "undetectable additives 16" in a TFC membrane is by comparison of flux and rejection characteristics of a membrane 10 made with such additives with an appropriate control membrane, made the same way, but without the inclusion of such additives.

In the tables of examples, the column heading "% Imp." represents the percentage flux increase of membrane 10 made with additives 16 over the same membrane 10 made without additives. Test procedures—such as the use of high purity TMC in organic phase 18—were used to minimize the effects, if any, of impurities acting as additives.

In examples 2-83, example 1 represents the control membrane. Fabrication according to example 28 produced an exemplar membrane 10 using 4% MPD and 0.30% TMC. The recorded ratio of MPD to TMC, on a wt % to wt % percentage basis, is 4/0.3=13.33 and is recorded in the column headed "MPD/TMC Ratio". In example 28, 0.05% LTA was added to aqueous phase 14 and 0.058% $Sr(F_6acac)_2$ was added to organic phase 18 as additives 16 and is recorded in the columns headed "Aqueous 14 Additive 16" and "Organic 18 Additive 16". In this fabrication, no nanostructured material was added as additive 16 to organic phase 18 as recorded in the column headed "Organic 18 Additive 16".

The flux recorded by testing exemplar membrane 10 fabricated according to example 2 is recorded as 36.8 GFD. The rejection, e.g., of salts, was recorded as 99.57%. The control membrane fabricated for example 2 is shown in example 1. This same control membrane fabrication was used for most examples shown in these tables unless otherwise noted.

The fact that the same control membrane characteristics were consistently reproducible strongly indicates that the test procedures were consistent but even more importantly, indicates that the portion of the fabrication process—not including additives 16—was a good process and under control. For example, the use of the recorded MPD and TMC concentrations and ratio were in the ranges discussed herein below as preferred and can be clearly be used to repeatably produce membranes to predetermined parameters.

In some examples, such as examples 52-55, no flux improvement was recorded because the examples were performed to verify the usefulness of fabrication parameters—such as MPD, TMC and MPD/TMC ranges—rather to determine flux improvement over a control membrane which may or may not have been fabricated at that time. However, if it is desirable to determine the flux improvement for an example in which the flux of the control membrane is not known or not recorded, this may be done to a reasonable accuracy by a relatively easy two-step process.

For example, the percentage flux improvement for example 52 is not recorded, presumably because the test was used to determine the usefulness of a membrane with the noted additives fabricated with a slightly higher TMC concentration and therefore a resultant slightly lower MPD/TMC ratio. A good approximation of the percentage flux improvement for example 52 can be made by making a control membrane in accordance with the parameters specified herein and, of course, good practice and recording the results.

The flux improvement percentage may then easily be determined. If the flux of the new membrane made in accordance with example 2 has a different flux value than as shown in the tables, it is reasonable to use the flux improvement ratio determined as above adjusted for the difference between the flux improvement shown in the tables and the flux improvement shown by the newly fabricated membranes.

The need for the use of the flux improvement ratio as a guide to determining the presence and concentration of one or more additives 16 which are not fully detectable by post fabrication analysis of membrane 10, as noted above, results from the fact that most if not all non-nanostructured additives 16 may not be easily, if at all, detected after fabrication. Further, the flux improvement guide may be the only current way to attempt to determine the presence and concentration of a suspected additive 16 in a unknown membrane. The use of the preferred process parameters for making the control and test membrane provide the best current way to estimate the presence of a suspected additive as well as its approximate concentration. The progress of technologies of analysis may improve with time so that the determination of the presence of the so-called "soluble" or non-detectable additives 16 may be possible in the future either by direct detection of the additive, or by measuring differences in the resulting membranes chemical structure or morphology.

Section C: Process Techniques

C.1 Techniques for Introducing Additives 16

Referring now again to FIGS. 1-9, aqueous phase layer 14 is shown—with additive(s) 16 dispersed therein—on an upper surface of support membrane 12 when interfacial polymerization has—or is about to—occur as shown in FIG. 1. In FIG. 2, additive(s) 16 are shown dispersed in organic phase layer 18. Similarly, additive(s) 16 may be included in both aqueous layer 14 and organic layer 18 as shown in FIG. 3.

Generally preferred concentrations of additive(s) 16 are from 0.025 wt. % to 0.25 wt. % by weight or more preferred from 0.024 wt. % to 0.18 wt. %, or most preferably from 0.05% to 0.15% wt in either aqueous layer 14 or organic layer 18—or both.

As shown in FIG. 4, additive(s) 16 may also or alternately be introduced via water solution 11 on an upper surface of support 12, typically before contact between aqueous or organic phases 14, 18 in order to be present during the interfacial polymerization. Water solution 11 may be, at least in part, a layer between aqueous phase 14 and support membrane 12 which may be in liquid communication with both aqueous layer 14 and the water wetted surface of support membrane 12. Additives 16 may also be introduced, in order to be present during the interfacial polymerization, by any other convenient technique. For example, hydrolyzed additives may be introduced by direct addition to—or by using a compound including such hydrolyze additives 16—as part of the fabrication process. As one example, mono- and/or di-hydrolyzed TMC may be used in organic phase 18 to introduce hydrolyzed TMC additives 16 to the interfacial polymerization reaction.

Referring now in particular to FIGS. 5-7, after fabrication, membrane 10 may include additives 16, such as partially soluble nanostructured materials and the like, in discrimination membrane 24. In these figures, discrimination membrane 24 is indicated as including additives 16, for convenience even though at least some of additives 16 may not be detectable in discrimination membrane 24 after fabrication. For example, some of additive 16 present during interfacial polymerization between organic and aqueous phases 18,14 may be removed, e.g., by washing or later processing—or may simply be present in quantities too small to detect with current techniques available to us—or may not be present at all. Hydrolyzed additives 16, such as mhTMC are believed to be absorbed or converted to another molecule during inter Referring now also to FIGS. 8 and 9, FIG. 8 illustrates the presence of additives 16 in membrane 24, which indicates at least that at least some additive 16 was present during interfacial polymerization. In FIG. 8, additives 16 shown piercing or at the upper and lower surfaces of membrane 24 indicate additives 16 which are detectable at these locations. Similarly, FIG. 9 indicates the use of additives 16 during the fabrication of discrimination membrane 24—some of which may or may not be detectable after production—as well as additives 16 present and detectable at the interface between membrane 24 and support membrane 12 after production.

Referring now FIG. 10, a technique is described which permits the fabrication of support 12, at least in a laboratory setting, which includes additives in this layer. As noted above, additives 16 may be detectable after fabrication in support layer 12 or not. A similar technique may also be used to include additives 16 in fabric layer 20, depending upon the construction of fabric layer 20.

In FIG. 10, casting solution 13 on fabric 20 becomes support membrane 12 after processing. Additives 16, such as nanostructured, alkaline earth, and other specific additives 16, described herein may also or alternately be incorporated into support membrane 12 by including such additives with casting solution 13 used to prepare support membrane 12 on fabric 20 on glass plate 15—and/or by including additives 16 within the non-solvent, e.g., DI water, used to induce phase inversion during fabrication of support membrane 12. Glass plate 15 may conveniently be used in a laboratory setting but would likely not be used in a continuous coating process for fabricating support membrane 12.

Porous support membranes 12 are typically kept wet until use. The amount of metal ion or other additives 16 introduced to the interfacial polymerization reaction between aqueous phase 14 and organic phase 18 may, in some cases, be increased by storing support membrane 12, e.g., in roll form, for a suitable time period such as at least one hour before fabrication of TFC membrane 10.

It may also be important to allow sufficient time for metal ion or other soluble additive 16 to diffuse from a source such as support membrane 12—e.g., into aqueous phase 14—before or during interfacial polymerization. A time of between 2 seconds and 5 minutes, and preferably between 10 seconds and 2 minutes is currently believed to be suitable for such diffusion so that metal ion additives 16—for example from nanoparticle additives 16—may be introduced to the interfacial polymerization reaction to impact the polymer structure of resultant discrimination layer 24 and improve performance of TFC membrane 10 by, for example, by increasing water flux there through for the same applied pressure.

Processing may include selecting nanostructured additives 16, such as other inorganic mineral compounds for other characteristics including solubility. For example a nanostructured additive 16, may also be selected for its ability to release further additives 16 into solution, such as soluble metal species, based on the degree of crystallization of the additive. Amorphous portions of nanoparticle additives 16 are typically more soluble than crystalline portions of the nanoparticle and processing can further increase solubility. The amount of crystalline material can be determined through several techniques including x-ray crystallography.

For this and other reasons, it may be advantageous to pre-process nanoparticles or other additives 16 by using sonic energy from a sonic probe or sonic bath before incorporation thereof in support membrane 12 and/or further sonicate either aqueous phase 14, organic phase 18 or both just before or during interfacial polymerization. Sonication of additives 16 may include immersing a sonic probe directly into casting solution 13 from which support membrane 12 is formed and/or placing solutions with additives 16 in a vessel and immersing the vessel in a sonic bath. Solutions may be subjected to sufficient sonic energy from 10 to 60 minutes, more preferably about 30 minutes, to aid in the release for example of metal species additives 16, such as aluminum or alkaline earth metal ions 16, into the solution. Increased sonication time may release additional metal species additives 16 into solution up to some equilibrium limit.

Processing of selected nanoparticles or other additives 16 may also be accomplished using shear, cavitation, and impact forces generated by 1 to 60 minutes in a Microfluidizer® process. After processing, the solution may contains additional metal species that were dissolved, for example, from nanoparticles 16.

Processing of selected nanoparticle or other additives 16 may be also accomplished using a solution containing additive 16 in a vessel with a stir bar and using a stir plate to propel the stir bar in the solution or alternatively using a motorized propeller to stir the solution or alternatively using a laboratory tray shaker. Stirring or shaking may be most effective for nanoparticle or other additives 16 selected for high solubility in either the aqueous or the organic phases 14, 18 or both.

Similarly, processing of selected nanoparticle or other additives 16 may also or solely be accomplished in a vessel containing a solution of additive 16 and adjusting the pH either lower than about 6 and more preferably lower than about 5 for at least 30 seconds, and/or to a pH greater than about 8 and more preferably greater than about 9 for at least 30 seconds. Whether pH is adjusted higher than about 8 or lower than about 6 may dependent on the solubility characteristics of the specific type of nanoparticle or other additive16.

Processing may assist in achieving the desired concentrations of additives 16 in solution. In some embodiments, additives 16 may have been broken or partially dissolved using shear, cavitation, or impact forces to maximize said soluble metal or other species introduced to the interfacial polymerization mixture. Nanoparticles or other relatively insoluble additives 16 may be calcined for at least 1 hour at 200° C. or more. The processed additives can have been shaken in aqueous solution on a shaker table for at least 1 minute.

Nanoparticles or other relatively insoluble additives 16 may also have been processed with heat in a solution for at least 5 minutes at a temperature of 40° C. or more. Nanoparticles or other relatively insoluble additives may have been processed with chelating agents in solution to bind soluble metal species or other atomic or molecular additives.

C.2 TMC Concentration and Purity

We have also determined that the addition of suitable additives 16 appear to require—or is at least appear most pronounced—when certain other conditions of the membrane fabrication process are modified from conventional membrane fabrication conditions. For example, we have found that by adjusting the concentration of the reagents used to prepare membrane 10 within specific ranges, additives 16 can be made to work more efficiently. That is, the concentration of TMC was clearly found to alter the effectiveness of additives 16. In particular, low concentrations of TMC was found, in some cases, to lower the effectiveness of specific additives—e.g., soluble metal ions, so much that the additives were not particularly useful in improving flow or rejection characteristics. Using high concentrations of TMC, typically much higher than conventionally used in the industry, results in such additives 16 causing a significantly larger increase in flux in TFC membrane 10.

Further, although conventional wisdom dictates that the purity of the TMC is supposed to be of paramount importance, we have also discovered that under some conditions, TMC with a lower purity—e.g. partially hydrolyzed TMC—in organic phase 18 often has the beneficial effect of producing membranes, such as RO membranes 10, with substantially higher flux while maintaining rejection characteristics.

In some cases, performance of TFC membrane 10 can also be improved by rinsing. This may be done in a high pH aqueous solution after TFC membrane 10 is formed. For example, membrane 10 can be rinsed in a sodium carbonate solution. The pH may preferably be from 8-12, and exposure time may vary from 10 seconds to 30 minutes or more. The rinse may alternately be at low pH to aid in removal of unreacted amine. This pH may, for example, be from pH 2 to pH 5. The rinse may alternatively be at a neutral pH. The rinse may alternatively be a hot water rinse with temperatures of 60°-98° C. The pH of the sodium carbonate rinse is preferably from 8-12, and exposure time may vary from 10 seconds to 30 minutes or more. Performance may also be improved by high temperatures rinses (for instance 80° C., 90° C., or 95° C.) for 2-10 minutes. The rinse may also include a chlorine species such as sodium hypochlorite at a concentration in the range of about 500 to about 2000 ppm. The rinse may also include separate steps where combinations of the above rinse conditions are used sequentially. After rinsing the membrane may be dried, or may be left wet.

To prevent scratching of the surface of TFC membrane 10, or to alter the hydrophilicity of membrane 10, hydrophilic polymer layer 30 as shown in FIG. 6 may be applied to the surface of membrane 10. For example, a solution of polyvinyl alcohol in water may be applied to the surface of membrane 10 followed by a heat cure to produce layer 30.

C.3 MPD/TMC Ratio

We have also discovered that the ratio of MPD to TMC may be another important factor in the preparation of high flux, high rejection, low fouling TFC membranes, particularly with additives 16, and combinations of additives 16, as described herein. The preferred range is less than a ratio of about 35 for use in conjunction with the TMC concentrations discussed above, more preferably less than 25 and even more preferably less than about 15. A most preferred ratio is about 13 for MPD/TMC on a wt % to wt % basis.

C.4 Preparation and Purity of mhTMC Additive 16

Figure 12:
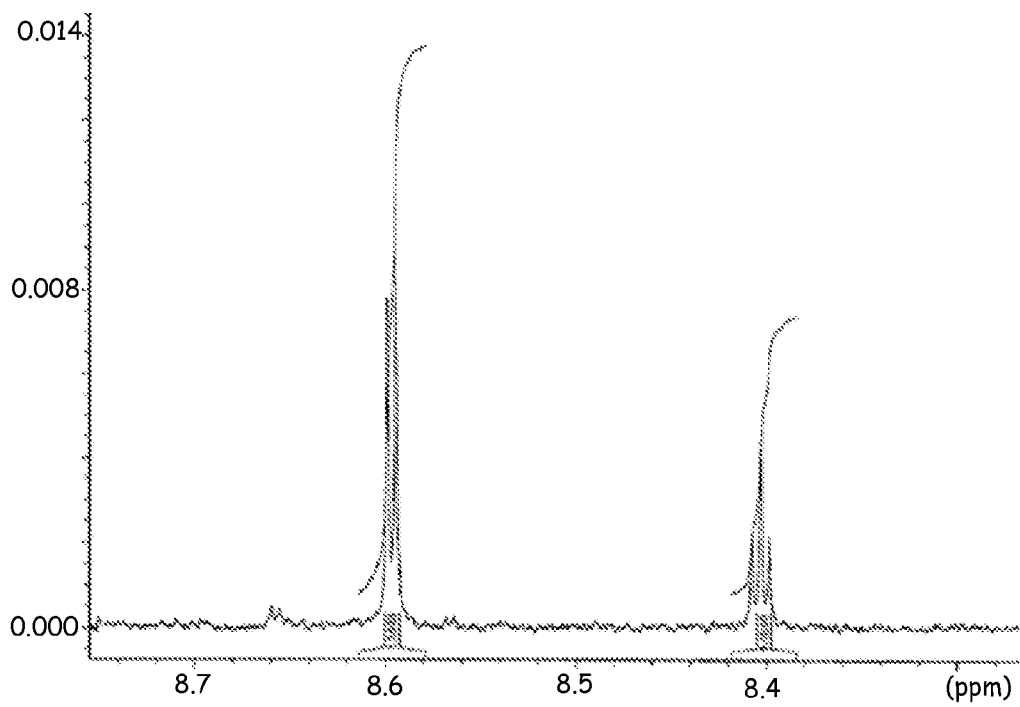
FIG. 12 is a graphic representing a $^1$H-NMR analysis of the purity of synthesized mhTMC.

With respect now to FIG. 12, we have discovered from our experiments with mhTMC additive 16, synthesized from two lots of commercial TMC with different stated levels of purity, that the inclusion of di- and/or tri-hydrolyzed TMC contaminants has apparently predictable effects on flux improvement and on rejection characteristics of membranes 10 resulting there from. We have learned that concentrations of mhTMC additives 16 may depend in part on what other materials may included therewith. We have also discovered, based on our analysis of mhTMC additives 16, techniques for determining and/or selecting concentrations materials useful as superior additives 16.

Relatively pure mhTMC was synthesized for the relevant examples described the tables below—in two lots, labeled lots 1 and 2 in the tables—as discussed in greater detail immediately below. Other monohydrolyzed polyhalogens may be synthesized using similar methods for use in additives 16.

To prepare mhTMC, commercially available TMC was first purified by reflux in thionyl chloride with DMF as catalyst. Impurities were pulled off under vacuum. The purified TMC was then dissolved in methylene chloride and reacted with Wang Resin (a commercially available solid phase polymer with reactive hydroxyl groups) at 0° C. Dilute triethylamine was added drop-wise over 2 hours and the solution was then allowed to slowly warm up to room temperature overnight. Excess reagents were rinsed away with excess methylene chloride. Cleavage with trifluoroacetic acid lead to isolation of mhTMC.

Referring now to FIG. 12, after synthesis of purified mhTMC, the resultant product can be dissolved in deuterated toluene or deuterated acetone for further analysis. The compound identity and purity of mhTMC can be verified through the use of $^1$H-NMR as shown for example in this figure, which is a graphical representation of an analysis by this process of mhTMC. In the figure, the doublet at 8.6 ppm is believed to correspond to the two aromatic ring protons adjacent to both a carbonyl chloride and a carboxylic acid group. The integrated area of this peak, 1.99, is twice that of the triplet at 8.4 ppm because there are two protons. The triplet at 8.4 ppm corresponds to the single aromatic ring proton between two carbonyl chloride groups. Purity of this compound can be checked by comparing the integrated area of these protons versus those of the non-hydrolyzed TMC, di-hydrolyzed TMC, and trimesic acid compound identity and purity of the mhTMC was verified with $^1$H-NMR of the isolated solid. The NMR process was run in deuterated toluene.

The purity of the synthesized mhTMC additive 16 may be estimated from the NMR spectra. Crude and purified mhTMC is dissolved in deuterated toluene for the NMR analysis. The purity calculation may be performed by looking at the relative quantities of trimesic acid, 1,3,5-benzenetricarbonyl trichloride, monohydrolyzed TMC and di-hydrolyzed 1,3,5-benzenetricarbonyl trichloride. These values may then be reduced by any extraneous NMR peaks which usually impurities from the synthesis.

Figure 13:
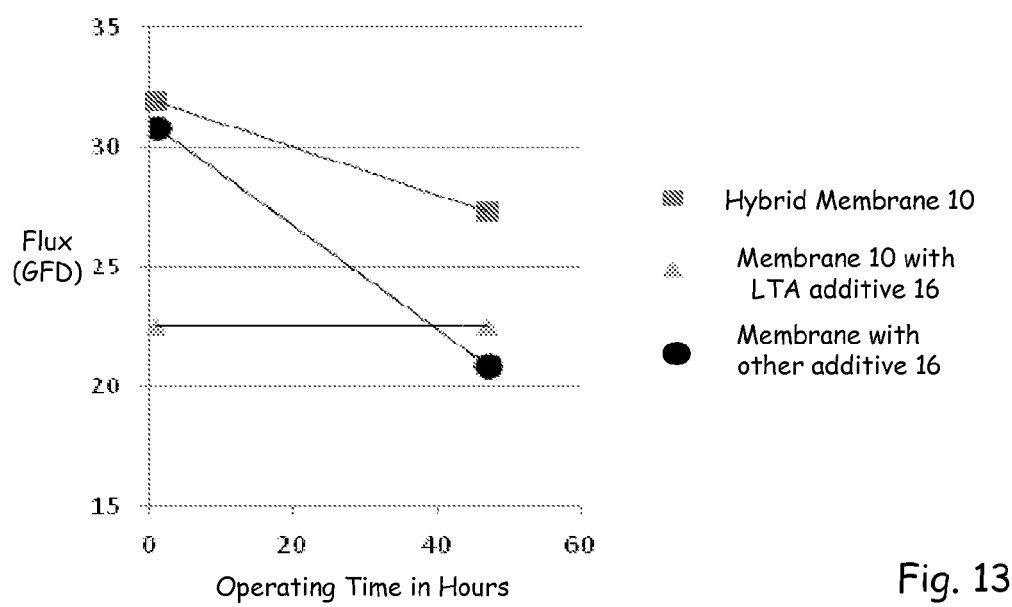
FIG. 13 is a graphical illustration of flux and rejection curves 32, 34 for increasing concentrations of additive 16, such as mhTMC lot 1, indicating a range of preferred concentrations of mhTMC or other additives 16—shaded area 45—surrounding deflection axis A 44, in which one or more non-linearities or deflections appear to occur in flux growth and rejection decline as well as deflection axis B 46 indicating concentrations of additive 16 which appear to damage membrane 10.
Figure 14:
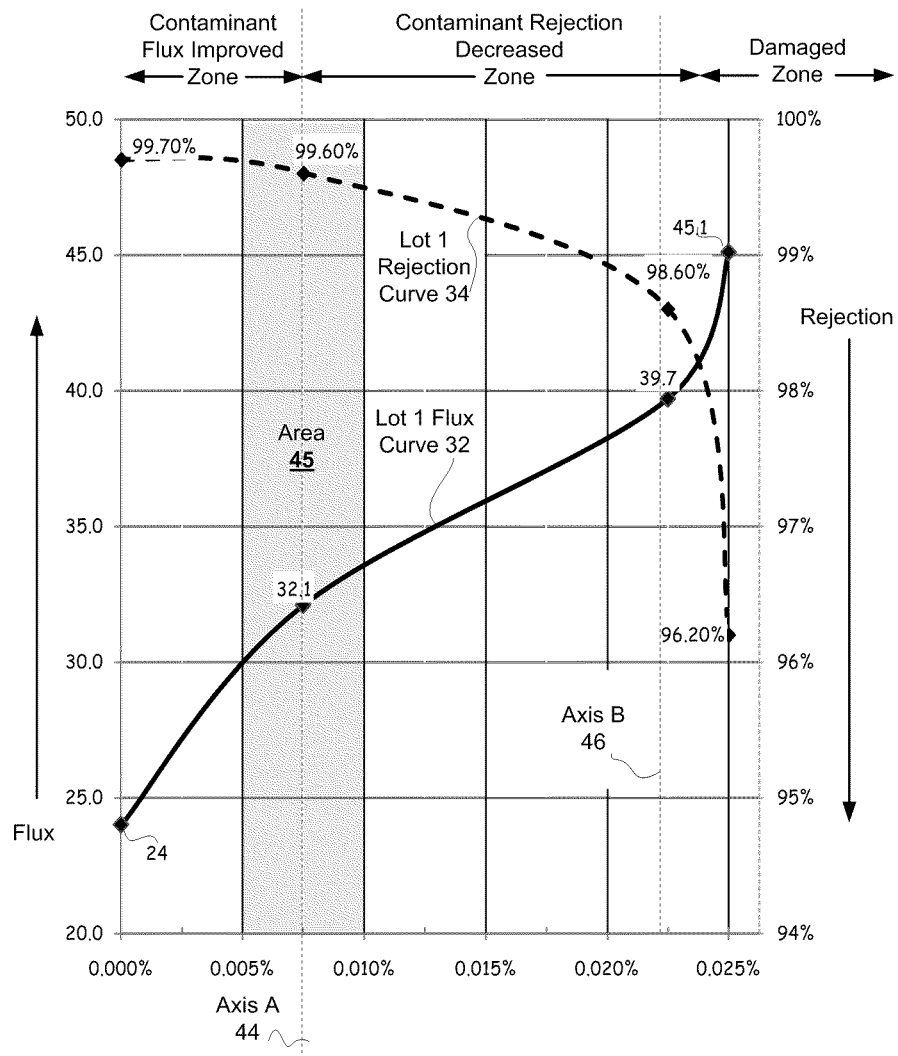
FIG. 14 is a graphical illustration of flux and rejection curves 36, 38 for increasing concentrations of additive 16, such as mhTMC lot 2, and of flux and rejection curves 40, 42 for increasing concentrations of additive 16, such as filtered mhTMC lot 2, indicating a range of preferred concentrations of additive 16 including deflection axis A 48—shaded area 49—in which one or more non-linearities or deflections appear to occur in flux growth and rejection decline.

Referring now to FIGS. 13 and 14, membrane performance is illustrated graphically as a function of the concentration of mhTMC additive 16, adjusted for purity. Examples 169-171 and 173-182 for mhTMC reflect the concentration of the synthesized mhTMC additive 16 used for these tests, and indicates the source of the mhTMC, i.e. synthesized lots 1 or 2. In FIG. 13, lot 1 flux curve 32 illustrates the growth of flux for increasing concentrations of mhTMC additive 16, lot 1, from 0%, representing the control membrane, to 0.025 wt %. Lot 1 rejection curve 34 shows the corresponding rejection characteristics for the same concentrations.

FIG. 14 shows the most useful portion of the mhTMC concentration range shown in FIG. 13—from 0% mhTMC to 0.015 wt % for mhTMC lot 2. In particular, lot 2 flux curve 36 shows the growth of flux for membranes made with mhTMC lot 2, while lot 2 rejection curve 38 illustrates the decrease in rejection over this range of concentrations.

The curves in FIGS. 13 and 14 have been adjusted for the purity of the synthesized mhTMC. In particular, the data for lots 1 and 2 have been adjusted for the estimated concentrations of synthesized mhTMC based on an NMR assay, including simple percentage of materials dissolvable in toluene. In FIG. 13, for mhTMC lot 1, the purity was estimated to be about 80% pure mhTMC—the remaining 20% believed to be primarily di-hydrolyzed TMC—while in FIG. 14 for mhTMC lot 2, the purity was estimated to be about 25% pure mhTMC, the remaining 75% was believed to be primarily di-hydrolyzed TMC. The curves have been scaled so that the curves for both lots 1 and 2 represent 100% pure mhTMC so they can be compared.

In FIG. 14, graph lines or curves 40 and 42 also represent the flux and rejection of membranes 10 for lot 2 mhTMC where organic phase 18 was filtered to remove larger contaminant structures believed to be the result of di-hydrolyzed TMC included with the mhTMC of lower purity. Any tri-hydrolyzed TMC present in either lot would likely have not been soluble and would have precipitated out of the mhTMC solution.

Regarding FIG. 13 in more detail, lot 1 flux curve 32 showed an increasing flux from 24 GFD at 0% concentration, i.e., at the control membrane concentration, to about 32.1 GFD at about 0.0075% concentration. The rate of growth of flux decreased at the concentration which has been marked with line 44, vertical deflection axis A discussed below. The flux continued to improve with increased concentration, but at a slightly slower rate, until the flux reached 39.7 GFD at the concentration which has been marked with line 44, vertical deflection axis B at about 0.0215% adjusted mhTMC concentration. Further increased flux concentration beyond deflection axis B, line 46, caused dramatically increasing flux up to 45.1 GFD at 0.2050% adjusted concentration.

Deflection axes A and B are simply vertical lines drawn on the graph to indicated concentrations at which the effects of additive 16, in this case mhTMC additive 16, appear to change. For example, for lot 1, the flux for membranes 10 made with the indicated concentrations of additive 16, from 24 GFD to 32.1 GFD is shown as the concentration of additive grew is increased from 0 wt % (control membrane) to 0.005 wt %. The rate of growth of flux in this area was therefore roughly (32.1-24)/0.005~1 GFD per 0.001 wt % increase of additive 16. However the flux increased at a lower rate from deflection axis A to deflection axis B, i.e., (39.7-32.1)/(0.02125-0.005)~0.5 GFD per .001% additive 16. The rate of increase of flux as a function of increasing concentration of additive 16 from deflection axis B with 39.7 GFD at 0.02125% to 45.1 GFD at 0.0250% is (5.4/0.0075) or 1.4 gfd per 0.001%.

In other words, points along membrane characteristic curves 32, 34, 36, 38, 40 and 42 which intersection lines 44, 46 and 48, deflection axes A and B, indicate that the rates of increase or decrease changed for both flux and rejection at these points, i.e., these deflection points are concentrations at which a feature, such as the second derivative of flux growth and rejection, changed. These deflection points may also be considered non-linearities. The fact that both flux and rejection rates of growth changed in an unusual way at the same concentration points appears to be significant is likely an indication that there was a change in the effect of the presence of additive 16 e.g., mhTMC, on interfacial polymerization, at these concentrations. Although the mechanisms are not understood, it is believed that at or about these "deflection point" concentrations, a non-linearity occurred in one or more mechanisms affecting the polymer structure being formed by interfacial polymerization due to the presence of additive 16.

In particular, as shown in FIG. 13, the rejection characteristics of the higher purity of mhTMC lot 1 were very good at the 0% concentration of the control membrane at 99.7% rejection. At deflection point A along deflection axis A, the membrane rejection was still very good at about 99.60% for the membrane 10 fabricated with mhTMC additive 16 having about 0.0075% adjusted mhTMC concentration. Thereafter, the rejection continued to decrease to 98.60% at 0.02125% at deflection point B along deflection axis B after which it decreased dramatically to 96.20% at about 0.0250% concentration.

Similarly, the addition of from 0% to perhaps 0.0150% adjusted concentration provided very useful performance of membrane 10, with concentrations of mhTMC as high as about 0.02% to about 0.02125% being useful at some conditions, but concentrations above that level, deflection axis B, line 46, suggest—together with the dramatically increased flux—probable damage to the polymer structure of discrimination membrane 24. The optimal point appears to be in the neighborhood of the deflection axis A, line 44 at about 0.0075% adjusted mhTMC additive 16 concentration for membrane 10 with about 32.1 GFD flux and 99.6% rejection.

In any event, a first major linearity, e.g., in the rate of growth of flux with increasing concentrations of additive 16 occurred in range including axis A, line 44, indicated as area 25 in the figure. This particular graph was drawn with limited data points, but the graph shown in FIG. 14 was drawn with additional data points to clarify this discussion.

The optimum point for the parameters of membrane 10 required for a particular task may have to be determined by experimentation and may depend on the proposed use for membrane 10. For example, if rejection lower than about 97.6% was acceptable for a particular filtering task, increased flux could be obtained by increasing the concentration of additive 16. Alternately, if higher rejection was required, the concentration could be lowered. For example, membrane 10 could be fabricated with 0.0050% additive mhTMC 16 to have a flux of about 30.0 GFD and a rejection over about 99.6% or at 0.01% adjusted concentration to have a flux of about 33.5 GFD with a rejection of about 99.35%.

Detection and analyses of the deflection points or non-linearities in the effect on increasing additive concentration may be useful in determining the value of a particular additive when such non-linearities occur generally at the same concentration levels, improvements for example in preprocessing of additives 16 which tend to reduce the impact of such non-linearities and of course the selection of an appropriate concentration level for a particular additive 16—including combinations of additives—for a particular task.

Referring now to FIG. 14, as will become apparent from the following more detailed discussion of the graphs and non-linearities of the effects of different concentrations of additive 16, this data provides the opportunity for much greater control of TFC membrane fabrication. In the particular example for mhTMC additive 16 concentrations, it is easy to conclude that after about 0.022%, the polymeric structure of the membrane has lost its selectivity and is probably damaged. The techniques presented in the following analysis of FIG. 14, especially when compared to FIG. 13, provide several very useful discoveries regarding fabrication of TFC membrane in general as well as TFC membranes with additives.

First is the identification of deflection points in the flux and rejection curves, that is detection of what appear to be non-linearities in the processes by which additives 16 alter the structure of the polymeric matrix formed by interfacial polymerization, i.e., discrimination membrane 24. When concentration levels of additives 16 are found at which these non-linearities occur in both flux in rejection, and particularly at multiple levels of purity of additive 16, the materials included in additive 16 is a very likely a good candidate as an additive which can repeatably be used to fabricate membranes 10 with superior performance.

Further, comparison of such linearities for two very similar additive materials, e.g., as shown for lots 1 and 2 which differ by purity, permit a tradeoff between superior performance of one membrane characteristic with other membrane characteristics such as repeatable fabrication with predetermined flux and rejection characteristics. For example in FIG. 14, selection of concentration levels in area 49 permit fabrication of membranes using lot 2 additive 16 with a high flux in the range of 35.5 GFD at rejections of 99.24% to 99.05%. Analysis also indicates that preprocessing, e.g., by filtering lot 2 to remove larger structures—believed in this example to have resulted from the presence of di-hydrolyzed TMC in additive 16—permits the selection of about a 0.0075% concentration of mhTMC of which can used to repeatably fabricate RO membranes 10 with relatively predictable flux and rejection performance.

That is, fabrication of membrane 10 using for example, filtered mhTMC as an additive, provides a slightly lower flux, say 33.2 GFD and a much better rejection rate, say 99.56%. This analysis makes it clear that selection of concentrations within area 49 will provide substantial fabrication repeatability. The identified non-linearities or deflection points in both FIGS. 13 and 14 indicate a range of changes of concentration in which the effect on flux and rejection of a particular additive is limited. In particular, for each of lot 2 and filtered lot 2, area 49 represents low of at least predictable changes in flux together with low levels of change in rejection.

Now in greater detail with respect to FIG. 14, lot 2 flux curve 36, adjusted to reflect an estimated 25% concentration of pure mhTMC but not filtered, showed an increasing flux from the control membrane concentration of 0% mhTMC of 17.2 GFD, growing dramatically to about 36.2 GFD at about 0.00250% adjusted concentration and then growing to 35.5 GFD at which the rate of increase in flux growth leveled off, reaching about 36.4 GFD at lot 2, deflection axis A 48. Thereafter, the rate of flux increased and then slowly until flux reached about 38 GFD at about 0.0150% adjusted concentration.

However, filtered lot 2 flux curve 36 indicates that the flux increased linearly, from 17.2 GFD at 0% concentration, generally at the same rate of increase the resulted from increasing concentration of the higher purity of mhTMC from lot 1 to 26.4 GFD at deflection axis A of 0.0075% adjusted mhTMC concentration. The increasing flux rose to substantially the same increasing flux shown by the graph line of lot 2, unfiltered, at about 31.9 GFD at 0.0150% adjusted concentration. The fact that the lot 2 adjusted and filtered flux growth curves 36, 40 substantially join each other at a concentration of about 0.015% indicates good consistency in these test results.

The rejection characteristics shown along filtered lot 2 rejection curve 42, for membrane 10 made with mhTMC additives 16 from lot 2, adjusted and filtered, show little degradation of rejection from the control membrane value at 0% concentration to deflection point A along deflection axis A at about 0.0075% adjusted concentration. The consistency between the deflections point and deflection axes indications in all three lots 1, 2 and filtered 2 strongly suggest that the effects of the impurities are the same or similar in effect. These results suggest that effects—of the larger contaminants that were removed by filtering—are primarily on the rate of increase of flux with increasing concentration of additive 16, and less on rejection characteristics of membrane 10.

Although the concentration of mhTMC additive 16 in commercially available TMC—alone or together with other additives 16 such as nanoparticles, alkaline earth metals or other molecular additives—has not been determined, it is a matter of experimentation to determine the appropriate deflection point for optimal additive concentrations of the mhTMC and other additives, and combinations of additives, in accordance with the techniques as disclosed herein.

In particular, deflection point A—that is the point at which additional increases in additive 16 concentration produces a greater rate of loss in rejection characteristics—indicates a generally optimum concentration of additive 16, providing membrane 10 with both a high flux and a high rejection. Lower concentrations improve rejection at the cost of flux while higher concentrations improve flux at the cost of rejection. Deflection point B—the point at which increased concentration then produces an even greater rate of loss of rejection—indicates a possible defect in the polymer matrix structure of discrimination membrane 24 and should be avoided for most if not all applications of membrane 10.

It should be noted that, as shown in the graph of FIG. 14, when the results of lot 2 unfiltered were adjusted, a greater improvement in flux was achieved, for example just below and just above the concentrations at deflection axis A, presumably from the di- and/or tri-hydrolyzed or other contaminants which were not removed by filtering. The area between flux and rejection curves 36, 38 and 40, 42, for lot 2 and lot 2 filtered respectively—between 0% concentration and 0.02125% concentration, contaminant effected concentration zone 50—therefore indicates the possibility of achieving a higher flux at a higher rejection without removing the larger contaminants by filtering, than can be obtained by the same purity mhTMC.

However, this anomaly—although it may be useful under some conditions—may be more difficult to control so that producing membranes 10, with a concentration in contaminant area 50, i.e., along flux curve 40, may be difficult to do commercially with consistent results.

The detection and use of deflection points A and B are believed to work the same way for other additives 16, not just mhTMC additive 16. However, when such other additives 16 are used, the unintentional use of additional, partially hydrolyzed TMC as a result of using less pure TMC for example in organic phase 18, may result in operation in contaminants area 50, along a line similar to flux curve 36 where the increased concentration of additive 16 does not produce a well controlled increase in flux. This may be particularly unsatisfactory when the level of TMC contamination causes area 50 to include deflection point B. That is, when the contamination of TMC, i.e., with mhTMC or di-hydrolyzed mhTMC causes the concentration of additives 16 to exceed deflection point B so that damaged discrimination membranes 24 are produced.

In summary, we believe we have discovered a very useful technique for determining appropriate concentration levels of additives 16, by identifying the deflection point of the curves at increasing flux above the level of the control membrane which allows us to knowingly choose concentrations of additives 16 appropriate for use in particular tasks for membrane 10 including the ability to select concentrations which may be more reproducible in commercial fabrication that merely picking the concentration at which the highest flux is achieved at an acceptable level of rejection. In particular, this technique permits the selection of a concentration and contamination levels which allows more consistent fabrication with a repeatable set of performance characteristics and obviates the need for altered formulations to combat such variability.

It is interesting to note that the rate of growth of flux as shown on lot 2 flux curve 36 changed at several different concentration levels. The same is true for the rate of decrease in rejection shown on lot 2 rejection curve 38. Based on these two curves alone, it would not have been easy to isolate 0.0075% mhTMC concentration as the deflection point to be selected, but the use of curves 32 and 40, showing relatively pure mhTMC with at least the largest contaminant structures removed, reflects the same concentration as the concentration to be selected.

FIGS. 13 and 14 illustrate our findings that the flux and rejection curves for concentrations of various useful additives 16 are typically relatively well behaved—that is, they change slowly and smoothly—from control membrane concentration (0%) to a concentration at which the polymeric structure of discrimination membrane 24 may have been damaged by the presence of too much additive 16 during interfacial polymerization. We have investigated the effects of contaminants in mhTMC in detail because di- and tri-hydrolyzed TMC contaminants are potentially present in any interfacial polymerization in which TMC is used in organic phase 18.

Lot 2 flux and rejection curves 36 and 38 are shown at a series of concentrations to illustrate the fact that the rate of change of flux and growth—i.e., the $2^{nd}$ derivative of these membrane characteristic values—change at multiple concentrations within the range of concentration that may be used for fabricating membrane 10. The concentrations used for flux and rejection for lot 1, and filtered lot 2, are only shown at a few points along flux and rejection curves 32, 34 and 40, 42 to illustrate the relatively smooth changes in the rates of growth and decrease of flux and rejection from additives 16 which are not substantially effected by contaminates. This relatively dramatic difference is very useful in selection of an appropriate concentration for additive 16 for commercial fabrication of membrane 10, that is, fabrication which will produce predictable and controllable membrane characteristics under a wide variety of environmental conditions encountered in a fabrication facility.

In particular, referring to lot 2 flux and rejection curves 36 and 38 in FIG. 13, a concentration of additive 16 for use in a common task for membrane 10, e.g., for use in reverse osmosis (RO) of brackish or saltwater to produce pure or drinking water as shown above for example in FIGS. 5 and 6, would typically be a concentration at which the flux is higher than the flux of the control membrane which retains a rejection of perhaps 99.5%. A concentration of perhaps 0.0025% would likely be selected which provides resultant membrane 10 with membrane characteristics of 32.6 GFD and 99.45%. In some cases, a fabrication facility may chose a concentration of 0.005% to get the benefit of the higher 35.5 GFD even though the slightly lower 99.24% rejection might not meet the desired water purity. The selection of either of these concentrations, however, would likely encounter problems with repeatability and other fabrication limitations.

By using the techniques described herein, namely determining the effect of contamination and identifying deflection point A, along axis line 48, the fabricator would have the ability to select the 0.0075% concentration for additive 16, and perhaps with contaminant removal, fabricate membrane 10 with membrane characteristics of 33.2 GFD and 99.56% rejection under a wide range of conditions.

Figure 16:
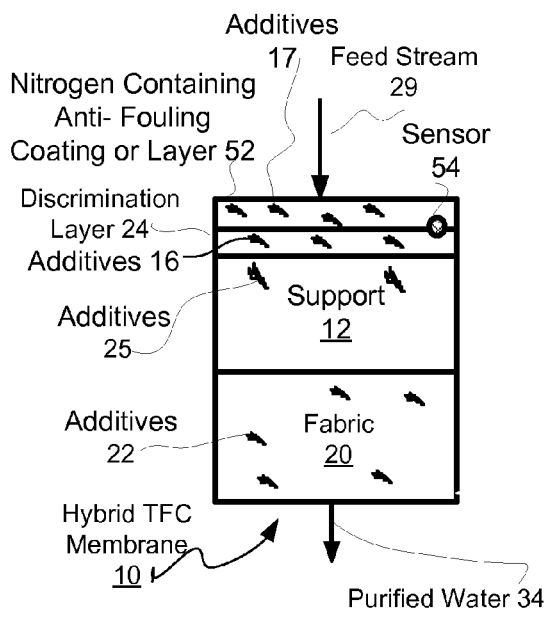
Figure 17:
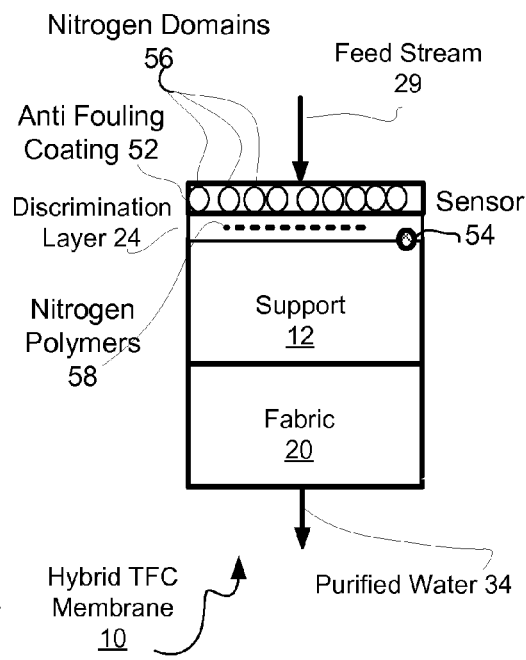
FIG. 17 is a block diagram of another embodiment of hybrid TFC membrane 10 including distinct nitrogen containing regions or domains 56 in anti-fouling layer 52 on discrimination layer 24 which is shown including nitrogen polymers 58.
Figure 18:
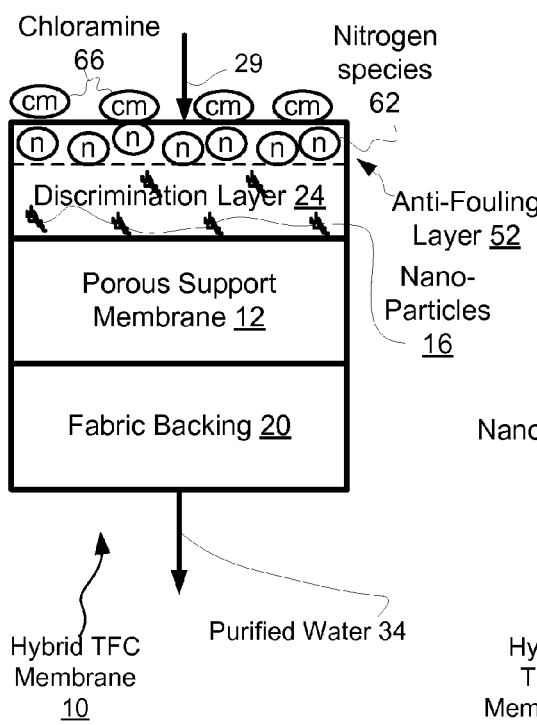
FIGS. 18 and 19 are functional flow diagrams illustrating some of the possible operations of the anti-fouling and discrimination protection techniques.

Referring now to FIGS. 16-18, particularly when the feedstock such as saltwater 28 or freshwater feed stream 29 contains chlorine, it may be desirable to add halogen reactive nitrogen species—or other compounds responsive to halogen to form halamine—to hybrid TFC membrane 10 as part of an anti-fouling layer, such as nitrogen containing anti-fouling coating layer 52, and/or within discrimination layer 24 as an anti-fouling layer or region 52. The chlorine may act as a biostatic agent, while the presence of the reactive nitrogen species improves hybrid TFC membrane 10's resistance to damage by chlorine during normal water purification operations with a chlorinated feedstock. Further, the presence of nitrogen species in hybrid TFC membrane 10 may also be used to allow hybrid TFC membrane 10 to be recharged with chlorine after ongoing use, to recharge the resistance of membrane 10 to fouling.

Referring now in particular to FIG. 16, membrane 10 may be made by any of the aspects described herein including combinations and/or variations thereof. For example, discrimination layer 24 may be fabricated by interfacial polymerization on porous support membrane 12 by contacting organic and aqueous polymer solutions as described above. The interfacial polymerization may be caused to occur in the presence of nanoparticles or other additives 16 dispersed in the polymer solutions in appropriate concentrations.

Porous support membrane 12 may include additives 24, such as LTA nanoparticles, included in the casting liquid. Membrane 12 may have been cast on fabric 20 for additional strength. Fabric 20 may have additives 22, such as LTA nanoparticles, included in therein for additional strength and/or resistance to fouling. Nanoparticles 16, 22 and 24 may be the same or different nanoparticles.

Nitrogen containing anti-fouling coating 52 may be applied to the surface of hybrid TFC membrane 10, typically onto the feed stream face of discrimination membrane 24, to which feed water 29 is applied. Feed stream 29 provides solutions to be processed, for instance surface water, well water, brackish water, waste water, or other solutions which are to be processed by reverse osmosis. Coating layer 52 may be used alone and/or in combination with a hydrophilic or other membrane coating, such as layer 30 shown in FIG. 6.

Anti-fouling coating layer 52 contains nitrogen 17, for example in functional groups within the polymer backbone, or appended off the polymer backbone, of layer 52. Nitrogen 17 is a nitrogen species which reacts with a halogen to produce halamine. Nitrogen 17 in anti-fouling layer 52 will likely be in the form of separate pockets or domains especially if nitrogen additive 17 is in the form of a nanoparticle as shown in FIG. 17 as nitrogen domains 56. Nitrogen additive 17, and/or other halogen reacting compounds which produce halamines may be added as domains to coating layer 52 or as well dispersed additives not limited to being in domains. Nitrogen species 17 may be in the form nanoparticle additives 16, 25 or 22.

Nitrogen species 17 may also be located in nitrogen domains 56, some of which are illustrated in FIG. 17, and will be discussed in more detail below. When nitrogen species 17 is present within nitrogen containing domains 52, the nitrogen may be present within a second polymer 58 which is an addition to the polymers which form discrimination layer 24. During operation, feed water 29 passes through anti-fouling coating layer 52 and then purified water 34 passes through discrimination layer 24, porous support membrane 12 and fabric layer 20, if present.

Preparation of nitrogen containing anti-fouling layer 52 can be accomplished in any suitable, conventional process, several of which are discussed below to illustrate a range of such processes. Nitrogen species 17 may be in the form of domains or dispersed additives in the type of anti-fouling layer 52 added to the surface of membrane 24, often called a coating or coating layer, and maybe also be formed within discrimination layer 24 as nitrogen species 62, typically as domains.

For example, nitrogen containing anti-fouling layer 52 can be prepared by adding suitable monomers, oligomers, or polymers to organic phase 18. These additives may either be soluble or dispersed in organic phase 18. After interfacial polymerization, such additives are typically encased within and/or on the surface of discrimination layer 24 as anti-fouling, nitrogen-containing-layer or coating 52 shown on discrimination layer 24 in FIGS. 16, 17 and 19. FIG. 18 illustrates a reactive nitrogen species in the form of nitrogen species domains formed within discrimination layer 24.

As shown for example in FIG. 17, for polymeric additives, the resultant polymerization product may be a nanocomposite alloy of nitrogen-containing-polymers 58 within discrimination layer 24. Additional polymer of anti-fouling layer 52 may also cover much or most of the surface of hybrid TFC RO membrane 10.

If oligomers or monomers are used, it may be useful to include thermally induced or UV initiators. In this way, the polymerization of anti-fouling or nitrogen-containing-layer 52 can be performed at a controlled time after discriminating layer 24 has formed. Since monomers may be trapped within the thin film of discrimination layer 24, polymerization may yield an interpenetrating network structure. That is, discrimination layer 24 may also contain nitrogen in a polymer structure, such as nitrogen polymers 58, in addition to the nitrogen in the structure of anti-fouling layer 52. Much or most of the surface of RO membrane 10 may therefore also be covered by additional nitrogen-containing coating layer 52.

An alternate method of depositing a nitrogen containing layer 52 may be by depositing a prepolymerized polymer on the surface of discrimination layer 24. For instance, polysulfone can be sulfonated with chlorosulfonic acid, then converted with $PCl_5$ to chlorosulfonated polysulfone, which can be reacted with ammonia or a primary amine to prepare a sulfonamide substituted polysulfone. The sulfonamide substituted polysulfone can then be dissolved in a solvent that doesn't dissolve the polysulfone support in order to form a nitrogenated casting polymer, and then cast as a thin film on discrimination layer 24 of RO membrane 10 and dried to generate the nitrogen containing coating layer 52.

Alternatively, this nitrogenated casting polymer could be dispersed in a second polymer solvent system. For instance, the sulfonamide containing polysulfone could be dispersed in an aqueous polyvinyl alcohol solution. To give a good dispersion sonication or microfluidization may be needed. The aqueous polyvinyl alcohol solution including the sulfonamide can then be cast on discrimination layer 52 of RO membrane 10 and then dried. The resulted membrane 10 will have nanoparticulate domains, some of which are shown in FIG. 17 as nitrogen domains 56, of the sulfonamide containing polysulfone dispersed within a continuous anti-fouling PVA layer 52. When nitrogen containing domains 56 are present within a second phase to form layer 52, it is useful to control the size and distribution of the domains 56. In particular, the distance between nitrogen containing domains should be less than 10 microns, more preferably 1 micron, and even more preferably less than 100 nm. This distance ensures contact between deposited microorganisms and nitrogen containing domains 56 so that the microorganisms are killed and prevented from fouling RO membrane 10.

In other cases, a very thin coating layer 56 may be prepared by grafting suitable functional groups on discriminating layer 24. For instance, the epoxide 3-glycidyl-5,5-dialkylhydantoin may be coated on discriminating layer 24. RO membrane 10 may contain terminal amine groups that are able to react with the epoxide, or other electrophilic groups, to tether the desired nitrogen compounds to the surface of discrimination layer 24. Nucleophilic grafting agents may also be used which react with residual acid or acid halide groups on discriminating layer 24 of RO membrane 10.

In some instances, RO membrane 10 may be used to desalinate waters that contain materials that have a tendency to accumulate on the surface of discriminating layer 24, decreasing the effective permeability of RO membrane 10. These fouling materials can include, but are not limited to, natural organic matter, partially insoluble inorganic materials, organic surfactants, silt, colloidal material, microbial species including biofilms, and organic materials either excreted or released from microbial species such as proteins, polysaccharides, nucleic acids, metabolites, and the like. The drop in permeability resulting from fouling is often smaller for RO membranes prepared as disclosed herein than for conventional membranes because anti-fouling layer 52 decreases the amount, density, viability, thickness and/or nature of accumulated material.

The surface properties of discrimination layer 24, such as hydrophilicity, charge, and roughness, often affect the level of this accumulation or fouling and permeability change. Generally, RO membranes with highly hydrophilic, negatively charged, and smooth surfaces yield good permeability, rejection, and fouling behavior. The improved resistance to accumulation for RO membrane 10 with anti-fouling layer 52 can in part be related to the increased hydrophilicity of layer 52. The increased hydrophilicity can be measured by measuring the equilibrium contact angle of a membrane surface with a drop of distilled water at a controlled temperature.

Nitrogen species containing coating layer 52 may be said to serve two primary purposes. In its first role it allows the application to RO membrane 10 of waters containing chlorine to be purified by reverse osmosis, such as recycled fresh, brackish or saltwater or other feed stream 28, by reacting the chlorine with the nitrogen species or related compounds in layer 52 before the chlorine can reach underlying discrimination layer 24 of RO membrane 10. Nitrogen containing coating layer 52 in another role slows the transport of chlorine to underlying discrimination layer 24 of RO membrane 10. Anti-fouling layer 52 may also be anti-microbial to further reduce fouling of the surface of discrimination layer 24. The exposure of nitrogen containing coating layer 52 to chlorine leads to the formation of chloramines. When microbes attempt to settle on a surface coated with chloramines, oxidation reactions typically lead to death of the microbes and thereby prevent the microbes from fouling layer 52 and thereby prevent the fouling of RO membrane 10.

Acting in one or both of these two roles, anti-fouling layer or surface coating 52 allows RO membrane 10 to be exposed to some chlorine in the water to be purified without degradation of the performance of RO membrane 10. Once RO membrane 10 is exposed to chlorine, anti-fouling layer 52 remains able to kill microbes for a subsequent period of time. As a result, RO membrane 10, when coated with nitrogen containing layer 52, is substantially antimicrobial and resistant to biofouling.

Several nitrogen containing species can be used to act in this role. Amides, imides, amines, sulfonamides, Hydantoin (5,5 disubstituted), or imidazolidin-4-one are all examples of nitrogen containing species that can react with chlorine to form chloramines species. Each of these species will have slightly different biocidal activity, length of time before regeneration is required, and ease of regeneration. Also important is the nitrogen species' resistance to degradation, particularly once in the chloramines form. Species without any alpha hydrogen atoms, for example where $R_1$ and $R_2$ in the following structure are not bound directly to hydrogen, are preferred for their stability.

$$R_1\text{---}NCl\text{---}R_2$$

In order to function adequately, coating or anti-fouling layer 52 preferably has an appropriate thickness, is preferably substantially without defects, and of course should have the requisite water permeability for the reverse osmosis task at hand. Nitrogen containing coating layer 52 is preferably thick enough that the chlorine exposure time can be sufficiently high to allow substantial formation of chloramines. During this exposure time, thicker layer 52 stabilizes discrimination layer 24 of RO membrane 10 by providing additional sites for reaction with chlorine, and by slowing transport of chlorine due to exclusion and hindered diffusion through polymer layer 52. Anti-fouling polymer or coating layer 52 is preferably substantially free of defects because even small areas without coating layer 52 would potentially allow the reverse osmosis characteristics of discrimination layer 24 to be degraded by the chlorine. This type of degradation can lead to high salt passage through discrimination layer 24, that is lower rejection of salts, making RO membrane 10 less useful at removing contaminants in seawater or other feed stream 29.

Nitrogen coating layer 52 may restrict water transport somewhat and cause a drop in permeability of RO membrane 10. This drop may be a function of both the thickness of anti-fouling layer 52, and the ability of layer 52 to transport water. To make nitrogen containing layer 52 more permeable to water, layer 52 may be made more hydrophilic so that layer 52 can absorb more water. As shown in FIG. 16, additives 17 which may be the same or different than additives 16, 25 or 22), such as nanoparticles especially zeolite LTA and/or additives, may also be added to anti-fouling polymer layer 52 to increase water permeability of layer 52 and therefore increase water permeability of RO membrane 10. Increases in the permeability of nitrogen containing layer 52 permits thicker coatings of layer 52 to be used on RO membrane 10 without sacrificing flux characteristics.

The antimicrobial activity of layer 52 will likely decrease as the chloramine concentration drops with time and exposure to various chemicals. The antimicrobial activity of layer 52 can, however, be regenerated by exposure to a chlorine containing solution. The technique to be described immediately below, for recharging the chlorine concentration of layer 52, can also be used for charging layer 52 with chlorine the first time, for example, when the water to be purified is fresh water with fouling agents but not with chlorine.

A solution of hypochlorite ion is preferably used for charging and/or recharging layer 52. This ion is effective at generating chloramines species in nitrogen containing coating layer 52 while also being well rejected by coating layer 30 to protect discrimination layer 24, and therefore RO membrane 10, against degradation. Also useful for generation and regeneration processes are chlorine, hypochlorous acid, chlorine dioxide, chloramines, and chlorine containing organics such as chloramine T. In some cases, the use of chlorine may be replaced with bromine or other halides. This generates bromamines on the surface of anti-fouling layer 52 which are also antimicrobial. A hypobromite solution can readily be generated by adding bleach to a solution of sodium bromide.

To minimize the need for chemicals on site, chlorine may also be generated on site electrochemically from a concentrated NaCl solution.

To schedule regeneration, a proper regeneration frequency can be determined by measurement of the chlorine content of anti-fouling layer 52. This can be done for a particular nitrogen containing surface coating in a lab trial, for example, by using x-ray photoelectron spectroscopy (XPS) to measure chlorine concentration in layer 52 as a function of run time.

To develop a more accurate and/or more useful regeneration schedule, a small sample of RO membrane 10 may also be placed in a test cell in parallel with the full system. This sample will be running on the same feed and time, and so measurement of chlorine content will very closely match that of the larger system. An even more preferred method of determining regeneration frequency would be to place a passive radio frequency ID (RFID) or other sensor 54 designed to measure the oxidation reduction potential (ORP) either on, in or under nitrogen containing coating layer 52. Sensor 54 can be placed on layer 24 or layer 52 at any point after casting of coating layer 52, for instance during construction of RO membrane 10. For example, sensor 54 can be placed on discrimination layer 24 before the nitrogen containing coating layer 52 is deposited thereon. If sensor 54 is under or in nitrogen containing coating layer 52, sensor 54 may also be used to determine how long the regeneration step should applied by noting when chlorine has begun to penetrate through coating layer 52.

In either location, remote sensor 54 can be used to provide a signal from which the ORP may be measured. When the surface of layer 52 contains chlorine, that is detected by remote sensor 54 as an oxidizing environment. When the level of chlorine drops, the ORP signal also drops, indicating a regeneration with chlorine may be needed.

Referring now to FIG. 18, a functional interpretation of anti-fouling layer 52 formed within discrimination layer 24 is shown as layer 52 with nitrogen species 62 forming chloramines 66 on the upstream face of discrimination membrane 24.

Figure 19:
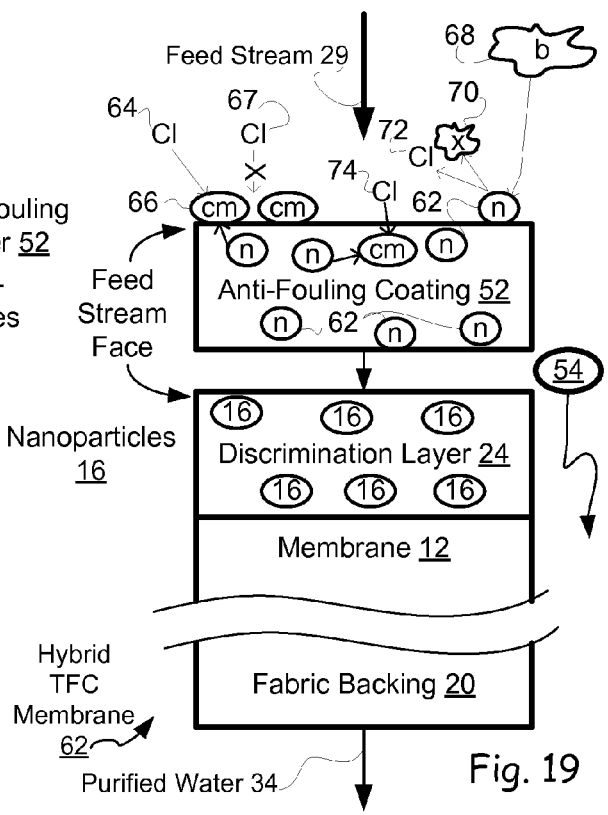

Referring now to FIG. 19, without intending to be bound by our hypotheses, a functional operation is shown for the protective and anti-fouling characteristics of anti-fouling layer 52 positioned on discrimination layer 24 of hybrid TFC membrane 62. The layers are shown apart for ease of description. Discrimination layer 24 may be formed on support membrane 12 backed by fabric 20 by interfacial polymerization as discussed above. Nanoparticles or other additives 16 may be present during interfacial polymerization but only nanoparticles are typically present after fabrication.

The upstream or feed stream face of anti-fouling layer 52, formed on discrimination layer 24, may be used with chlorinated or unchlorinated feed stock and includes a plurality of nitrogen releasing areas 62, that is, areas including halogen reactive nitrogen species which form halamines. When chlorine (Cl) 64 is applied to the feed stream face of anti-fouling coating layer 52, chloramines 66 are formed, typically adjacent the feed stream face of layer 52 because that's where the chlorine first contacts the nitrogen. After the surface of layer 52 has had sufficient contact with chlorine, the surface is covered by chloramines 66 so that additional chlorine 67 may not be able to penetrate the surface of layer 52 as suggested at the to left of the figure.

When a biological potential foulant, such as bacteria 68, attempts to foul the surface of layer 52, an oxidation reaction occurs which kills the bacteria, suggested by dead bacteria 70 at the upper right of the figure which releases chlorine 72 leaving nitrogen in place of the chloramine which was sacrificed. When a sufficient number of chloramines are lost, anti-fouling layer may be recharged with chlorine to revitalize its anti-fouling characteristic.

Before recharging, if chlorine penetrates layer 52, it will encounter some of the excess reactive nitrogen within layer 52 and be converted to a chloramine. Although surface foulants will not encounter chloramine within layer 52, the formation of the chloramine traps the chlorine, preventing its further penetration toward the feed stream face of discrimination membrane 24 where it would chemically damage that membrane. Further, chloramines in layer 52 may be in equilibrium with a small amount of chlorine which may serve to act as a reservoir to allow the surface to be regenerate from within layer 52.

C.5 Theories

Without intended to be bound to our current hypotheses, the hybrid membranes described are believe to achieve better membrane performance because of the differing or cumulative effects of the relatively insoluble additive which typically remains in discrimination membrane 24 and the one or more other additives 16 which may not.

We believe that the introduction of one or more suitable additive(s) 16 into the interfacial polymerization of aqueous phase 14 and organic phase 18 ma have the effect of altering the polymer matrix of discrimination membrane 24 formed thereby so that substantial flux improvement may be achieved when compared to the flux of a control membrane made the same way but without the introduction of such additive(s) 16 thereto.

The use of insoluble additives, such as nanostructured materials, e.g., nanoparticle or nanotube additives 16, seems to increase membrane flux performance—perhaps by modifying, interfering with and/or being included within the polymer matrix being formed—and the introduction of other, perhaps more soluble additives 16 seems to further increase flux performance by also interfering with and/or otherwise modifying the polymer matrix being formed. The insoluble nanostructured additives, such as nanoparticles or nanotubes, are also believed to be primarily responsible for increased resistance to fouling because at least a detectable concentration of the nanoparticles remain in membrane 10 after fabrication while detectable levels of many if not all.

The inclusion of at least some mono- or di-hydrolyzed TMC in organic phase 18 may permit an increased membrane flux, perhaps at the loss of some control of the fabrication process unless filtered.

Additives 16 are believe to assist, template and or otherwise alter the formation of the polymer matrix during interfacial polymerization to achieve the desired membrane performance characteristics. Some additives 16, such as nanoparticles and nanotubes are relatively insoluble materials and may alter the structure of the polymer matrix by physical interference, perhaps as the polymer matrix is formed around such insoluble materials to incorporate them in the matrix. This incorporation can lead to additional flow paths either through or around nanostructured materials or nanoparticle additives 16 leading to increased flux, or by other mechanisms increase the ability of the resultant polymer matrix film to permeate water and retain or reject solutes. For nanoparticles incorporating additional flow paths, the diameter of such flow paths must be of kept of appropriate size to reject desired impurities. The impact on the polymer structure of the incorporated additives 16 can occur in the area up to 10 nm, 1 micron, and even up to 100 microns from a particular nanoparticle additive 16. In such a way, dramatic increases in flux can be obtained by relatively few incorporated nanoparticle additives 16.

Referring now to FIGS. 8 and 9, in some instances some additives 16 such as relatively insoluble nanoparticles may be located at the interface between support membrane 12 and thin polymer film of discrimination layer 24 whether or not they are included in discrimination layer 24. At this location at the surface of membrane 12, additives 16 such as relatively insoluble nanoparticles, can reduce the resistance of flow by creating channels and flow paths between discrimination layer 12 and the microporous pores at the surface of support membrane 12. Because of the relatively low density of pores at the surface of the microporous support membrane 12, reducing the resistance at this location can increase the membrane permeability of RO membrane 10 while maintaining the rejection characteristics.

Further, the use of additives 16 which may be detected in membrane 24 after fabrication may enhance fouling resistance. These relatively insoluble additives 16 may be useful by altering surface characteristics of resultant discrimination membrane 24, for example to make membrane 24 more hydrophilic than a corresponding control membrane made without such additives 16. This hydrophilicity may further be increased by the addition of hydrophilic polymer layer 30 shown in FIG. 6, for example, formed by a polymerized layer of polyvinyl-alcohol on the surface of membrane 24.

Regarding FIGS. 13-14 and the related discussion above, it is believed that the area to the left of the concentration identified as deflection point A, may be the range of concentrations in which additive(s) 16 disclosed herein promote increased flux while some remaining contaminants, such as hydrolyzed TMC—to the extent they effect the formation or structure of the interfacially polymerized discrimination membrane 24—may serve to more or less increase flux without substantially reducing rejection. This area may be called a "contaminant improved flux" zone. At increased concentrations after deflection point A, the effect of such contaminants—if any—may have less beneficial effect on flux but begin to be more detrimental to the rejection characteristics of membrane 10 and called a "contaminant reduced rejection" zone. As the impact of the contaminants continues to increase with increasing concentration of additive(s) 16, a concentration level may be reached, shown in FIG. 13 as deflection point B at 0.02125% adjusted concentration and along flux and rejection curves 36, 38 for filtered lot 2 additive 16 at about 0.0115% concentration at which such contaminants increase the passage of both pure water and materials to be rejected indicating damage or other detriment to membrane 24.

When mhTMC additive 16 is used, in particular in organic phase 18, the mhTMC may react—e.g. with metaphenylenediamine—during the interfacial polymerization to increase the hydrophilicity of resultant polymer discrimination layer 24. It is thought that mhTMC 16 may react with the polyfunctional nucleophilic monomer and may be incorporated along with non-hydrolyzed polyfunctional acyl halide. Either during the interfacial polymerization, or once the polymer matrix is formed, the hydrolyzed acid group present in this reactant may interact with terminal amine residuals on the polyfunctional amine reactant forming ionic cross-links. Such ionic cross-links may increase the hydrophilicity of the polymer matrix relative to a polymer matrix containing amide cross-links exclusively, and thus promote increased water uptake and flux. At the same time, rejection may be maintained by virtue of the electrostatic interactions between the charged group, which is stabilized relative to normal electrostatic interactions, by the rigidity of the cross-linked aromatic backbone keeping the two charged centers close to each other. The ionic crosslink may also allow a slight expansion of the matrix relative to a covalent bond increasing water uptake.

The following tables of examples represent pertinent experiments and the membrane characteristics of resultant membranes 10 so far found to be useful. Some of the experiments indicate the results of changes in concentration and/or ranges and ratios which indicate which such changes produce more—or less—useful membranes. Data for control membranes, and therefore for flux improvement there over, may not have been made or not shown.

Section D: Tables of Examples

D.1 Tables

TABLE 1

| | | | | | | | | |
|---|---|---|---|---|---|---|---|---|
| | Improved TFC (control) Membrane w/o Additives |
| Ex. # | MPD | TMC | Ratio | Aqueous 14 Additive 16 | Organic 18 Additive 16 | % Imp. | FLUX | REJ. |
| 1 | 4% | 0.30% | 13.3 | | | | 22.6 | 99.68% |

TABLE 2

Hybrid Membranes

| Ex. # | MPD | TMC | Ratio | Aqueous 14 Additive 16 | Organic 18 Additive 16 | % Imp. | FLUX | REJ. |
|---|---|---|---|---|---|---|---|---|
| 2 | 2.75% | 0.09% | 30.6 | 0.05% LTA Al 35.9 ppm | | | 31.1 | 99.48% |
| 3 | 2.75% | 0.09% | 30.6 | 0.1% LTA Al 41 ppm | | | 32 | 97.29% |
| 4 | 4% | 0.30% | 13.3 | 0.05% LTA Al 35.9 ppm | | 16% | 26.2 | 99.17% |
| 5 | 4% | 0.30% | 13.3 | 0.05% LTA | 0.02% Be(acac)$_2$ | 8% | 24.3 | 99.50% |
| 6 | 4% | 0.30% | 13.3 | 0.05% LTA | 0.024% Li(acac) | 4% | 23.5 | 99.63% |
| 7 | 4% | 0.30% | 13.3 | 0.05% LTA | 0.029% Na(acac) | −1% | 22.4 | 99.52% |
| 8 | 4% | 0.30% | 13.3 | 0.05% LTA | 0.03% Cu(acac)$_2$ | 9% | 24.6 | 99.39% |
| 9 | 4% | 0.30% | 13.3 | 0.05% LTA | 0.03% Sn(tert-butyl)$_2$Cl$_2$ | 5% | 23.8 | 99.54% |
| 10 | 4% | 0.30% | 13.3 | 0.05% LTA | 0.03% Tributylphosphate | 19% | 26.9 | 99.60% |
| 11 | 4% | 0.30% | 13.3 | 0.05% LTA | 0.03% Triphenylphosphine | 85% | 41.7 | 99.27% |
| 12 | 4% | 0.30% | 13.3 | 0.05% LTA | 0.03% Zn(acac)$_2$ | 4% | 23.4 | 99.58% |
| 13 | 4% | 0.30% | 13.3 | 0.05% LTA | 0.034% K(acac) | 6% | 24.0 | 99.66% |
| 14 | 4% | 0.30% | 13.3 | 0.05% LTA | 0.038% MoO$_2$(acac)$_2$ | 2% | 23.0 | 99.51% |
| 15 | 4% | 0.30% | 13.3 | 0.05% LTA | 0.04% Al(acac)$_3$ | 56% | 35.3 | 99.44% |
| 16 | 4% | 0.30% | 13.3 | 0.05% LTA | 0.04% Al(acac)$_3$ 0.02% mhTMC lot 2 | 41% | 31.8 | 99.51% |
| 17 | 4% | 0.30% | 13.3 | 0.05% LTA | 0.04% Cd(acac)$_2$ | 1% | 22.9 | 99.58% |
| 18 | 4% | 0.30% | 13.3 | 0.05% LTA | 0.04% Co(acac)$_3$ | 12% | 25.2 | 99.50% |
| 19 | 4% | 0.30% | 13.3 | 0.05% LTA | 0.04% Cr(acac)$_3$ | 23% | 27.8 | 99.60% |
| 20 | 4% | 0.30% | 13.3 | 0.05% LTA | 0.04% Cu(F$_3$acac)$_2$ | 41% | 32.0 | 99.24% |
| 21 | 4% | 0.30% | 13.3 | 0.05% LTA | 0.04% Fe(acac)$_3$ | 31% | 29.7 | 99.57% |
| 22 | 4% | 0.30% | 13.3 | 0.05% LTA | 0.04% Pd(acac)$_2$ | 4% | 23.5 | 99.55% |
| 23 | 4% | 0.30% | 13.3 | 0.05% LTA | 0.04% Sn(acac)$_2$Cl$_2$ | 8% | 24.5 | 99.61% |
| 24 | 4% | 0.30% | 13.3 | 0.05% LTA | 0.05% In(acac)$_3$ | 16% | 26.3 | 99.37% |
| 25 | 4% | 0.30% | 13.3 | 0.05% LTA | 0.05% Ru(acac)$_3$ | 24% | 28.0 | 99.65% |
| 26 | 4% | 0.30% | 13.3 | 0.05% LTA | 0.05% Sn(butyl)$_2$(acac)$_2$ | 71% | 38.7 | 98.87% |
| 27 | 4% | 0.30% | 13.3 | 0.05% LTA | 0.05% V(acac)$_3$ | 26% | 28.4 | 99.54% |
| 28 | 4% | 0.30% | 13.3 | 0.05% LTA | 0.058% Sr(F$_6$acac)$_2$ | 63% | 36.8 | 99.57% |
| 29 | 4% | 0.30% | 13.3 | 0.05% LTA | 0.06% Zn(F$_6$acac)$_2$ | 16% | 26.3 | 99.61% |
| 30 | 4% | 0.30% | 13.3 | 0.05% LTA | 0.06% Er(acac)$_3$ | 9% | 24.6 | 99.53% |
| 31 | 4% | 0.30% | 13.3 | 0.05% LTA | 0.06% Yb(acac)$_3$ | −4% | 21.8 | 99.50% |
| 32 | 4% | 0.30% | 13.3 | 0.05% LTA | 0.06% Sr(F$_6$acac)$_2$ 0.02% mhTMC lot 2 | 88% | 42.4 | 99.16% |
| 33 | 4% | 0.30% | 13.3 | 0.05% LTA | 0.07% Hf(acac)$_4$ | 3% | 23.3 | 99.44% |
| 34 | 4% | 0.30% | 13.3 | 0.05% LTA | 0.087% Ni(acac)$_2$ | −4% | 21.8 | 99.53 |
| 35 | 4% | 0.30% | 13.3 | 0.05% LTA | 0.09% Ca(F$_6$acac)$_2$ | 1% | 22.9 | 99.53% |
| 36 | 4% | 0.30% | 13.3 | 0.05% LTA | 0.09% Pr(f$_6$acac)$_3$ | 91% | 43.3 | 98.38% |
| 37 | 4% | 0.30% | 13.3 | 0.05% LTA | 0.09% Ca(F$_6$acac)$_2$ 0.02% mhTMC lot 2 | 69% | 38.1 | 99.31% |
| 38 | 4% | 0.30% | 13.3 | 0.05% LTA | 0.092% Mn(acac)$_3$ | 21% | 27.4 | 99.43% |
| 39 | 4% | 0.30% | 13.3 | 0.05% LTA | 0.093% Mn(acac)$_2$ | 6% | 24.0 | 99.61% |
| 40 | 4% | 0.30% | 13.3 | 0.05% LTA | 0.1% Zr(acac)$_4$ | 11% | 25.0 | 99.51% |
| 41 | 4% | 0.30% | 13.3 | 0.05% LTA | 0.107% Dy(acac)$_3$ | −9% | 20.6 | 99.46% |
| 42 | 4% | 0.30% | 13.3 | 0.05% LTA | 0.111% Sm(acac)$_3$ | 2% | 23.0 | 99.60% |
| 43 | 4% | 0.30% | 13.3 | 0.05% LTA | 0.113% Tb(acac)$_3$ | −4% | 21.6 | 99.51% |
| 44 | 4% | 0.30% | 13.3 | 0.05% LTA | 0.139% Nd(F$_6$acac)$_3$ | 2% | 23.1 | 99.35% |
| 45 | 4% | 0.30% | 13.3 | 0.05% LTA | 0.172% Y(F$_6$acac)$_3$ | 8% | 24.4 | 97.28% |

TABLE 2-continued

| | | | | Hybrid Membranes | | | | |
|---|---|---|---|---|---|---|---|---|
| Ex. # | MPD | TMC | Ratio | Aqueous 14 Additive 16 | Organic 18 Additive 16 | % Imp. | FLUX | REJ. |
| 46 | 4% | 0.30% | 13.3 | 0.05% LTA | 0.44% Mg(F$_6$acac)$_2$ | 27% | 28.7 | 99.71% |
| 47 | 5% | 0.40% | 12.5 | 0.1% LTA | 0.08% Al(acac)$_3$ | | 35.5 | 99.13% |
| 48 | 4% | 0.30% | 13.3 | 0.1% LTA | 0.08% Al(acac)$_3$ | 63% | 36.8 | 98.81% |
| 49 | 3% | 0.20% | 15.0 | 0.1% LTA | 0.08% Al(acac)$_3$ | | 48.6 | 98.37% |
| 50 | 3% | 0.40% | 7.5 | 0.1% LTA | 0.08% Al(acac)$_3$ | | 44.9 | 98.69% |
| 51 | 4% | 0.30% | 13.3 | 0.1% LTA | 0.116% Sr(F$_6$acac)$_2$ | 87% | 42.3 | 98.44% |
| 52 | 3% | 0.20% | 15.0 | 0.1% LTA | 0.116% Sr(F$_6$acac)$_2$ | | 40.7 | 99.20% |
| 53 | 3% | 0.40% | 7.5 | 0.1% LTA | 0.116% Sr(F$_6$acac)$_2$ | | 39.3 | 99.12% |
| 54 | 5% | 0.20% | 25.0 | 0.1% LTA | 0.116% Sr(F$_6$acac)$_2$ | | 40.3 | 99.41% |
| 55 | 5% | 0.40% | 12.5 | 0.1% LTA | 0.116% Sr(F$_6$acac)$_2$ | | 31.3 | 99.27% |
| 56 | 4% | 0.3% | 13.3 | 0.01% LTA 0.1% Sr(F$_6$acac)$_2$ | | 36% | 30 | 99.64 |
| 57 | 4% | 0.30% | 13.3 | 0.05% LTA Al 0.1 ppm | | 9% | 22.5 | 99.62 |
| 58 | 4% | 0.30% | 13.3 | 0.1% LTA Al 41 ppm | | 40% | 24.8 | 98.9 |
| 59 | 3.2% | 0.30% | 10.67 | 0.1% LTA Al 41 ppm | | 79% | 34.05 | 97.5 |
| 60 | 4% | 0.30% | 13.3 | 21NTU LTA Al ?ppm | | 52% | 26.9 | 98.8 |
| 61 | 4% | 0.3% | 13.3 | 0.2% LTA .05% Sr(F$_6$acac)$_2$ | 0.06% Sr(F$_6$acac)$_2$ | 60% | 35.12 | 99.64 |
| 62 | 4% | 0.3% | 13.3 | 0.5% LTA .05% Sr(F$_6$acac)$_2$ | 0.06% Sr(F$_6$acac)$_2$ | 57% | 34.64 | 99.61 |
| 63 | 4% | 0.30% | 13.3 | | 0.05% LTA Al ppm | | 22.6 | 98.77% |
| 64 | 2.75% | 0.09% | 30.6 | | 0.05% LTA Al ppm | | 30.1 | 99.56% |
| 65 | 2.75% | 0.09% | 30.6 | | 0.1% LTA Al ppm | | 28.5 | 99.62% |
| 66 | 4% | 0.30% | 13.3 | | 0.05% LTA 0.02% mhTMC lot 2 | 14% | 25.8 | 99.63% |
| 67 | 4% | 0.30% | 13.3 | | 0.05% LTA 0.04% Al(acac)$_3$ | 48% | 33.4 | 99.54% |
| 68 | 4% | 0.30% | 13.3 | | 0.05% LTA 0.09% Ca(F$_6$acac)$_2$ | 52% | 34.4 | 99.02% |
| 69 | 4% | 0.30% | 13.3 | | 0.1% LTA 0.08% Al(acac)$_3$ | 67% | 37.7 | 99.32% |
| 70 | 3% | 0.20% | 15.0 | | 0.1% LTA 0.08% Al(acac)$_3$ | | 40.1 | 99.22% |
| 71 | 3% | 0.40% | 7.5 | | 0.1% LTA 0.08% Al(acac)$_3$ | | 41.6 | 98.61% |
| 72 | 5% | 0.40% | 12.5 | | 0.1% LTA 0.08% Al(acac)$_3$ | | 29.3 | 99.32% |
| 73 | 4% | 0.30% | 13.3 | | 0.1% LTA 0.08% Ga(acac)$_3$ | 50% | 33.8 | 99.54% |
| 74 | 4% | 0.30% | 13.3 | | 0.1% LTA 0.116% Sr(F$_6$acac)$_2$ | 77% | 40 | 98.63% |
| 75 | 3% | 0.40% | 7.5 | | 0.1% LTA 0.116% Sr(F$_6$acac)$_2$ | | 29.5 | 98.61% |
| 76 | 5% | 0.40% | 12.5 | | 0.1% LTA 0.116% Sr(F$_6$acac)$_2$ | | 30.3 | 99.15% |
| 77 | 4% | 0.30% | 13.3 | 0.05% BETA | 0.058% Sr(F$_6$acac)$_2$ | 33% | 30 | 99.61% |
| 78 | 4% | 0.30% | 13.3 | 0.05% FAU | 0.058% Sr(F$_6$acac)$_2$ | 47% | 33.2 | 99.42% |
| 79 | 4% | 0.30% | 13.3 | | 0.05% NANOTUBE 0.04% Ga(acac)$_3$ | 39% | 31.5 | 99.62% |
| 80 | 4% | 0.30% | 13.3 | | 0.05% NANOTUBE 0.058% Sr(F$_6$acac)$_2$ | 72% | 38.76 | 98.83% |
| 81 | 4% | 0.30% | 13.3 | | 0.05% NANOTUBE 0.06% mhTMC | 62% | 36.5 | 97.37% |
| 82 | 4% | 0.30% | 13.3 | | 0.05% CuMOF 0.058% Sr(F$_6$acac)$_2$ | 51% | 34.2 | 99.53% |
| 83 | 4% | 0.30% | 13.3 | 0.05% SiO$_2$ | 0.058% Sr(F$_6$acac)$_2$ | 62% | 36.6 | 98.66% |

TABLE 3

TFC Membranes with Nanostructured Additives

| Ex. # | MPD | TMC | Ratio | Aqueous 14 Additive 16 | Organic 18 Additive 16 | % Imp. | FLUX | REJ. |
|---|---|---|---|---|---|---|---|---|
| 84 | 4% | 0.30% | 13.3 | 0.05% LTA Al0.1 ppm | | 9% | 22.5 | 99.62 |
| 85 | 4% | 0.30% | 13.3 | 0.1% LTA Al41 ppm | | 40% | 24.8 | 98.9 |
| 86 | 3.2% | 0.30% | 10.67 | 0.1% LTA Al41 ppm | | 79% | 34.05 | 97.5 |
| 87 | 4% | 0.30% | 13.3 | 21NTU LTA Al?ppm | | 52% | 26.9 | 98.8 |
| 88 | 4% | 0.30% | 13.3 | 0.05% BETA | | 0% | 22.7 | 99.51% |
| 89 | 4% | 0.30% | 13.3 | 0.05% $SiO_2$ | | −1% | 22.3 | 99.57% |
| 90 | 4% | 0.30% | 13.3 | | 0.05% CuMOF | 8% | 24.3 | 99.71% |
| 91 | 4% | 0.30% | 13.3 | | 0.1% NANOTUBE | 26% | 28.5 | 99.64% |

TABLE 4

TFC Membranes without Nanostructured Additives

| Ex. # | MPD | TMC | Ratio | Aqueous 14 Additive 16 | Organic 18 Additive 16 | % Imp. | FLUX | REJ. |
|---|---|---|---|---|---|---|---|---|
| 92 | 4% | 0.30% | 13.3 | | 0.013% $Hf(acac)_4$ | 12% | 25.4 | 99.55% |
| 93 | 4% | 0.30% | 13.3 | | 0.024% Li(acac) | −1% | 22.3 | 99.54% |
| 94 | 4% | 0.30% | 13.3 | | 0.029% Na(acac) | 11% | 25 | 99.44% |
| 95 | 4% | 0.30% | 13.3 | | 0.034% K(acac) | 0% | 22.6 | 99.44% |
| 96 | 4% | 0.30% | 13.3 | | 0.04% $Al(acac)_3$ | 34% | 30.2 | 99.38% |
| 97 | 4% | 0.30% | 13.3 | | 0.048% $Be(acac)_2$ | 29% | 29.2 | 99.49% |
| 98 | 6% | 0.20% | 30.00 | | 0.05% $Al(acac)_3$ | 55% | 37.6 | 98.73% |
| 99 | 6% | 0.30% | 20.00 | | 0.05% $Ga(acac)_3$ | 43% | 34.8 | 98.43% |
| 100 | 6% | 0.30% | 20.00 | | 0.05% $Fe(acac)_3$ | 41% | 34.2 | 99.47% |
| 101 | 6% | 0.30% | 20.00 | | 0.08% $Cr(acac)_3$ | 13% | 27.5 | 98.21% |
| 102 | 6% | 0.30% | 20.00 | | 0.06% Tributylphosphate | 24% | 30.1 | 99.51% |
| 103 | 6% | 0.30% | 20.00 | | 0.06% Triphenylphosphine | 32% | 32 | 97.45% |
| 104 | 4% | 0.30% | 13.3 | | 0.058% $Sr(F_6acac)_2$ | 31% | 29.7 | 99.57% |
| 105 | 4% | 0.30% | 13.3 | | 0.06% $Cu(acac)_2$ | 19% | 26.8 | 99.48% |
| 106 | 2.5% | 0.09% | 27.78 | | 0.062% Tributylphosphate | 10% | | 99.32% |
| 107 | 2.5% | 0.30% | 8.33 | | 0.062% Tributylphosphate | 48% | | 99.19% |
| 108 | 2.5% | 0.50% | 5.00 | | 0.062% Tributylphosphate | 85% | | 98.92% |
| 109 | 4% | 0.09% | 44.44 | | 0.062% Tributylphosphate | 28% | | 91.64% |
| 110 | 4% | 0.30% | 13.33 | | 0.062% Tributylphosphate | 44% | | 99.37% |
| 111 | 4% | 0.50% | 8.00 | | 0.062% Tributylphosphate | 44% | | 99.00% |
| 112 | 4% | 0.30% | 13.3 | | 0.065% $Sn(tert-butyl)_2Cl_2$ | 17% | 26.5 | 99.07% |
| 113 | 4% | 0.30 | 13.3 | | 0.062% Tributylphosphate | | 31.8 | 99.37% |
| 114 | 4% | 0.30% | 13.3 | | 0.065% $Zn(acac)_2$ | 4% | 23.6 | 99.48% |
| 115 | 4% | 0.30% | 13.3 | | 0.072% $Cd(acac)_2$ | 15% | 26 | 99.70% |
| 116 | 4% | 0.30% | 13.3 | | 0.075% $Ga(acac)_3$ | 89% | 43 | 98.7% |
| 117 | 4% | 0.30% | 13.3 | | 0.076% $MoO_2(acac)_2$ | 31% | 29.5 | 99.53% |
| 118 | 4% | 0.30% | 13.3 | | 0.077% $Pd(acac)_2$ | 15% | 25.9 | 99.66% |
| 119 | 4% | 0.30% | 13.3 | | 0.08% $Ga(acac)_3$ | | 32 | 99.64% |
| 120 | 2.5% | 0.10% | 25.00 | | 0.08% $Ga(acac)_3$ | 20% | | 99.00% |
| 121 | 2.5% | 0.20% | 12.50 | | 0.08% $Ga(acac)_3$ | 31% | | 99.11% |
| 122 | 2.5% | 0.30% | 8.33 | | 0.08% $Ga(acac)_3$ | 42% | | 99.48% |
| 123 | 2.5% | 0.40% | 6.25 | | 0.08% $Ga(acac)_3$ | 34% | | 99.32% |
| 124 | 2.5% | 0.50% | 5.00 | | 0.08% $Ga(acac)_3$ | 23% | | 99.22% |
| 125 | 4% | 0.10% | 40.00 | | 0.08% $Ga(acac)_3$ | 29% | | 24.05% |
| 126 | 4% | 0.20% | 20.00 | | 0.08% $Ga(acac)_3$ | 34% | | 99.37% |
| 127 | 4% | 0.30% | 13.33 | | 0.08% $Ga(acac)_3$ | 28% | | 99.64% |
| 128 | 4% | 0.40% | 10.00 | | 0.08% $Ga(acac)_3$ | 42% | | 99.50% |
| 129 | 4% | 0.50% | 8.00 | | 0.08% $Ga(acac)_3$ | 57% | | 99.55% |
| 130 | 4% | 0.30% | 13.3 | | 0.084% $Fe(acac)_3$ | 90% | 42.9 | 98.70% |
| 131 | 4% | 0.30% | 13.3 | | 0.085% $Cu(F_3acac)_2$ | 83% | 41.3 | 98.98% |

TABLE 4-continued

TFC Membranes without Nanostructured Additives

| Ex. # | MPD | TMC | Ratio | Aqueous 14 Additive 16 | Organic 18 Additive 16 | % Imp. | FLUX | REJ. |
|---|---|---|---|---|---|---|---|---|
| 132 | 4% | 0.30% | 13.3 | | 0.086% Co(acac)$_3$ | 47% | 33.2 | 99.62% |
| 133 | 4% | 0.30% | 13.3 | | 0.086% Cr(acac)$_3$ | 37% | 31 | 99.64% |
| 134 | 4% | 0.30% | 13.3 | | 0.086% Sn(acac)$_2$Cl$_2$ | 27% | 28.8 | 99.46% |
| 135 | 4% | 0.30% | 13.3 | | 0.09% Ca(F$_6$acac)$_2$ | 10% | 24.8 | 99.63% |
| 136 | 4% | 0.30% | 13.3 | | 0.092% Ru(acac)$_3$ | 23% | 27.8 | 99.72% |
| 137 | 3.2% | 0.17% | 18.82 | | 0.1% Al(acac)$_3$ | 76% | | 98.33% |
| 138 | 3.2% | 0.30% | 10.67 | | 0.1% Al(acac)$_3$ | 80% | | 98.86% |
| 139 | 4% | 0.17% | 23.53 | | 0.1% Al(acac)$_3$ | 29% | | 95.23% |
| 140 | 4% | 0.30% | 13.33 | | 0.1% Al(acac)$_3$ | | 31 | 99.05% |
| 141 | 4% | 0.30% | 13.3 | | 0.1% In(acac)$_3$ | 38% | 31.2 | 99.30% |
| 142 | 4% | 0.30% | 13.3 | | 0.1% Sn(butyl)$_2$(acac)$_2$ | 117% | 49.1 | 97.81% |
| 143 | 4% | 0.30% | 13.3 | | 0.11% Ca(acac)$_2$ | 23% | 27.9 | 99.58% |
| 144 | 4% | 0.30% | 13.3 | | 0.11% Er(acac)$_3$ | 5% | 23.7 | 99.62% |
| 145 | 4% | 0.30% | 13.3 | | 0.11% Yb(acac)$_3$ | 9% | 24.6 | 99.52% |
| 146 | 2.5% | 0.09% | 27.78 | | 0.116% Sr(F$_6$acac)$_2$ | 1% | | 99.25% |
| 147 | 2.5% | 0.30% | 8.33 | | 0.116% Sr(F$_6$acac)$_2$ | 53% | | 99.21% |
| 148 | 2.5% | 0.50% | 5.00 | | 0.116% Sr(F$_6$acac)$_2$ | 46% | | 99.11% |
| 149 | 4% | 0.09% | 44.44 | | 0.116% Sr(F$_6$acac)$_2$ | 13% | | 23.38% |
| 150 | 4% | 0.30% | 13.33 | | 0.116% Sr(F$_6$acac)$_2$ | 46% | | 99.38% |
| 151 | 4% | 0.50% | 8.00 | | 0.116% Sr(F$_6$acac)$_2$ | 34% | | 99.11% |
| 152 | 4% | 0.30% | 13.3 | | 0.116% Sr(F$_6$acac)$_2$ | | 32.2 | 99.38% |
| 153 | 4% | 0.30% | 13.3 | | 0.12% Zn(F$_6$acac)$_2$ | 44% | 32.6 | 99.63% |
| 154 | 4% | 0.30% | 13.3 | | 0.13% Nd(F$_6$acac)$_3$ | 11% | 25 | 99.60% |
| 155 | 4% | 0.30% | 13.3 | | 0.18% Pr(F$_6$acac)$_3$ | 46% | 33 | 99.28% |
| 156 | 3.2% | 0.17% | 18.82 | | 0.2% Al(acac)$_3$ w/ sodium carbonate rinse | 22% | 27.6 | 99.13% |
| 157 | 3.2% | 0.17% | 18.82 | | 0.2% Al(acac)$_3$ w/ sonication | 57% | 27.7 | 99.2% |
| 158 | 3.2% | 0.17% | 18.82 | | 0.2% Al(acac)$_3$ w/ stirring | 20% | 21.2 | 99.5% |
| 159 | 4% | 0.30% | 13.3 | | 0.25% Al(acac)$_3$ | 104% | 20.2 | 99.7% |
| 160 | 3.2% | 0.17% | 18.82 | | 0.3% AlCl$_3$ | 15% | 16.1 | 99.6% |
| 161 | 3.2% | 0.17% | 18.82 | | 0.5% Sodium Aluminate | 53% | 30.6 | 96.77% |
| 162 | 3.2% | 0.17% | 18.82 | | 0.5% Sodium Aluminate | 45% | 26.3 | 98.3% |
| 163 | 3.2% | 0.17% | 18.82 | | 0.5% Sodium Aluminate | 42% | 25.9 | 98.8% |
| 164 | 3.2% | 0.17% | 18.82 | | 0.5% Sodium Aluminate | 81% | 33.2 | 96.32% |
| 165 | 3.2% | 0.17% | 18.82 | | 0.5% Sodium Aluminate | 12% | 20.5 | 98.75% |
| 166 | 4% | 0.30% | 13.3 | | 0.1% Al(acac)$_3$ | 60% | 25.5 | 99.35% |
| 167 | 4% | 0.30% | 13.3 | | 0.44% Mg(F$_6$acac)$_2$ | 24% | 28.0 | 99.6% |

TABLE 5 mhTMC Additive in TFC MEMBRANES

| Ex. # | MPD | TMC | Ratio | Aqueous 14 Additive 16 | Organic 18 Additive 16 | % Imp. | FLUX | REJ. |
|---|---|---|---|---|---|---|---|---|
| | | | | Control Membrane for Lot 1 | | | | |
| 168 | 4% | 0.30% | 13.3 | | 0% mhTMC lot 1 | | 24 | 99.70% |
| 169 | 4% | 0.30% | 13.3 | | .0094% mhTMC lot 1 | 34% | 32.1 | 99.60% |
| 170 | 4% | 0.30% | 13.3 | | 0.028% mhTMC lot 1 | 16% | 39.7 | 98.60% |
| 171 | 4% | 0.30% | 13.3 | | 0.031% mhTMC lot 1 | 21% | 45.1 | 96.20% |
| | | | | Control Membrane for Lot 2 | | | | |
| 172 | 4% | 0.30% | 13.3 | | 0% mhTMC lot 2 | | 17.2 | 99.62% |
| 173 | 4% | 0.30% | 13.3 | | 0.005% mhTMC lot 2 | 19% | 20.5 | 99.54% |
| 174 | 4% | 0.30% | 13.3 | | 0.01% mhTMC lot 2 | 50% | 25.8 | 99.45% |
| 175 | 4% | 0.30% | 13.3 | | 0.02% mhTMC lot 2 | 72% | 29.5 | 99.24% |
| 176 | 4% | 0.30% | 13.3 | | 0.03% mhTMC lot 2 | 72% | 29.6 | 99.05% |
| 177 | 4% | 0.30% | 13.3 | | 0.04% mhTMC lot 2 | 79% | 30.8 | 98.18% |
| 178 | 4% | 0.30% | 13.3 | | 0.05% mhTMC lot 2 | 81% | 31.1 | 97.69% |
| 179 | 4% | 0.30% | 13.3 | | 0.06% mhTMC lot 2 | 81% | 31.2 | 96.07% |
| 180 | 4% | 0.30% | 13.3 | | 0.1% mhTMC lot 2 | 117% | 37.4 | 92.25% |

TABLE 5-continued mhTMC Additive in TFC MEMBRANES

| Ex. # | MPD | TMC | Ratio | Aqueous 14 Additive 16 | Organic 18 Additive 16 | % Imp. | FLUX | REJ. |
|---|---|---|---|---|---|---|---|---|
| | | | | After Filtering | | | | |
| 181 | 4% | 0.30% | 13.3 | | 0.03% mhTMC lot 2 | 53% | 26.4 | 99.56% |
| 182 | 4% | 0.30% | 13.3 | | 0.06% mhTMC lot 2 | 84% | 31.9 | 99.11% |

TABLE 6

FOULING TESTS

| Ex. # | MPD | TMC | Ratio | Aqueous 14 Additive 16 | Organic 18 Additive 16 | Flux at 1 hr | Flux at 47 hrs | REJ. |
|---|---|---|---|---|---|---|---|---|
| 183 | 4% | 0.30% | 13.3 | | 0.08% Ga(acac)$_3$ | 30.8 | 20.9 | 99.53% |
| 184 | 4% | 0.30% | 13.3 | | 0.1% LTA | 22.5 | 22.5 | 98.50% |
| 185 | 4% | 0.30% | 13.3 | | 0.1% LTA 0.08% Ga(acac)$_3$ | 31.9 | 27.3 | 99.42% |

D.2 Preparation Procedures

A. General Procedures

The general procedure for the preparation of a flat cell test membrane, using the concentrations shown in the tables, was to prepare aqueous and organic phases, add the desired additives to one or both of these phases, apply the aqueous phase to a wet polysulphone membrane support on a glass plate and then apply the organic phase to the aqueous phase on the membrane support as described in more detail immediately below. Control membranes were made in a similar way, except without the additive(s). All performance data unless otherwise noted was obtained from flat sheet testing on NaCl (32,000 ppm) in DI water tested at 800 psi after 1 hour of running.

Aqueous Phase 14: An aqueous solution of MPD, 4.5 wt % of triethylammonium camphorsulfonate (TEACSA) and 0.06 wt % sodium lauryl sulfate (SLS) in DI water was prepared.

Organic Phase 18: An Isopar G® solution with TMC was also prepared and sonicated for up to 60 minutes. Isopar is a trademark of Exxon Corp.

Additive(s) 16: A homogenous solution of each of the additive(s) was added to—and/or dissolved in—either the aqueous phase, the organic phase or both.

i) For aqueous phase additive(s), either the solid nanoparticle or an aqueous dispersion of nanoparticles, when used, was added to the aqueous phase.

ii) For organic phase additive(s), the additive was dissolved in an aromatic cosolvent e.g. xylene or mesitylene. Final concentration of the cosolvent was 4 wt % by wt. %. mhTMC, when used, was added to TMC in the organic phase and the Isopar solution was allowed to sit for 1 hour before use. Nanoparticles, when used, were added to the TMC and sonicated for 30 minutes.

Support membrane 12: A piece of wet polysulfone support was placed flat on a clean glass plate. An acrylic frame was then placed onto the membrane surface, leaving an area for the interfacial polymerization reaction to take place.

Discrimination membrane 24: Approximately 50 mL of the aqueous MPD solution was poured onto the framed membrane surface and remained for up to 2 min. The solution was drained by tilting the frame till no solution dripped from the frame.

i) The frame was taken off, and was left horizontally for 1 minute. The membrane was then clamped with the glass plate in four corners. An air knife was used to finish drying the membrane surface. The membrane was reframed using another clean and dry acrylic frame and kept horizontally for 1 min.

ii) Approximately 50 mL of the organic solution was poured onto the framed membrane surface and remained for 2 minutes. The solution was drained by tilting the frame (vertically) till no solution dripped from the frame. The acrylic frame was removed, and the membrane was kept horizontally for 1 minute. The membrane was then dried at 95° C. for 6 minutes.

Anti-Fouling Layer 52

Coating

Through the use of sonication, followed by microfluidization, a dispersion may be prepared containing polyvinyl alcohol (99% hydrolyzed) in water. This solution may then be applied to the surface of an RO membrane prepared by the method of the control membrane above and/or any of the other membranes 10 discussed herein. This solution may then be dried at 95° C.

Deposition of Nitrogen Containing Layer 52

Polysulfone-sulfonamide may be prepared from sulfonated polysulfone by a first reaction with phosphorous pentachloride to form sulfonyl chloride polysulfone. The sulfonyl chloride polysulfone may then be treated with an aqueous solution of ammonia to form the desired product. Some amount of residual sulfonate may be present, this can aid in exclusion of hypochlorite. The polysulfone-sulfonamide may then be dissolved in a 1:1 solution of acetone and water (the amount of water may be adjusted if the porous support layer is not stable to this solution) to form the product solution. Alternatively, a solvent other than acetone may be used to improve compatibility). The product solution may then be applied to the thin film surface, .e.g. discrimination layer 24, of a membrane prepared by the method of the control membrane above and/or any of the other membranes 10 discussed herein. The product solution may then be dried at 120° C. The degree of sulfonation and conversion to sulfonamide in the product solution may be used to control aqueous solubility.

UV Polymerization of Nitrogen Containing Layer 52

A membrane may be prepared by the method of the control membrane above and/or any of the other membranes 10 discussed herein. An acidic solution (pH 3) of the HCl acid salt of 2,2,6,6-tetramethyl-4-piperdyl methacrylate in water may be prepared. To this a 0.3 mM persulphate/bisulphite and 2,2'-azobis (2-amidinopropane) dihydrochloride may be added to serve as a hybrid photo-initiator. This solution may then be applied to the polyamide surface of the membrane and polymerized by exposure to a high-pressure Hg lamp for 15 minutes.

Grafting of Nitrogen Containing Monomers by Epoxides

A membrane may be prepared by the method of the control membrane above and/or any of the other membranes 10 discussed herein. A solution containing 3-glycidyl-5,5-dialkyl-hydantoin (0.26M) may be prepared in a 1:1 by weight solution of acetone and water (the amount of water may be adjusted if the porous support layer is not stable to this solution. Alternatively, a solvent other than acetone may be used to improve compatibility). This solution may be allowed to remain in contact for a short period of time with membrane 10 and then thermally cured at up to 120° C.

Flat Sheet Formation of Halamines from Nitrogen Containing Coating Layer 52

A flat sheet membrane, having a nitrogen containing coating layer, may be prepared as in examples 2-5 above. If desired, rinsing may be used to remove residuals. 80° C. water is preferably used for this purpose. The membrane may then be exposed to a solution of 100 to 5000 ppm sodium hypochlorite for 2 to 30 minutes. The membrane may then be rinsed and dried again at 95° C.

Element Formation of Halamines from Nitrogen Containing Coater Layer 52

A spiral wound element may be prepared from RO membrane 10 having a nitrogen containing coating layer prepared as in example 2-5. This element may be rinsed by passing water through the element which may be accomplished, for example, by loading the spiral would element into a pressure vessel and testing at sufficient pressure to enable water to permeate the membrane. The water may optionally be of elevated temperature or have additives such as surfactants to aid in rinsing out residual chemicals. The membrane may then be operated on a feed solution containing 50-5000 ppm of sodium hypochlorite for 15-45 minutes to allow formation of halamines. The membrane may then be finally rinsed with water and was ready for use.

Testing: All performance data unless otherwise noted were obtained from flat sheet testing on NaCl (32,000 ppm) in DI water tested at 800 psi after 1 hour of running.

Separation Efficacy: Membrane performance may be measured in a flat sheet cell test apparatus. Testing may be conducted at a Reynolds number of 2500, so that build up of rejected solutes at the membrane surface leads to a concentration preferably no more than 10% higher than that in the bulk. All testing may be performed on 32,000 ppm NaCl in tap, deionized (DI) or RO water, at 25° C. and 800 psi. Membranes may be run for 1 hour before performance characteristics (e.g. water flux and salt rejection) are measured.

Contact angle: Contact angles may be those of DI water at room temperature. Membranes may be thoroughly rinsed with water, and then allowed to dry in a vacuum desiccator to dryness. Membranes 10 may be dried in a vertical position to prevent redeposition of any extracted compounds that may impact contact angle. Due to the occasional variability in contact angle measurements, 12 angles may be measured with the high and low angles being excluded and the remaining angles averaged.

Flux Improvement: The percentage of flux improvement may then calculated relative to a control membrane made with the same concentration of MPD and TMC, with no nanoparticles or additives, as the increase in GFD divided by the GFD of the control.

B. Specific Nanostructured Material Procedures.

The following examples use the same procedures as discussed above, except where noted.

With regard now to example 59, an aqueous dispersion of nanoparticle additive 16, including LTA having a nominal 150 nm diameter, was sonicated for 30 minutes and added to aqueous phase 14. The resultant TFC membrane 10 provided an almost 80% increase in flux over the control membrane.

With regard to example 50, the aqueous dispersion of nanoparticle additive 16, including LTA having a nominal 300 nm diameter, was added to aqueous phase 14 in a commercial continuous process system. The final solution turbidity was 21 nephelometric turbidity units (NTU). This continuous process included a brief application of a vacuum, which led to a concentration of nanoparticle additives 16, i.e. LTA nanoparticles, at the surface of discrimination member 24. The contact angle in resultant TFC membrane 10 decreased from 50.7° in the control membrane to 37.6° in membrane with nanoparticles.

With regard to example 57, an aqueous dispersion including 0.2 wt % of sodium lauryl sulfate (SLS) and nanoparticle additive 16 having 0.05% LTA with a nominal 80 nm diameter, was sonicated for 30 minutes and then added to aqueous phase 14. Resultant TFC membrane 10 showed only a 9% improvement in flux over a control membrane.

Regarding example 58, in a continuous coating process, an aqueous dispersion of LTA nanoparticles 16 was prepared by sonicating a 5% solution of LTA in water for 5 minutes, followed by 20 minutes of microfluidization, and stirring overnight. The dispersed LTA solution was then added to aqueous phase 14 having 0.2% SLS to produce TFC membrane 10 which showed a 40% increase of flux over a control membrane.

Various forms of nanoparticle additives 16 were tested to determine the concentration of soluble metal ions released thereby.

1) Approximately 39 wt. % of template-free zeolite LTA nanoparticle additive 16, in an aqueous dispersion in deionized water (DI) yielded an aluminum content of 130.9 ppm after being subjected to impact, cavitation and shear forces in a microfluidizer. A similar dispersion of templated zeolite LTA nanoparticles (5%) showed an aluminum content of only 2.9 ppm.

Various other forms of nanoparticle additive 16, in an aqueous dispersion in 500 ml of DI water, were tested at room temperature of approximately 20° C. for release of Al on a laboratory shaker table, as follows:

2) 0.05% free zeolite LTA having a 1:1 Si:Al ratio yielded 35.90 parts per million (ppm) based on an average of 77 to 160 day data.

3) 0.05% templated zeolite LTA having a 1.5:1 Si:Al ratio yielded less than 0.1 ppm based on an average of 1 to 84 day data.

4) 0.05% zeolite FAU having about a 2.5:1 Si:Al ratio also yielded less than 0.1 ppm based on 2 day data.

TFC membranes 10 were prepared with nanoparticle additives 16—having differing Si:Al ratios—tested and yielded different flux performances. Each TFC membrane 10 was produced with an aqueous solution including 0.2 wt. % SLS in DI water contained of zeolite nanoparticle additive 16 which had been sonicated for 30 minutes before use. The test results, expressing flux in gallons per square foot of membrane per day (gfd), were as follows:

5) 0.05 wt. % template free zeolite LTA having a 1:1 Si:Al ratio yielded a 13% flux improvement over the control membrane.

6) 0.05 wt. % templated zeolite LTA with a 1.5:1 Si:Al ratio yielded only a 9% flux improvement.

7) 0.05 wt. % zeolite KFI with a 2.2:1 Si:Al ratio yielded no flux improvement.

8) 0.1 wt % template-free zeolite LTA having a 1:1 Si:Al ratio yielded a 50% flux improvement over the control membrane under similar conditions.

Regarding example 159, TFC membrane 10 made with a 0.25% Al (acac)$_3$ nanoparticle additive 16 dispersed in an Isopar G® solution with 0.3 wt % TMC in organic phase 18 which yielded a contact angle of 25.2° with DI water, a substantial improvement over the 52.9° contact angle of a control membrane.

With regard to example 166, TFC membrane 10 was made with a 0.1% Al (acac)$_3$ additive 16, dispersion in an Isopar G® solution with 0.3 wt % TMC in organic phase 18 and was successfully tested in flat cells on pretreated seawater taken from the Pacific Ocean and yielded a 60% flux improvement over a similar control membrane.

With regard to example 161, 0.5% sodium aluminate additive 16, was used in aqueous phase 14 with Hexane as the solvent in organic phase 18 to fabricate TFC membrane 10. A 53% flux improvement over a similar control membrane was noted. This example illustrates the beneficial effects on resultant membrane 10 of the presence of soluble aluminum species in the aqueous phase during interfacial polymerization, whether added as additive 16 and/or released from nanoparticle additive 16—in appropriate concentrations—as discussed.

With regard now to example 162, citric acid was added to the amine in the sodium aluminate example 99 above to bring the pH to the range of 7.5-9. Membrane 10 yielded a flux increase of 45%. The control did not require any acid addition.

With regard to example 163, camphorsulfonic acid was added to aqueous phase 14 of another TFC membrane 10 prepared in accordance with example J 99 above to bring the pH to the range of 7.5-9. The insoluble precipitate that formed was filtered before use. Membrane 10 yielded a 42% flux increase compared to its control membrane which did not require any acid addition.

With regard to example 160, organic phase 18 included a hexane solution with nanoparticle additive 16—0.3% AlCl$_3$—which was sonicated for 60 minutes before use in fabricating TFC membrane 10. A 15% flux improvement was noted.

With regard to example 156, RO membrane 10 was made in accordance with example 159, except that nanoparticle 16 included 0.2% Al (acac)$_3$. TFC membrane 10 was then rinsed in a 0.2% sodium carbonate solution before testing and yielded a flux improvement of 22% over its control membrane which was not rinsed in the sodium carbonate solution to evaluate the effect of this rinsing.

With regard to example 157, membrane 10 was fabricated in accordance with example 103, except organic phase 18 was only sonicated for 10 minutes. A flux improvement of 57% was noted.

With regard to example 158, membrane 10 was fabricated in accordance with example 159, except organic phase 18 was mechanically stirred for 60 minutes. A flux improvement of 20% was noted over its control membrane which was not stirred. A second control membrane was also made which was mechanically stirred for 60 minutes to test the benefits of stirring and a contact angle improvement from was noted over the first control membrane from 52.9° to 25.2°.

With regard to nanoparticle additive 16,—e.g., template-free zeolite LTA nanoparticles in an aqueous dispersion—were found to have aluminum content after being subjected to impact, cavitation and shear forces in a microfluidizer. The dispersion contained approximately 39 wt. % percent LTA made with double distilled water. When measured using ICP analysis, the solution had an aluminum content of 130.9 parts per million (ppm).

With regard to example 116, in a continuous coating process, TFC membrane 10 was made in accordance with example 159 except that inorganic additive 16—0.075% Ga(acac)$_3$—was used in organic phase 18. Contact time for aqueous and organic solutions were about 15 seconds. The flux improvement compared to the control was 43/22.7 or 89%.

With regard to examples 164 and 165, two membranes were fabricated in accordance with example 161 above, a first one using a first lot of TMC which was approximately 99.5% pure, the a second one using a second lot of TMC other about 98.5% pure (purity from vendor) with trace amounts of mono-, di-, and tri-hydrolyzed TMC. The control membranes with either TMC lot gave similar performance and were averaged for the "control" data (18.3gfd and 98.85%). TFC membrane 10 using lot 2 provided an 81% flux improvement over the control, while TFC membrane 10 using lot 1 provided only a 12% flux improvement.

C. Specific Procedures for Fouling Tests

Referring now in particular to Table 9, FOULING TEST, example 184 is based on other experiments in which 0.1% of nanoparticles zeolite LTA, was added to the organic phase before interfacial polymerization or IFP with an aqueous phase to produce a discrimination layer on a support layer and form a thin film nanocomposite or TFC membrane.

Membranes were prepared using general procedures. Membranes were run on a feed solution of DI water with 32,000 ppm of a salt blend formulated to simulate natural ocean water (Instant Ocean®). Temperature was maintained at 25° C. and a pressure of 800 psi was used throughout testing. No filtration was used during this test allowing inorganic and organic colloids to recirculate through the system and biological material to grow. Performance data was taken 1 hr after testing began and again 47 hrs later after continuous operation.

Example 183 shows that a particular additive 16, Ga (acac)$_3$, provided a reasonable total flux of 30.8 GFD, which provided a flux improvement of about 36% over a control without additives and maintained a very good salt rejection of over 99.5%. However, the Ga additive membrane showed a poor flux performance after 47 hours of fouling testing, losing almost half of its flux capacity.

Example 185 illustrates one of the benefits of a hybrid TFC membrane approach in which nanoparticles, such as LTA are combined with molecular additives, such as Ga(acac)$_3$, to form an improved hybrid TFC membrane with qualities superior than are provided by either additive separately. In particular, the hybrid LTA Ga membrane provided 31.9 GFD flux, an improvement of about 41% more than the control with only slight loss in salt rejection. The further increase in flux is on the order of an addition 14% when compared to the 36% flux increase of the Ga(acac)$_3$ additive. Perhaps even more importantly, the flux rate after the 47 hour test was 27.3 GFD, i.e. the flux loss was only 17% after the 47 hour test. As a result, the hybrid TFC membrane has substantially the flux improvement of its soluble additive, in this case the Ga (acac)₃, and the fouling resistance of the LTA nanoparticles.

Section E: Advantages

Hybrid membranes, that is, membranes with nanoparticles, and additives such as soluble ions, organometallic compounds, inorganic additives with or without ligands, and/or mhTMC enable a new degree of design flexibility to improve the overall flux, rejection, and fouling properties of membranes. The several cases discussed below are meant to illustrate the range of benefits that can be realized through the application of hybrid membrane technology and are not meant to limit the scope of this application which is provided by the issued claims.

E.1 Increased Flux

Regarding increased flux compared to membranes with the individual additives, and referring now in particular to Tables 2, 2.1 and 2.2, a hybrid membrane including both nanoparticles and other selected materials such as earth alkaline metal complex in additive 16 may provide a useful level of improvement of membrane operational characteristics, e.g., flux, rejection and flux improvement, over the use of a single material in additive 16.

As can be seen from an inspection of the tables of examples, some nanostructured and other additives do not provide an obvious or substantial improvement in performance when used alone. However, combinations of nanoparticles and additives have proven to be substantially useful by providing flux increases when incorporated into hybrid TFC membranes.

As shown in example 63, a 0.05% concentration of LTA to the Isopar G® based organic phase before contact during IFP with the aqueous phase yields a nanocomposite TFC membrane with a 22.6 GFD flux, equal to that of the control membrane, but a salt rejection of 98.77%, lower than the 99.68% of the control membrane.

As shown in example 135, a 0.09% Ca(F₆acac)₂ additive to the Isopar G® based organic phase yields a TFC membrane with 24.8 GFD flux having about a 10% flux increase over the control membrane without additives, with a good salt rejection of 99.63%.

Referring now to example 68, a membrane made with LTA and the Ca additive in the Isopar® based organic phase yields a nanocomposite hybrid TFC membrane having 34.4 GFD flux, a 52% flux increase over the control membrane without additives but with good salt rejection of 99.03%.

As can be seen by inspection of the tables, some additives may have acceptable flux increases but decreased rejection when used alone. However, some combinations of such additives produce hybrid TFC membranes can be made that have the same or similar flux responses, but with improved rejection relative to either additive alone.

Referring now to example 4, a nanocomposite TFC membrane with 0.05% LTA additive in the aqueous phase may yield a flux of 26.2 GFD, a 10% flux improvement over a control membrane without nanoparticle as well as a 99.17% salt rejection, below the 99.68% rejection of the control membrane Referring now to example 175, a TFC membrane with 0.02% mhTMC additive in the organic phase may yield a flux of 29.5 GFD having a 31% flux improvement over a control membrane without additives as well as a 99.24% salt rejection, also below the rejection of the control membrane.

Referring now to another example, not shown in the tables, hybrid TFC membrane 10 with both the LTA and mhTMC additives may yield a flux of 30.7 GFD, yielding a better flux improvement of 36% and, perhaps more importantly, a substantially improved salt rejection of 99.63%, much closer to the 99.68% salt rejection of the control membrane.

Referring now to example 4, the use is illustrated of a concentration of a particular nanoparticle, in this case a 0.05% concentration of zeolite LTA, in aqueous phase 14 before contact with organic phase 18 for interfacial polymerization to form a nanocomposite TFC membrane providing 26.2 GFD at a 99.17% flux rejection. The flux rate provides a 16% improvement over a control membrane made without the nanoparticle additives, which may be useful in some cases especially in light of the other benefits of nanoparticles. However, substantial further additional flux improvement is often desired.

Referring now to example 104, the use of an earth alkaline metal additive, such as a 0.058% concentration of Sr(F₆acac)₂ in organic phase 18, before contact with aqueous phase 14, may produce a TFC membrane yielding a 29.7 GFD flux rate, which at 31% has roughly double the 16% flux improvement of example 25 in the table, but provides only an additional 3.5 GFD.

Including a combination of the LTA and strontium additives in additive 16 may yield a hybrid nanocomposite TFC membrane with improved membrane operation characteristics. As shown in example 28, 0.05% LTA in additive 16 in aqueous phase 14 and 0.058% Sr(F₆acac)₂ included in organic phase 18 yields membrane characteristics of 36.8 GFD flux rate—a 63% improvement over a control membrane—while providing an extremely good salt rejection of 99.57%. The 36.8 GFD is a 10.6 or 3.8 GFD improvement over the examples described using only one additive material in additive 16. Further improvement in membrane characteristics made be found by selections of different additive materials and/or concentrations and/or use of specific additive materials in the aqueous or organic phases.

E.2 Improvement Ratio

Previous uses of additive materials showed little promise because the total flux flow through membrane 10 was relatively low, with an acceptable or even low level of rejection, and the percent of flux improvement compared to a control membrane was so low—that use and/or further experimentation with such additives was unlikely. However, the use of selected processing parameters, such as the MPD, TMC and/or MPD/TMC ratios as discussed herein vastly improves both the total flux available from a particular membrane at a high rejection rate on the order of 99.5%. These process parameters also provide substantial advantages when additive materials—including the previous known additives—are included in additive 16 alone or in combination with other such materials.

In particular, as shown in example 15, the inclusion of 0.05% LTA in additive 16 in aqueous phase 14, together with 0.04% Al(acac)₃ in organic phase 18 produces a commercially useful membrane using a 13.3 MPD/TMC ratio fabrication process having more than a 50% flux improvement at a flux of more than 35 GFD with 99.44% rejection. This membrane 10 is a vast improvement over previously known membranes which included Al because it is a commercially viable membrane for many uses where a membrane have substantially lower membrane performance characteristics remains merely a laboratory curiosity.

Further, as shown in example 68, the inclusion of 0.05% LTA and 0.09% Ca(F₆acac)₂ as additive 16 in organic phase 18 produces—when fabricated at a 13.3 MPD/TMC ratio—a membrane 10 having a more than 50% flux improvement over its control membrane—and commercially useful membrane operational characteristics at a high 34.4 GFD with a 99.02% rejection rate. Further experimentation to adjust the concentrations, ratios and placement of the additive materials may be used to try to improve these characteristics. For example, using 0.05% LTA in aqueous phase 14 and 0.09% Ca(F$_6$acac)$_2$ together with 0.02% mhTMC in additive 16 in organic phase 18 produced a membrane with a 69% improvement over its control at 38.1 GFD and 99.31% rejection as illustrated in example 37.

E.3 Improved Rejection

Referring now to example 4, a nanocomposite TFC membrane with 0.05% LTA additive in the aqueous phase may yield a flux of 26.2 GFD, a 10% flux improvement over a control membrane without nanoparticle additives as well as a 99.17% salt rejection, below the 99.68% rejection of the control membrane. As a result, membrane 10 made in accordance with this example may not meet the requirements for some tasks, such as single pass seawater desalination.

Referring now to example 175, a TFC membrane with 0.02% mhTMC additive in the organic phase may yield a flux of 29.5 GFD having a 31% flux improvement over a control membrane without additives as well as a 99.24% salt rejection, also below the rejection of the control membrane.

Referring now to example 66, a hybrid TFC membrane with both the LTA and mhTMC additives in organic phase 18 may yield a flux of 25.8 GFD and perhaps more importantly, a substantially improved salt rejection of 99.63%, above the 99.5% salt rejection level which may be required for reverse osmosis membranes.

As an example membrane not shown in the tables, a hybrid TFC membrane with both the LTA in aqueous phase 14 and mhTMC additive in organic phase 18 may yield a further improved flux of 30.7 GFD and a salt rejection of 99.63%, above the 99.5% salt rejection level which may be required for reverse osmosis membranes.

E.4: Fouling Resistance

TFC membrane 10 may be used to desalinate waters containing materials which tend to accumulate on the membrane surface, decreasing the permeability of TFC membrane 10. This process is commonly called "fouling". The fouling materials which accumulate on the membrane surface can include, but are not limited to, natural organic matter, partially insoluble inorganic materials, organic surfactants, silt, colloidal material, microbial species including biofilms, and organic materials either excreted or released from microbial species such as proteins, polysaccharides, nucleic acids, metabolites, and the like. The drop in permeability is often smaller, that is, less fouling materials accumulate on the surface of TFC membrane 10 when nanoparticles are included in additive(s) 16.

This reduction in fouling, or improvement in fouling resistance, may—in part—be related to increased hydrophilicity of TFC membrane 10 when nanoparticles are included in additive(s) 16. The hydrophilicity of TFC membrane 10 can be measured by measuring the equilibrium contact angle of the surface of membrane 10 with a drop of distilled water at a controlled temperature. TFC membrane 10, when nanoparticles are included in additive(s) 16, can have a contact angle that is reduced by 5°, 10°, 15°, 25° or more, relative to a similarly prepared membrane without nanoparticles included in additive(s) 16. The equilibrium contact angle can be less than 45°, less than 40°, than 37°, or even less than 25°.

Improved resistance to accumulation for TFC membranes can in part be related to increased hydrophilicity of these membranes. The increased hydrophilicity can be measured by the equilibrium contact angle of the membrane surface with a drop of distilled water at a controlled temperature. Membranes prepared with additive 16 present during polymerization can have a contact angle that is reduced by 5, 15, or even 25 or more degrees relative to a similarly prepared membrane without the additive. The equilibrium contact angle can be less than 45°, less than 40°, or even less than 25°.

In some instances, hybrid TFC membranes 10 may be used to desalinate waters that contain materials which have a tendency to accumulate on the membrane surface in contact with the contaminated water, decreasing the effective membrane permeability, e.g. decreasing membrane flux over time. These materials can include but are not limited to natural organic matter, partially insoluble inorganic materials, organic surfactants, silt, colloidal material, microbial species including biofilms, and organic materials either excreted or released from microbial species such as proteins, polysaccharides, nucleic acids, metabolites, and the like. This drop in permeability or membrane flux is often smaller for membranes prepared as disclosed herein than for membranes prepared by conventional techniques due to a decreased amount, density, viability, thickness and/or nature of accumulated material. Membrane surface properties, such as hydrophilicity, charge, and roughness, often affect this accumulation and permeability change. Generally, membranes with highly hydrophilic, negatively charged, and smooth surfaces yield good permeability, rejection, and fouling behavior. The addition of nanoparticles, such as zeolite LTA nanoparticles, have been shown to reduce roughness, increase negative charge without addition of carboxylate groups, and reduce contact angles.

Figure 15:
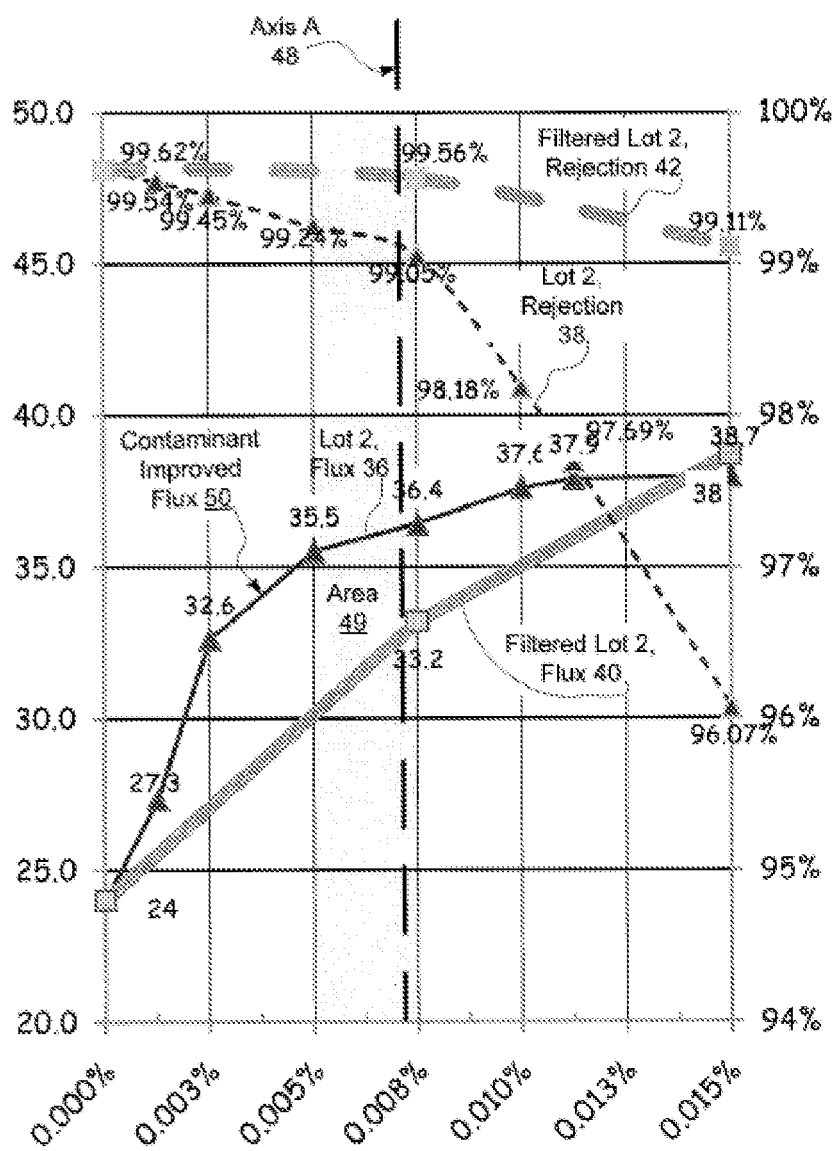
FIG. 15 is a graphical comparison of the reduction in flux over time in membrane 10 with LTA additive 16, membrane 10 with another additive 16 and hybrid membrane 10 with additives 16 including the LTA and the other additive used in the first two membranes shown in this figure.

Referring now to FIG. 15, a simple graphical representation of the reduced loss of flux over time is shown in which the LTA alone shows low flux improvement with low flow loss due to fouling, the Ga(acac)$_3$ additive alone shows high flux improvement with substantial flux loss due to fouling while the hybrid shows the best of both additives, high flux improvement with low flux loss due to fouling. It should also be noted that the TFC membrane with the additive alone has a lower flux than the nanocomposite TFC membrane while the nanocomposite hybrid TFC membrane shows a flux improvement over the nanoparticle hybrid TFC membrane of about 21% in only 2 days. The rate of flux drop tends to decrease in conventional membranes over time, but nanoparticle hybrid TFC membranes are expected to maintain an improvement of 20 to 100% above similar membranes with single additives or conventional membranes.

Referring now to Table 9, Fouling Test, example 184, TFC membrane 10 having 0.1% LTA included in additive 16 in organic phase 18 had 22.5 GFD flux rate—which is not an improvement over its control membrane—and a 98.5% salt rejection. The flux at 1 hour was 22.5 GFD and was maintained at 22.5 GFD by fouling after about two days which shows substantial resistance to fouling.

Referring now also to Table 9, membrane 10 with 0.08% Ga(acac)$_3$ in organic phase 18 had a substantially improved flux of 30.9 GFD after 1 hour of operation under the same conditions, a substantial 37% flux improvement over its control membrane and the membrane of example 183. However, the flux was reduced to 20.9 GFD after 2 days as a result of fouling. This represents an almost 50% flux loss due to fouling in just 2 days and unfortunately not that uncommon.

However, referring again to Table 9, the LTA and Ga(acac)$_3$ additives of example 185 were used together in this example. The resultant membrane had an even further increased flux of 31.9 GFD after operation in the same conditions but more importantly, retained a greater amount of flux even after 2 days of exposure to fouling. This membrane showed substantially improved fouling resistance, losing less than 17% of its flux due to fouling. The substantial improvement of resistance to fouling shown by the loss of only 17%—rather than 47%—indicates an improved resistance to fouling of almost 200%. We believe the increase of resistance to fouling is due to the combination of a nanostructured additive believed to reduce fouling with a complex additive, typically including a metal or other additive which substantially increases flux compared to its control membrane. The complexes to be combined with nanostructured additives to substantially reduce fouling while maintaining high flux and rejection may include compounds with alkaline earth metals, Al, Fe, Ga, Sn, Co, Cu and Pr or phosphorous. The combination of a nanostructured additive with mhTMC may also substantially reduce fouling.

The invention claimed is:

1. A reverse osmosis membrane having a surface accessible to a feed stream, the reverse osmosis membrane comprising:
    (a) a porous support membrane;
    (b) a discrimination layer on the porous support membrane comprising the interfacially polymerized product of a polyamine and a polyfunctional acid halide;
    (c) optionally an anti-fouling layer on the discrimination layer; and
    (d) nitrogen-containing species that are included with the discrimination layer, the anti-fouling layer, or both, which, upon exposure to halogens, reversibly react to form halamines on the surface of the reverse osmosis membrane,
    wherein the nitrogen-containing species are derived from a source other than the polyamine and are selected from the group consisting of imides, sulfonamides, hydantoins, imidazolidin-4-ones, and combinations thereof.

2. A reverse osmosis membrane according to claim 1 wherein the nitrogen-containing species are included within the discrimination layer.

3. A reverse osmosis membrane according to claim 1 wherein the nitrogen-containing species are grafted to the discrimination layer.

4. A reverse osmosis membrane according to claim 1 wherein the nitrogen-containing species are coated on the discrimination layer.

5. A reverse osmosis membrane according to claim 1 wherein the reverse osmosis membrane further comprises an anti-fouling layer on the discrimination layer, and the nitrogen-containing species are included in the anti-fouling layer.

6. A reverse osmosis membrane according to claim 1 wherein the discrimination layer further comprises nanoparticles.

7. A reverse osmosis membrane according to claim 1 wherein the discrimination layer comprises the interfacially polymerized product of a polyamine, a polyfunctional acid halide, and a flux increasing additive.

8. A method of making an anti-fouling, reverse osmosis membrane comprising:
    (a) providing the reverse osmosis membrane of claim 1; and
    (b) exposing the surface of the reverse osmosis membrane to an aqueous feed stream comprising halogens to form halamines on the surface of the reverse osmosis membrane.

9. A method according to claim 8 wherein the aqueous feed stream comprises chlorine and the halamines comprise chloramines.

* * * * *

UNITED STATES PATENT AND TRADEMARK OFFICE
CERTIFICATE OF CORRECTION

| | | |
|---|---|---|
| PATENT NO. | : 8,567,612 B2 | Page 1 of 1 |
| APPLICATION NO. | : 12/826294 | |
| DATED | : October 29, 2013 | |
| INVENTOR(S) | : Christopher James Kurth et al. | |

It is certified that error appears in the above-identified patent and that said Letters Patent is hereby corrected as shown below:

Title page item (75), in Column 1 (Inventors), Line 4, delete "Freemont," and insert --Fremont,--, therefor.

Title page item (57), in Column 2 (Abstract), Line 3-4, delete "chloromines" and insert --chloramines--, therefor.

Title page item (60), in Column 1 (page 2, Related US Application Data), Line 20, delete "No. 61/112,342, filed on Nov. 7, 2008," and insert --No. 61/122,342, filed on Dec. 12, 2008,--, therefor.

Title page item (56), in Column 2 (page 4, Other Publications), line 36, delete "5-dimethlyhdantoin," and insert --5-dimethylhydantoin,--, therefor.

In the Specification

In Column 1, Line 13, delete "61/112,342," and insert --61/122,342,--, therefor.

In Column 1, Line 26, delete "PCT/US2009/06927" and insert --PCT/US2009/060927--, therefor.

Signed and Sealed this
Eighteenth Day of March, 2014

Michelle K. Lee
*Deputy Director of the United States Patent and Trademark Office*